US012381315B1

(12) United States Patent
Yetisir

(10) Patent No.: US 12,381,315 B1
(45) Date of Patent: Aug. 5, 2025

(54) ANTENNA APPARATUS AND IN-LINE CALIBRATION SYSTEM FOR SAME

(71) Applicant: Space Exploration Technologies Corp., Hawthorne, CA (US)

(72) Inventor: Ersin Yetisir, Redmond, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 241 days.

(21) Appl. No.: 17/895,723

(22) Filed: Aug. 25, 2022

Related U.S. Application Data

(60) Provisional application No. 63/237,037, filed on Aug. 25, 2021.

(51) Int. Cl.
*H01Q 3/26* (2006.01)
*H01Q 1/48* (2006.01)
*H01Q 3/36* (2006.01)

(52) U.S. Cl.
CPC ............... *H01Q 3/267* (2013.01); *H01Q 1/48* (2013.01); *H01Q 3/2682* (2013.01); *H01Q 3/36* (2013.01)

(58) Field of Classification Search
CPC ........ H01Q 3/267; H01Q 3/2682; H01Q 3/36; H01Q 1/48
USPC .......................................................... 342/372
See application file for complete search history.

(56) References Cited

U.S. PATENT DOCUMENTS

| | | | |
|---|---|---|---|
| 11,527,833 B1 | 12/2022 | Yousefi et al. | |
| 11,804,914 B1 | 10/2023 | Yousefi et al. | |
| 2004/0155824 A1 | 8/2004 | Nagashima | |
| 2006/0284768 A1 | 12/2006 | Pauplis | |
| 2018/0034566 A1 | 2/2018 | Tankielun et al. | |
| 2018/0375207 A1 | 12/2018 | Dourado et al. | |
| 2019/0013590 A1 | 1/2019 | Rowell et al. | |
| 2022/0006185 A1 | 1/2022 | Yetisir | |

FOREIGN PATENT DOCUMENTS

EP 3767747 A1 * 1/2021 ............. H01Q 3/267

* cited by examiner

*Primary Examiner* — Harry K Liu
(74) *Attorney, Agent, or Firm* — Polsinelli PC

(57) ABSTRACT

A calibration system includes a beamformer lattice including at least a first beamformer, the first beamformer corresponding to a first subset of antenna cells of a plurality of antenna cells including a plurality of feed lines extending between the first beamformer and each of the first subset of antenna cells, and the first beamformer including a first calibration section for comparing a reference signal to a non-reference signal; and a first calibration line corresponding with the first beamformer, wherein the first calibration line is configured to deliver a first reference signal (mTx) from the first beamformer to be received by a first antenna feed line for comparison with a first non-reference signal (Rx) in the first beamformer, and/or wherein the first calibration line is configured to deliver a second non-reference signal (Tx) from a second antenna feed line for comparison with a second reference signal (mRx) in the first beamformer.

18 Claims, 34 Drawing Sheets

Pseudo Calibration Antenna for mTx
On-board (Rx-array) Calibration over the Air
(Coupled Between FEM and DBF)

Pseudo Calibration Antenna for mRx
On-board (Tx array) Calibration over the Air
(Coupled Between FEM and DBF)

Pseudo Calibration Antenna for mRx
On-board (Tx-array) Calibration over the Air
(Calibration Signals Directly from RFIO)

mTX mode

ANTENNA APPARATUS AND IN-LINE CALIBRATION SYSTEM FOR SAME

CROSS-REFERENCE TO RELATED APPLICATIONS

The present application claims priority to U.S. Provisional Patent Application No. 63/237,037 filed Aug. 25, 2021, entitled "ANTENNA APPARATUS AND IN-LINE CALIBRATION SYSTEM FOR SAME," the contents of which is hereby incorporated by reference in its entirety.

TECHNICAL FIELD

The present disclosure pertains to antenna apparatuses for satellite communication systems and calibration architectures for antenna arrays.

BACKGROUND

Satellite communication systems generally involve Earth-based antennas in communication with a constellation of satellites in orbit. Earth-based antennas are, of consequence, exposed to weather and other environmental conditions. Therefore, described herein are antenna apparatuses and their housing assemblies designed with sufficient durability to protect internal antenna components while enabling radio frequency communications with a satellite communication system, such as a constellation of satellites.

SUMMARY

In accordance with one embodiment of the present disclosure, an antenna calibration system for a phased array antenna is provided. The antenna calibration system includes: a beamformer lattice including at least a first beamformer, wherein the first beamformer corresponds to a first subset of antenna cells of a plurality of antenna cells including a plurality of feed lines extending between the first beamformer and each of the first subset of antenna cells, and wherein the first beamformer includes a first calibration section for comparing a reference signal to a non-reference signal; and a first calibration line corresponding with the first beamformer, wherein the first calibration line is configured to deliver a first reference signal (mTx) from the first beamformer to be received by a first antenna feed line for comparison with a first non-reference signal (Rx) in the first beamformer, and/or wherein the first calibration line is configured to deliver a second non-reference signal (Tx) from a second antenna feed line for comparison with a second reference signal (mRx) in the first beamformer.

In accordance with another embodiment of the present disclosure, a method for antenna calibration is provided. The method includes: obtaining a beamformer lattice including at least a first beamformer, wherein the first beamformer corresponds to a first subset of antenna cells of a plurality of antenna cells including a plurality of feed lines extending between the first beamformer and each of the first subset of antenna cells, and wherein the first beamformer includes a first calibration section for comparing a reference signal to a non-reference signal; and calibrating the beamformer lattice using a first calibration line corresponding with the first beamformer, wherein the first calibration line is configured to deliver a first reference signal (mTx) from the first beamformer to be received by a first antenna feed line for comparison with a first non-reference signal (Rx) in the first beamformer, and/or wherein the first calibration line is configured to deliver a second non-reference signal (Tx) from a second antenna feed line for comparison with a second reference signal (mRx) in the first beamformer.

In any of the embodiments described herein, the first calibration line may be electrically coupled to at least a first portion of the plurality of antenna feed lines.

In any of the embodiments described herein, the first calibration line may be electrically coupled to but physically separated from the antenna feed lines.

In any of the embodiments described herein, the antenna feed lines may be on a first layer and the first calibration line may be on a second layer, wherein the first and second layers may be separated by a ground layer.

In any of the embodiments described herein, the ground layer may include a cutout portion for allowing electrical coupling between the antenna feed lines and the first calibration line.

In any of the embodiments described herein, the calibration line coupling may be directional.

In any of the embodiments described herein, the calibration line coupling may be a weak coupler having a coupling level in the range of −20 dB to −41 dB.

In any of the embodiments described herein, the system or method may further include a second calibration line corresponding with the first beamformer, wherein the second calibration line is configured to deliver the first reference signal (mTx) from the first beamformer to be received by a third antenna feed line for comparison with a third non-reference signal (Rx) in the first beamformer, and/or wherein the second calibration line is configured to deliver a fourth non-reference signal (Tx) from a fourth antenna feed line for comparison with the second reference signal (mRx) in the first beamformer.

In any of the embodiments described herein, the second calibration line may be electrically coupled to at least a second portion of the plurality of antenna feed lines.

In any of the embodiments described herein, the first and second calibration lines may include a combiner/divider for splitting a signal path for the first reference signal (mTx) from the first beamformer onto the first and second calibration lines and for combining a signal path for the second reference signal (mRx) from the first and second calibration lines to the first beamformer.

In any of the embodiments described herein, the beamformer lattice may include at least a second beamformer, wherein the second beamformer corresponds to a second subset of antenna cells of the plurality of antenna cells, and wherein the second beamformer includes a second calibration section for comparing the reference signal to an additional non-reference signal, and wherein the first calibration line corresponding with the first beamformer communicates with the first and second beamformers.

In any of the embodiments described herein, the system or method may further include an additional calibration line corresponding with the second beamformer, wherein the additional calibration line is configured to deliver a first additional reference signal (mTx) from the second beamformer to be received by a first additional antenna feed line for comparison with a first additional non-reference signal (Rx) in the second beamformer, and/or wherein the additional calibration line is configured to deliver a second additional non-reference signal (Tx) from a second additional antenna feed line for comparison with a second additional reference signal (mRx) in the second beamformer.

In any of the embodiments described herein, the first calibration line corresponding with the first beamformer may be coupled with the first additional calibration line corresponding with the second beamformer, such coupling configured for communicating calibration information from either of the first and second beamformers to the other of the first and second beamformers, or both from the first beamformer to the second beamformer and from the second beamformer to the first beamformer.

In any of the embodiments described herein, the first calibration line corresponding with the first beamformer may be coupled with at least three other additional calibration lines corresponding with at least three other beamformers.

In any of the embodiments described herein, further comprising a stack patch antenna assembly defining the plurality of antenna cells.

In any of the embodiments described herein, the system or method may further include a PCB assembly coupled to the stack patch antenna assembly and the beamformer lattice, the PCB assembly made up from a plurality of layers, wherein a first layer is an antenna ground layer having a slot feed to electrically couple each of the plurality of antenna cells of the stack patch antenna assembly to a beamformer in the beamformer lattice, wherein the first layer is spaced from a backing ground layer defining a plurality of cavities between the first layer and the backing ground layer, each cavity associated with one of the plurality of antenna cells, the PCB assembly further including an intermediate layer between the first layer and the backing layer, wherein the intermediate layer includes cavity portions and a non-cavity portions, wherein the non-cavity portions are configured to support electrical features disposed outside the cavities.

In any of the embodiments described herein, the PCB assembly may include a plurality of ground vias between the first layer and the backing ground layer defining the cavities.

In any of the embodiments described herein, wherein the slot feed may be dual circularly polarized with separate receiving and transmitting ports.

In any of the embodiments described herein, wherein a second layer of the PCB assembly may include a 90-degree hybrid coupler.

In any of the embodiments described herein, wherein a third layer of the PCB assembly may include a partial ground layer to partially isolate the second layer from a fourth layer outside the cavity.

In any of the embodiments described herein, wherein the fourth layer of the PCB assembly may include one or more calibration lines configured for coupling the stack patch antenna assembly and the beamformer lattice.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
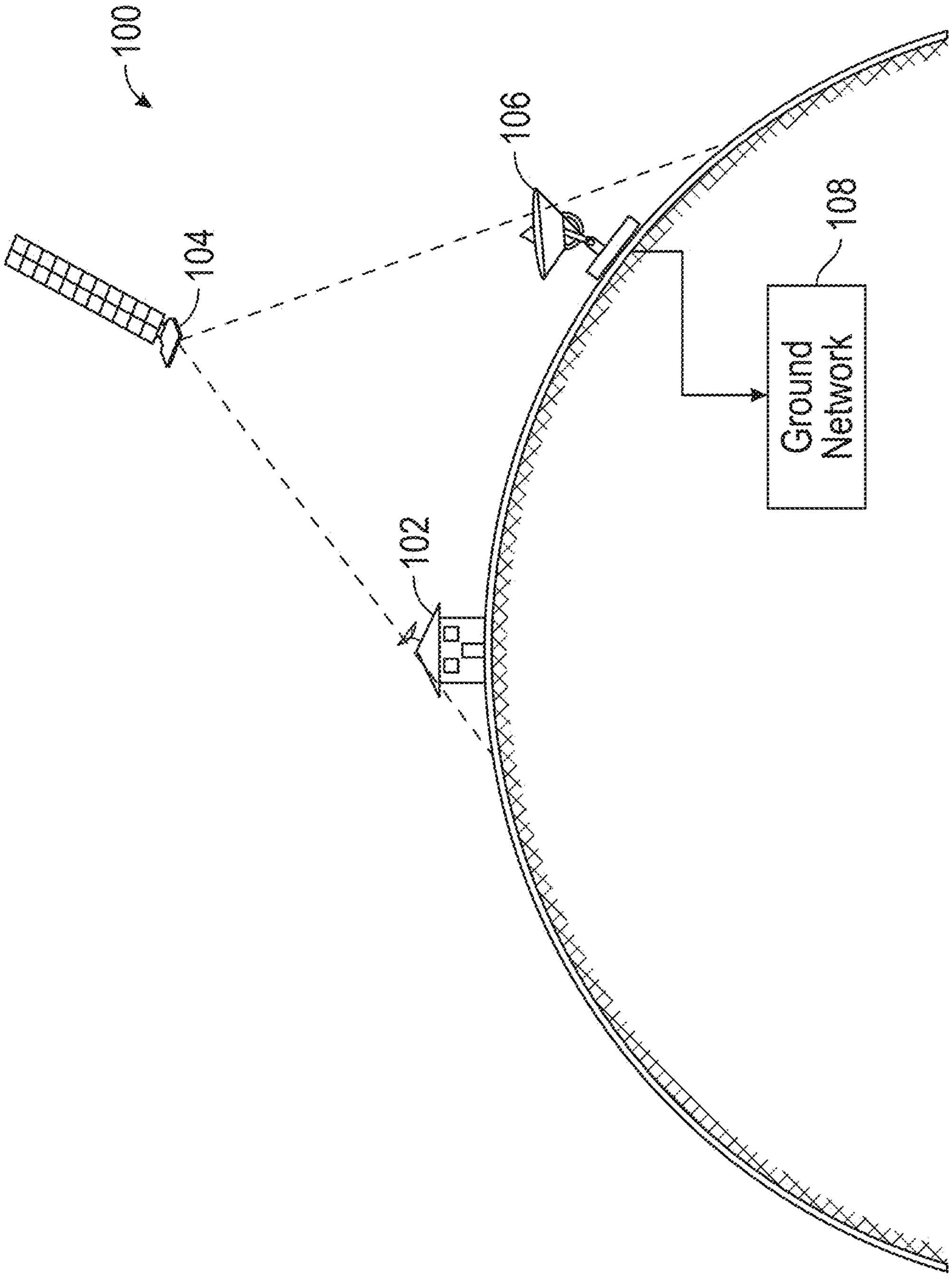
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Embodiments of the present disclosure are directed to antenna apparatuses including antenna systems designed for sending and/or receiving radio frequency signals and calibration architecture for such antenna apparatuses.

The antenna systems of the present disclosure may be employed in communication systems providing high-bandwidth, low-latency network communication via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other building, a tower, a vehicle, or another location where it is desired to obtain communication access via a network of satellites.

A communication path may be established between the endpoint terminal 102 and a satellite 104. In the illustrated embodiment, the satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between a constellation of satellites.

Figure 2A:
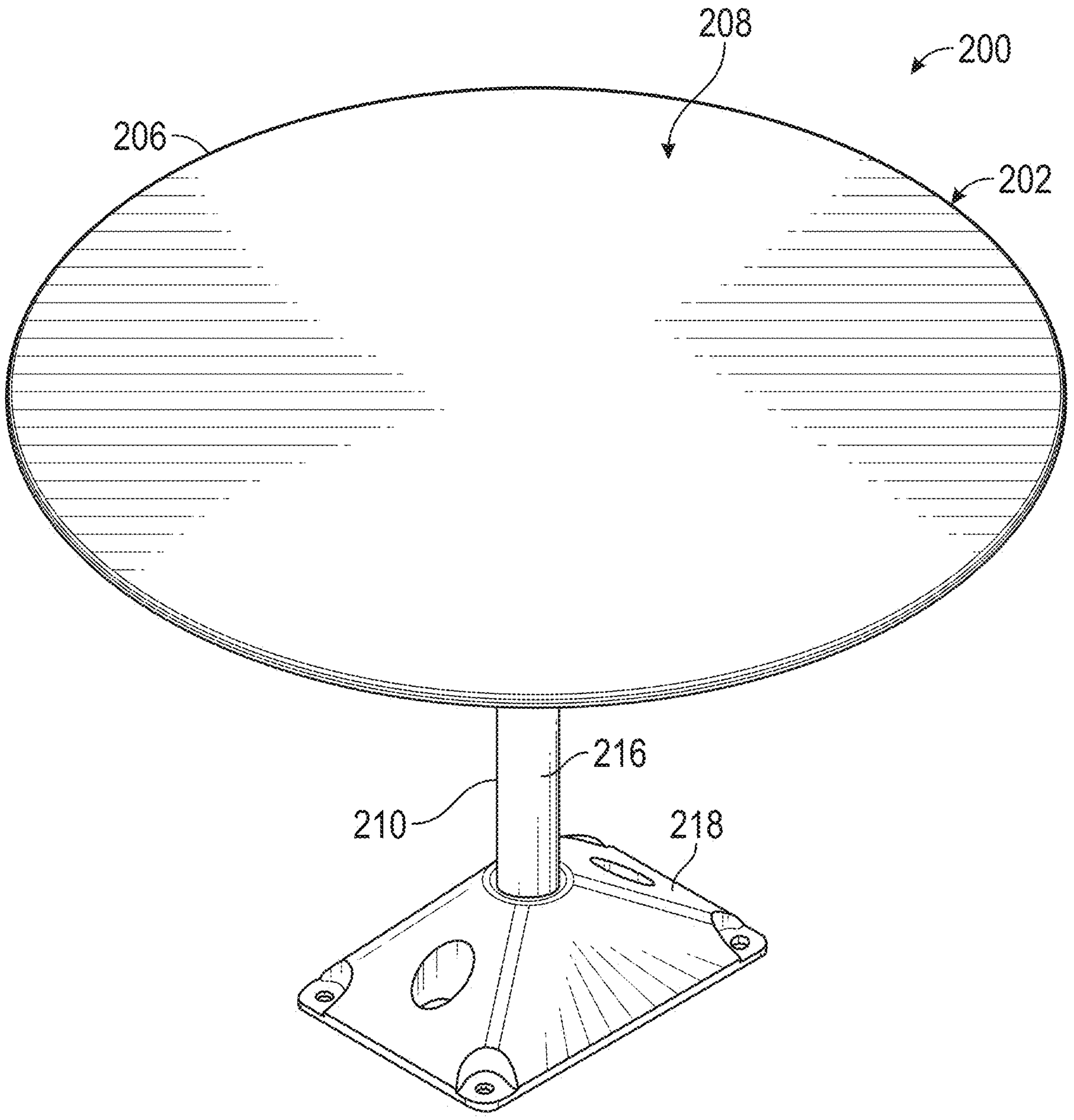
FIG. 2A is an isometric top view depicting an exemplary antenna apparatus according to one embodiment of the present disclosure.
Figure 2B:
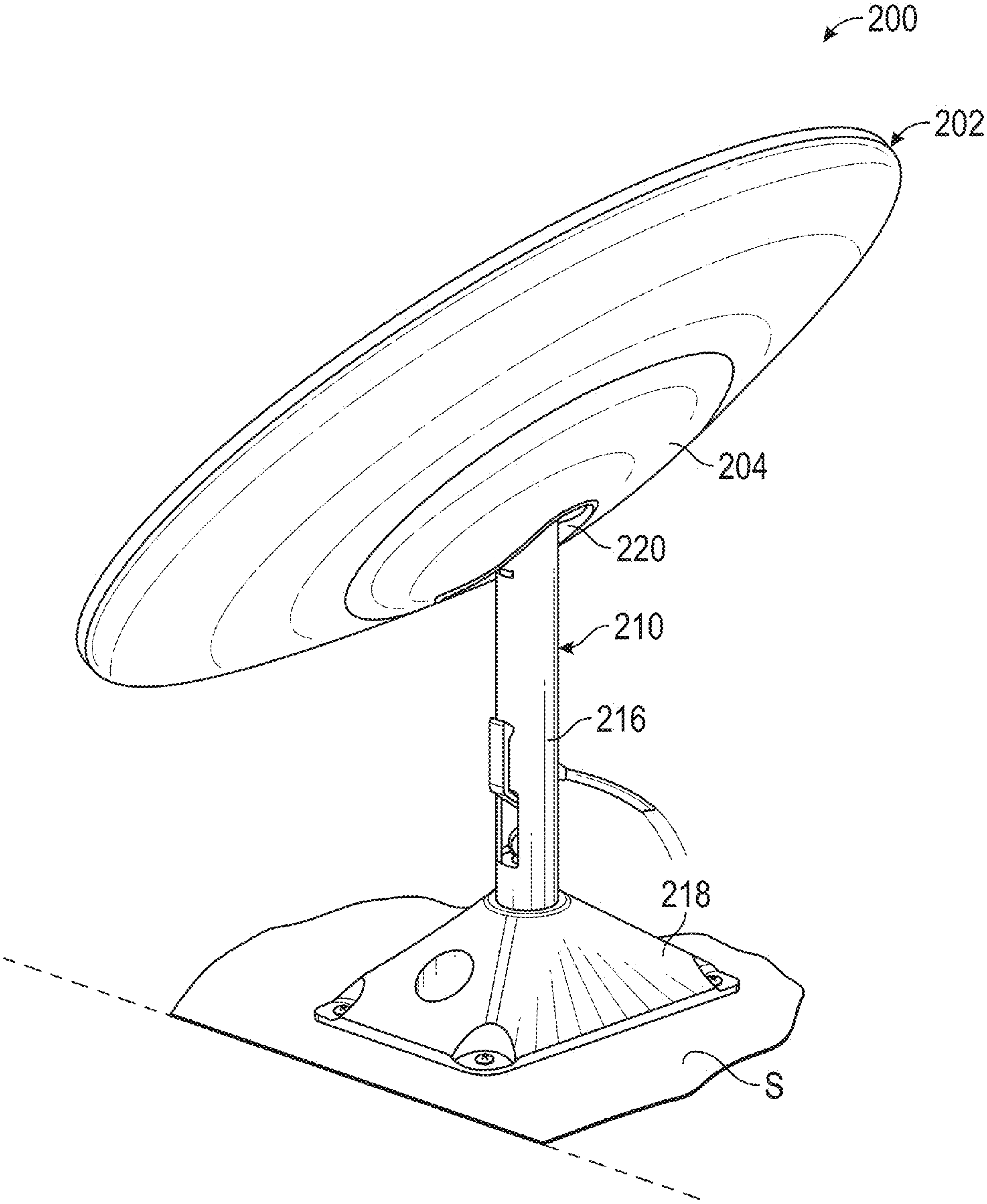
FIG. 2B is an isometric bottom view depicting the antenna apparatus of FIG. 2A.

The endpoint or user terminal 102 may include an antenna system disposed in an antenna apparatus 200, for example, as illustrated in FIGS. 2A and 2B, designed for sending and/or receiving radio frequency signals to and/or from a satellite or a constellation of satellites. The antenna system, may include an antenna aperture 208 defining an area for transmitting and receiving signals, such as a phased array antenna system or another antenna system.

FIG. 2B illustrates a perspective view of an underside of the antenna apparatus 200. As shown, the antenna apparatus 200 may include a lower enclosure 204 that couples to a radome portion 206 to define the housing 202. In the illustrated embodiment, the mounting system 210 includes a leg 216 and a base 218. The base 218 may be securable to a surface S and configured to receive a bottom portion of the leg 216. A tilting mechanism 220 (details not shown) disposed within the lower enclosure 204 permits a degree of tilting to point the face of the radome portion 206 at a variety of angles for optimized communication and for rain and snow run-off.

Figure 3A:
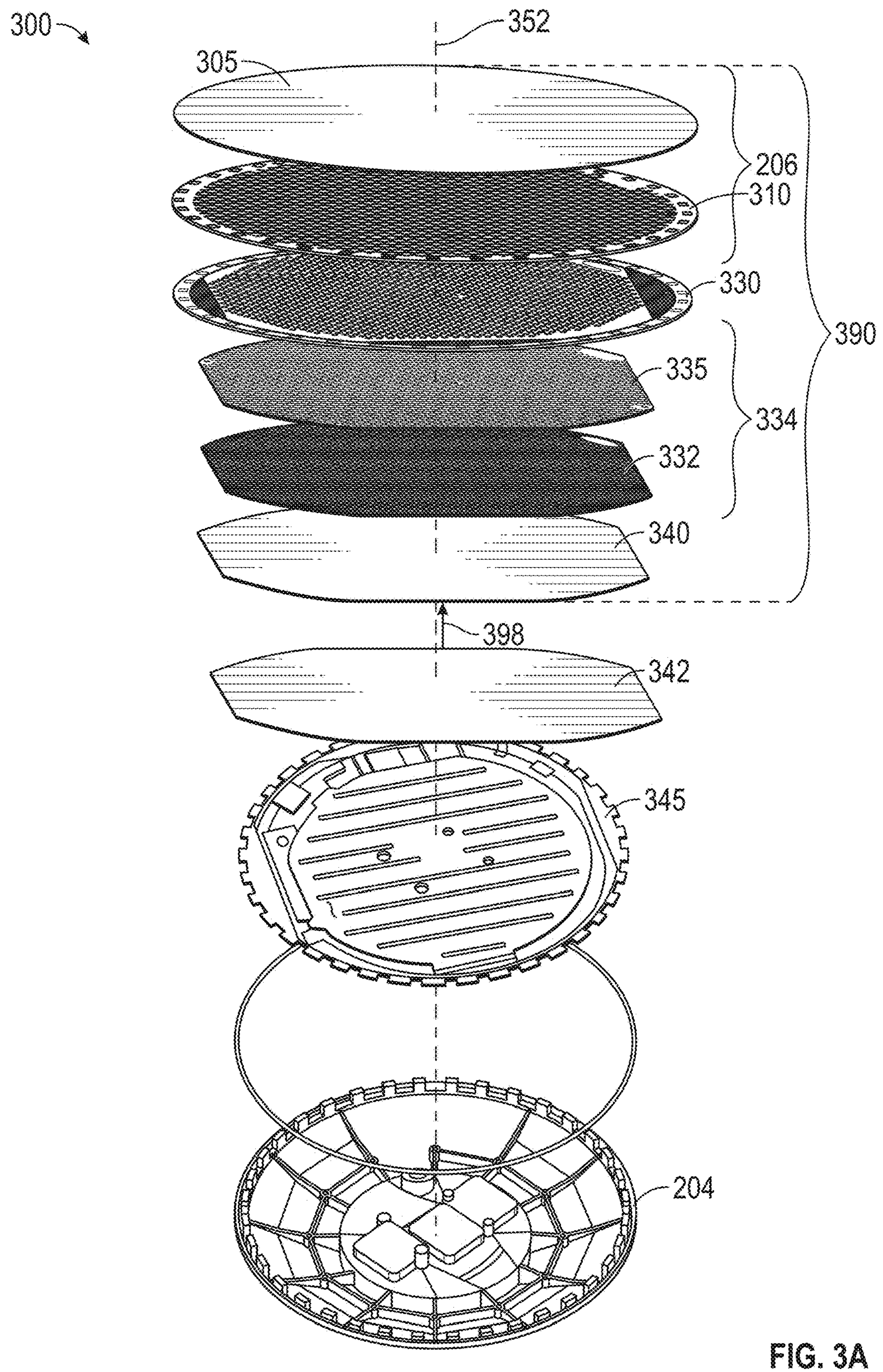
FIG. 3A is an isometric exploded view depicting an exemplary antenna apparatus including the housing and the antenna stack assembly according to one embodiment of the present disclosure.

Referring to FIG. 3A, an antenna stack assembly 300 includes a plurality of antenna components, which may include a printed circuit board (PCB) assembly 342 configured to couple to other electrical components that are disposed within the housing assembly 202 (made up of lower enclosure 204 and radome assembly 206). In the illustrated embodiment, the antenna stack assembly 300 includes a phased array antenna assembly made up from a plurality of individual antenna elements configured in an array. The components of the phased array antenna assembly 334 may be mechanically and electrically supported by the printed circuit board (PCB) assembly 342.

Figure 3B:
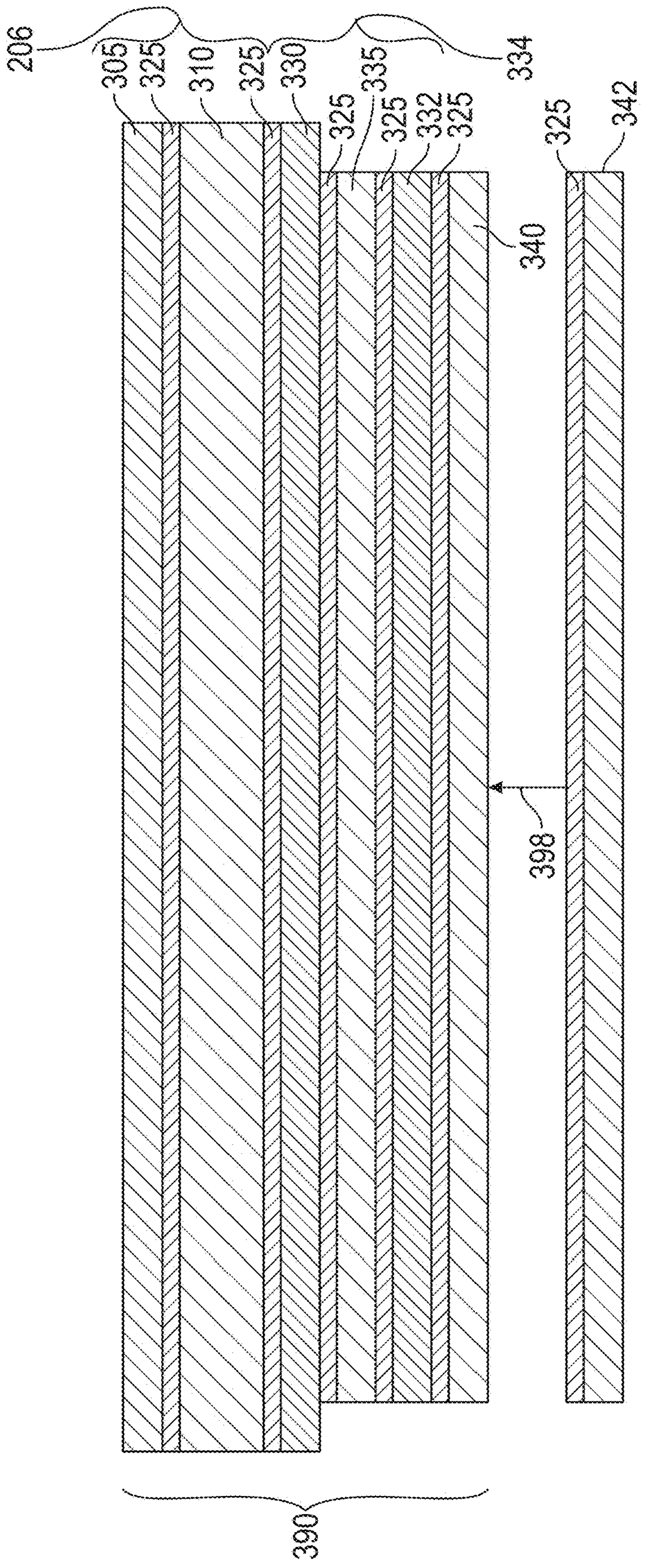
FIG. 3B is a cross-sectional view of an antenna stack assembly of an antenna apparatus in accordance with some embodiments of the present disclosure.

In the illustrated embodiment of FIGS. 3A and 3B, the layers in the antenna stack assembly 300 layup include a radome assembly 206 (including radome 305 and radome spacer 310), a phased array patch antenna assembly 334 (including upper patch layer 330, lower patch layer 332, and antenna spacer 335 in between), a dielectric layer 340, and a printed circuit board (PCB) assembly 342, as will be described in greater detail below. As seen in FIG. 3B, the layers may include optional adhesive coupling 325 between adjacent layers.

Phased Array Antenna System

Figure 4A:
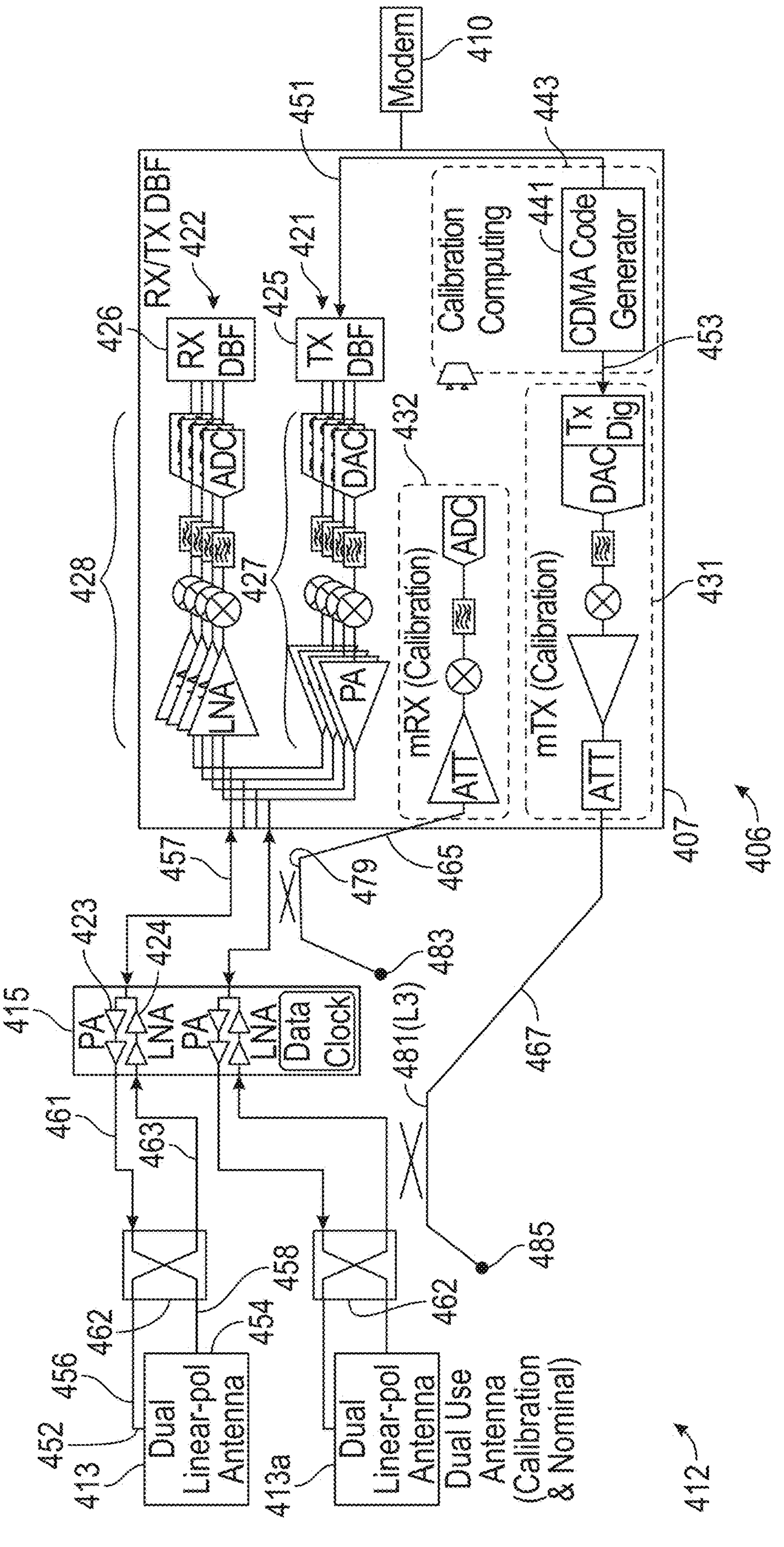
FIG. 4A is an exemplary illustration showing a simplified block diagram of an RF path for an antenna assembly including a dual-linear polarized antenna, 3-dB 90-deg hybrid, TX/RX front-end-module (FEM) chip, and digital beam former (DBF) chip connected with bidirectional RF I/O lines, in accordance with some embodiments of the present disclosure.
Figure 4B:
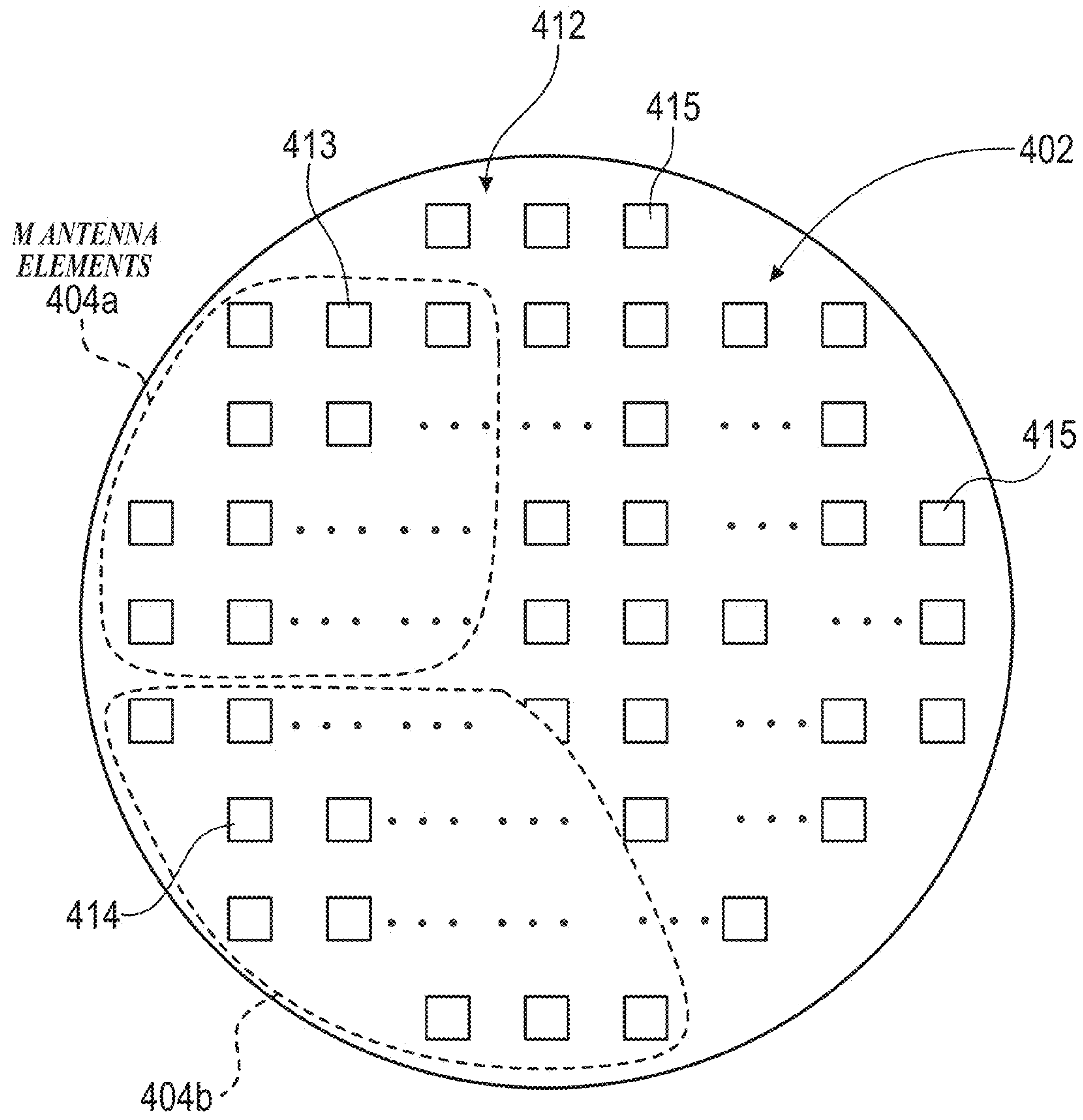
FIG. 4B is an example illustration of a top view of an antenna lattice in accordance with some embodiments of the present disclosure.
Figure 4C:
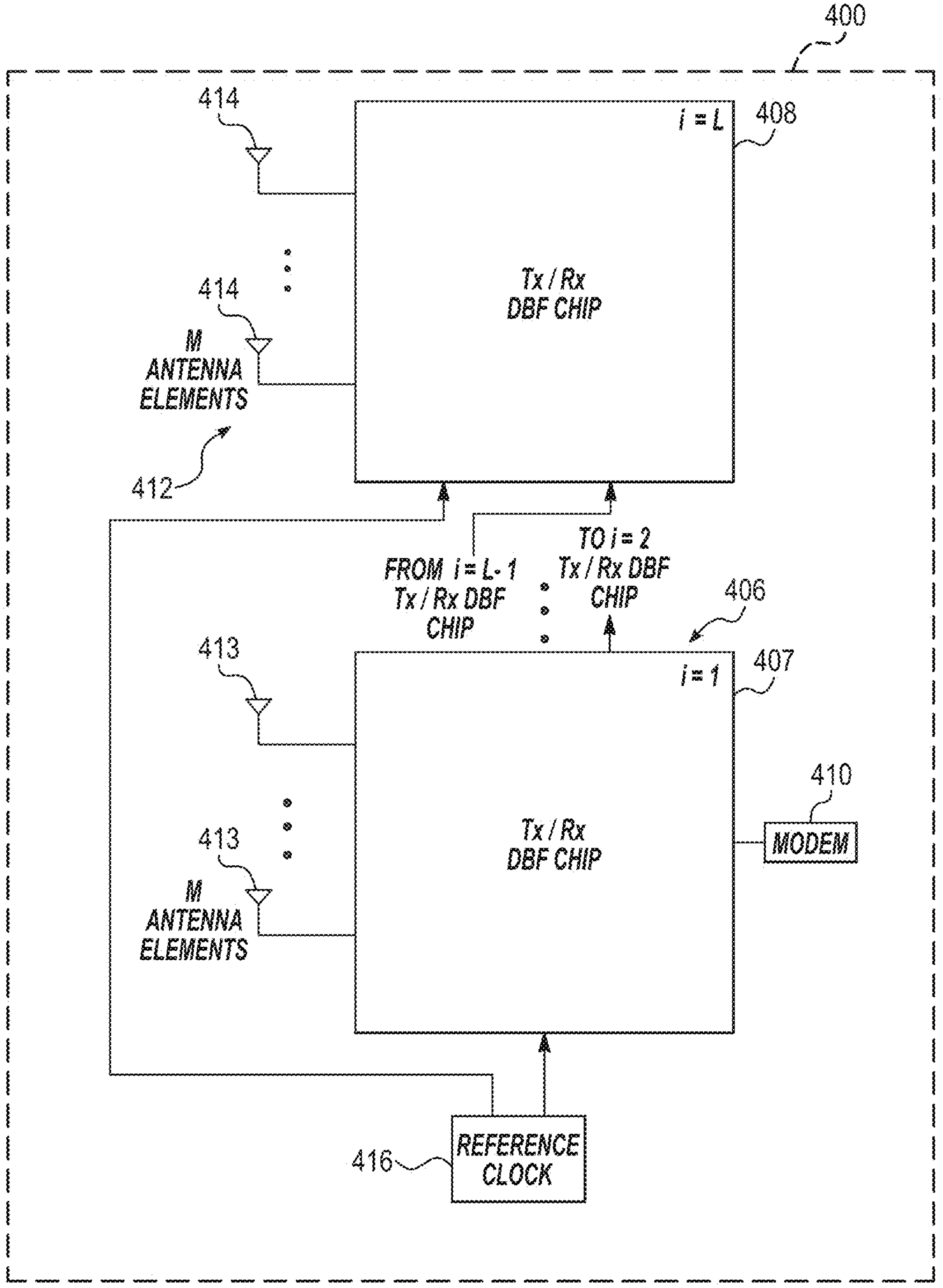
FIG. 4C is an exemplary illustration showing a beamformer lattice associated with an antenna lattice, in accordance with some embodiment of the present disclosure.

FIGS. 4A-4C are schematic illustrations of the electronic system of a phased array antenna system 400 in accordance with embodiments of the present disclosure. The phased array antenna system 400 is designed and configured to transmit or receive a combined beam composed of signals (also referred to as electromagnetic signals, wavefronts, or the like) in a preferred direction from or to an antenna aperture 402 (see FIG. 4B). Accordingly, the plurality of antenna elements simulate a large directional antenna. An advantage of the phased array antenna is its ability to transmit and/or receive signals in a preferred direction (i.e., the antenna's beamforming ability) without physically repositioning or reorienting the system.

In accordance with one embodiment of the present disclosure, a phased array antenna system may be configured to transmit and/or receive radio frequency (RF) signals. The antenna system includes a phased array antenna including a plurality of antenna elements 413 defining antenna aperture 402, for example, antenna elements 413 distributed in one or more rows and/or columns (see FIG. 4B) and a plurality of phase shifters (not shown) configured for generating phase offsets between the antenna elements 413. As a non-limiting example, a two-dimensional phased array antenna may be capable of electronically steering in two directions.

Referring to FIGS. 4A-4C, the illustrated phased array antenna system 400 includes an antenna lattice 412 including a plurality of antenna elements 413, 414 and a beamformer lattice 406 including one or more digital beamformer (DBF) chips 407, 408 (which may be referred to herein as digital beamformers, DBFs, or DBF chips herein) for receiving signals from a modem 410 in the transmit (Tx) direction and sending signals to the modem 410 in the receive (Rx) direction. The antenna lattice 412 is configured to transmit or receive a combined beam of radio frequency signals having a radiation pattern from or to the antenna aperture 402 (see FIG. 4B). In the illustrated embodiment of FIGS. 4B and 4C, the antenna lattice 412 includes a plurality of antenna elements 413 in a first set or grouping.

The plurality of antenna elements 413 in the antenna lattice 412 are configured for transmitting signals and/or for receiving signals. Referring to FIG. 4B, the antenna aperture 402 of the phased array antenna system 400 is the area through which the power is radiated or received. A phased array antenna synthesizes a specified electric field (phase and amplitude) across an aperture 402. As described in greater detail below, the antenna lattice 412 defining the antenna aperture 402 may include the plurality of antenna elements 413 arranged in a particular configuration that is supported physically and electronically by a printed circuit board (PCB) (see FIG. 6E).

Referring to FIG. 4A, a corresponding plurality of front end module (FEM) chips 415 (which may be referred to as front ends (Fes), front end modules (FEMs) or FEM chips herein) are coupled to the plurality of antenna elements 413. The FEM chips may include low noise amplifiers (LNAs) 424 in the receiving direction Rx or power amplifiers (PAs) 423 in the transmitting direction Tx. Although shown in the illustrated embodiment of FIG. 4A as a separate chip from the DBF chip 407, it should be appreciated that some or all of the components in the FEM chips 415 may be incorporated into the associated DBF chip 407.

The beamformer lattice 406 includes a plurality of digital beamformers (DBFs) 407, 408 (see FIG. 4C) including a plurality of phase shifters (not shown). In the receiving direction (Rx), the beamformer function is to delay the signals arriving from each antenna element such that the signals all arrive to the combining network at the same time. In the transmitting direction (Tx), the beamformer function is to delay the signal sent to each antenna element such that all signals arrive at the target location at the same time. This delay can be accomplished by using "true time delay" or a phase shift at a specific frequency.

In the illustrated embodiment of FIG. 4C, each Tx/Rx DBF 407, 408 is capable of processing transmit and receive signals. However, in other embodiments, a DBF chip associated with each group of antenna elements may be configured for either transmit or receive.

Referring to FIG. 4C, the plurality of DBF chips in the beamformer lattice 406 may include an L number of DBF chips. For example, DBF chip 407 comprises the first DBF chip (i=1, where i=1 to L), and so forth, to DBF 408 comprising the Lth DBF chip (i=L) of the plurality of DBF chips 406. Each DBF chip of the plurality of DBF chips 406 electrically couples with a group of respective M number of antenna elements of the plurality of antenna elements. In the illustrated example, DBF 407 electrically couples with M antenna elements 413 and DBF 408 electrically couples with M antenna elements 414. In the illustrated embodiment, the plurality of DBF chips 406 are electrically coupled to each other in a daisy chain arrangement. However, other coupling arrangements are within the scope of the present disclosure.

In some embodiments, each DBF chip of the plurality of DBF chips 406 comprises an IC chip or IC chip package including a plurality of pins, in which at least a first subset of the plurality of pins is configured to communicate signals with its electrically coupled DBF chip(s) (if in a daisy chain configuration) and/or modem 410 in the case of DBF 407, a second subset of the plurality of pins is configured to transmit/receive signals with M antenna elements, and a third subset of the plurality of pins is configured to receive a signal from a reference clock 416 and/or a local oscillator (not shown). The plurality of DBF chips 406 may also be referred to as transmit/receive (Tx/Rx) DBF chips, Tx/Rx chips, transceivers, DBF transceivers, and/or the like. As described above, the DBF chips may be configured for Rx communication, Tx communication, or both. In some embodiments, each DBF chip of the plurality of DBF chips 406 may be configured to operate in half duplex mode, in which it is capable of receiving or transmitting RF signals/waveforms but not both simultaneously.

Referring to FIG. 4B, the antenna aperture 402 may be grouped into subsets of antenna elements 404*a* and 404*b*. Each subset 404*a*, 404*b* of the plurality of antenna elements can comprise the M antenna elements 413, 414, which may be associated with specific DBF chips 407, 408. The remaining antenna elements 415 of the plurality of antenna elements may be similarly associated with other DBF chips (not shown) in the plurality of DBF chips 406.

FIG. 4A is an example illustration showing circuitry or electrical components included in and/or associated with a single DBF 407 in accordance with some embodiments of the present disclosure. The contents of each of the DBF chips 406 are similar to that discussed herein for DBF 407.

In some embodiments, DBF chip 407 includes, among other components, a transmit section 421, a receive section 422, and a calibration section including a transmit calibration (mTx) 431 and a receive calibration (mRx) 432. DBF 407 is configured to generate RF signals (based on data provided by modem 410) to be transmitted by antenna elements 413, decode RF signals received by antenna elements 413 to provide to modem 410, calibrate the receive section 422 (also referred to as a receiver or receiver section) using the transmit calibration (mTx) 431 and calibration antenna element 413*a*, and calibrate the transmit section 421 (also referred to as a transmitter or transmitter section) using the receive calibration (mRx) 432 and calibration antenna element 413*a*.

Transmit and receive calibrations (mTx and mRx) 431 and 432 are selectively electrically coupled to a calibration antenna element 413*a*. A calibration antenna element may be an antenna element included in the antenna lattice 412. In some embodiments, a calibration antenna element is configured for performing calibrations only as a calibration-dedicated antenna element. In other embodiments, a calibration antenna element may be any of the M antenna elements 413 in a subset of antenna elements associated with a DBF 407 and, when not calibrating, may be used for normal or regular signal communication links. Transmit and receive calibrations (mTx and mRx) 431, 432 are configured to facilitate obtaining calibration measurements so as to adapt receive and transmit sections 421, 422, respectively, to compensate for phase and/or time delay mismatch produced by DBF 407, or other DBF chips in the beamformer lattice 406, PCB traces, associated antenna elements, and/or associated antenna element circuitry.

In some embodiments, the transmit (Tx) section 421 includes a transmit digital beamformer (Tx DBF) section 425 and a plurality of Tx RF sections 427 including components. A data signal or stream may be provided by the modem 410 and comprises the input to the Tx section 421.

Tx RF sections 427 are configured to ready the time delay and phase encoded digital signals for transmission. The plurality of the transmit RF sections 427 may include M number of transmit RF sections 427, one for each of the M paths for each antenna element 413. Each transmit RF section 427 may include other components such as a transmit digital front end (Tx DFE), a digital-to-analog converter (DAC), a low pass filter (LPF), a mixer, and a power amplifier (PA).

The amplified RF signal outputted by the PA 423 in the FEM chip 415 is the input to an antenna element 413. In turn, the antenna element 413 radiates the amplified RF signal. Each of the M antenna elements 413 is configured to radiate an amplified RF signal generated by a respective transmit RF section 427.

In some embodiments, the Rx section 422 includes a plurality of Rx RF sections 428 and a single receive digital beamformer (Rx DBF) section 426. Each receive RF section 428 includes components such as a low noise amplifier (LNA), a mixer, a low pass filter (LPF), an analog-to-digital converter (ADC), and a receive digital front end (Rx DFE). In the FEM chip 415, LNA 424 is configured to perform low noise amplification of the analog RF signal received at the respective antenna element 413. A data signal or stream may be provided to the modem 410 and comprises the output from the Rx section 421.

Accordingly, DBF 407 is configured to both digitally process a first data signal, stream, or beam of a single channel for transmission by a first plurality of antenna elements; to receive a second data signal, stream, or beam of a single channel using a second plurality of antenna elements; and to digitally recover/reconstitute the original data signal underlying the received signal. The first and second plurality of antenna elements may be the same or different from each other.

In some embodiments, phase, time delay, and/or amplitude offset can occur after an antenna system has been fully calibrated prior to start of normal operations using individual probe measurements, processing-intensive computations, and setting of electrical components included in the antenna system based on the measurements and computations. Such full calibration scheme is referred to as park and measurement, park and measurement calibration, and/or the like. During normal operation, park and measurement calibration may not be possible. Thus, calibration techniques for calibrating signals can be used to identify and appropriately pre-compensate for phase, time delay, and/or amplitude offsets that occur after (or in between) park and measurement. Such offsets comprise deviations from the particular phase, time delay, and amplitude settings associated with electrical components from park and measurement. At least some of the deviations from park and measurement can be due to temperature variations during normal operation.

Each antenna element of the phased array antenna and its associated transmit or receive circuitry undergoes a similar calibration procedure periodically during operation. Such measurements and calibration based on the measurements can be performed simultaneously with or independent of normal operation of the phased array antenna (e.g., during transmission and receiving of regular or normal signals in the phased array antenna). In some embodiments, the calibration process incorporates a waveform generator 441 electrically coupled to each of the transmit section 421 and the calibration receive section (mRx) 432 and the receive section 422 and the calibration transmit section (mTx) 431 for correlation and calibration.

Referring to FIG. 4A, in accordance with one embodiment of the present disclosure, a phased array antenna system 400 includes a beamformer lattice 406 including a plurality of DBF chips 407, a front end module (FEM) lattice including a plurality of FEM chips 415, and an antenna lattice 412 including a plurality of antenna elements 413, and 90-degree hybrid couplers 462 disposed between each antenna element 413 and each FEM chip 415.

FIG. 4A shows a schematic block diagram of an exemplary DBF 407 used in controlling the phase and amplitude of the RF signals going into and coming from the antenna elements 413 (hence creating the "beam"). The DBF 407 has functional RF Tx/Rx portions 421 and 422 (including various components such as Rx and Tx DBF sections 425 and 426, PAs/LNAs, mixers, filters and DAC/ADC, see Tx components 427 and Rx components 428), dedicated RF paths for calibration and measurement (mTx/mRx) 431 and 432, and a calibration computing section 443 including a calibration code generator 441.

In the illustrated embodiment, coded calibration signals from the CDMA code generator 441 are shown to be distributable both by RF input/outputs (RFIO) (see line 451 to Tx DBF section 425) and the mTx/mRx ports (see line 453 to mTx section 431), as explained in greater detail below with reference to FIGS. 9A-9F.

Pinouts from the DBF 407 for the functional RF input/outputs (RFIO) 457 and the calibration ports (mTx, mRx) 465 and 467 are shown in FIG. 4A. In one non-limiting example, the DBF 407 may include 16 functional RF input/outputs (RFIO) 457, such that each DBF 407 is coupled to 16 antenna elements 413. Pinouts from the DBF 407 for a common local oscillator, clock, analog/digital power, high-speed communication, and digital control are not shown in FIG. 4A.

The front-end modules (FEMs) 415 are chips or circuitry disposed between the beamformer 407 and the plurality of antenna elements 413. FIG. 4A shows a front-end module (FEM) 415 and DBF 407 connected to each other via their RFIO lines 457. As described in FIG. 6E below, in one embodiment of the present disclosure, the connecting RFIO lines 457 are connecting traces routed inside a PCB assembly 342. As a non-limiting example, there are two LNAs 424 and two PAs 423 in each the FEM chip 415 for coupling with two antenna elements 413 (the LNAs 424 and PAs 423 shown as 2-stage amplifiers with digitally controlled first and second stages). The FEM chip 415 has common pin for its LNA output and the PA input from line 457 but separate pins for the PA outputs to line 461 and the LNA inputs to line 463 (going to the individual antenna elements 413).

As a non-limiting example, each antenna element 413 is a dual (linearly) polarized antenna, having two separate ports (one per polarization). Using a 3 dB, 90-deg hybrid combiner/splitter 462, a dual circularly polarized antenna element is created. Two isolated ports of the 90-deg hybrid are connected to the antenna ports via feed lines 456 and 458. The remaining two isolated ports are connected to the RX and TX pins of the FEM via lines 461 and 463.

As a non-limiting example, the 16 RFIO of the DBF 407 can control 8 FEM chips 415 (with 2 LNA/PA pairs in each) and 16 dual-port antenna elements 413, together which can be called a DBF "block". Those numbers can change, depending on the FEM and DBF chip size (and the number of RFIO lines).

FIG. 4B shows a block diagram for the 2D antenna aperture 402. Each DBF chip 407, 408 is associated with its own set of respective antenna elements 413, 414 (DBF blocks). Each of those DBF blocks has at least one dual-use antenna element 413*a* for calibration. There can be multiple dual-use calibration antenna elements 413*a*, for example, if the calibration lines couple to more than one RF path before being terminated.

Returning to FIG. 4A, the calibration ports (mTx 431 and mRx 432) in the DBF 407 are coupled along regular RF paths at pinouts 465 and 467 and can turn the antenna of that path into a dual-use antenna (capable of regular Tx/Rx function and mutual coupling measurements for calibration). See, for example, line 451 coupling mTx calibration section 431 with Tx DBF section 425. The routed lines (or traces) extending from 465 and 467 from the calibration sections (mTx 431 and mRx 432) can be configured, for example, for tapping along the RF path using couplers and then terminated with a matched load. Suitable couplers in accordance with embodiments of the present disclosure are described in greater detail below with reference to FIGS. 8C-8E.

Instead of coupling to just one antenna, the calibration sections (mTx 431 and mRx 432) can be routed (via PCB lines or traces) in a way to couple to multiple antennas. The coupling location can be either between the antenna element 413 and the FEM 415 or between the FEM 415 and the DBF 407, as described below with reference to FIGS. 9A, 9B, 9D, and 9E.

FIG. 4C shows the block diagram of a plurality of DBF blocks 407 and 408 and a modem 410 connected to each other via a serial high-speed communication link and the central reference (clock 416 and local oscillator) being distributed by a fan-out (H-network) to each DBF chip. Before going into the H-network, the local oscillator and clock signals are created separately and combined with a diplexer on the PCB assembly (not shown).

The phased array system described in the schematics of FIGS. 4A-4C operates in a half-duplex mode with the Rx and Tx array sharing the same antenna aperture 402. During operation, the system might be periodically in Rx mode, Tx mode, or idle mode. To maintain coherent operation of each of the RF paths (from antenna to DBF), the system will perform Rx and Tx calibration, which can be performed during any of those modes. In Rx mode, the Rx paths in the FEMs and the DBFs will be activated. Likewise in Tx mode, the Tx paths in the FEMs and the DBFs will be activated. During the Rx and Tx calibration processes, some of the Rx and Tx paths might be active simultaneously. As a non-limiting example, in a given DBF some of the RFIOs can be in Rx mode when one of them is in Tx mode or when the mTx is also active (which would indicate that the device is trying to calibrate its functional Rx array). Antenna systems in accordance with embodiments of the present disclosure may also be configured for Rx or Tx communication only.

The goal in the system design is to make mutual coupling measurements between different antennas. With some paths in Rx mode and some paths in Tx mode, measurement loops can be formed inside the enclosed antenna system itself and compared to pre-stored or otherwise obtained mutual coupling levels of the calibrated array. Any difference between the measured mutual coupling values during operation and the values stored in memory will be interpreted as error and will be compensated by modifying the phase/amplitude of each RFIO path accordingly. Such error may be the result of changing properties of the FEM, DBF, or PCB, for example, due to temperature, aging, etc.

Stack Patch Antenna Assembly

Referring to FIGS. 3A-3B, 5A-5E, and 6A-6E, the antenna stack assembly 300 will now be described in greater detail. In the illustrated embodiment, the antenna array is a stack patch antenna assembly designed to meet various goals of antenna performance, heat transfer, and manufacturability. A patch antenna is generally a low profile antenna that can be mounted on a flat surface, including a first flat sheet (or “first patch”) of metal mounted over, but spaced from, a second flat sheet (or “second patch”) of metal, the second patch defining a ground plane. The two metal patches together form a resonant structure.

Figure 5A:
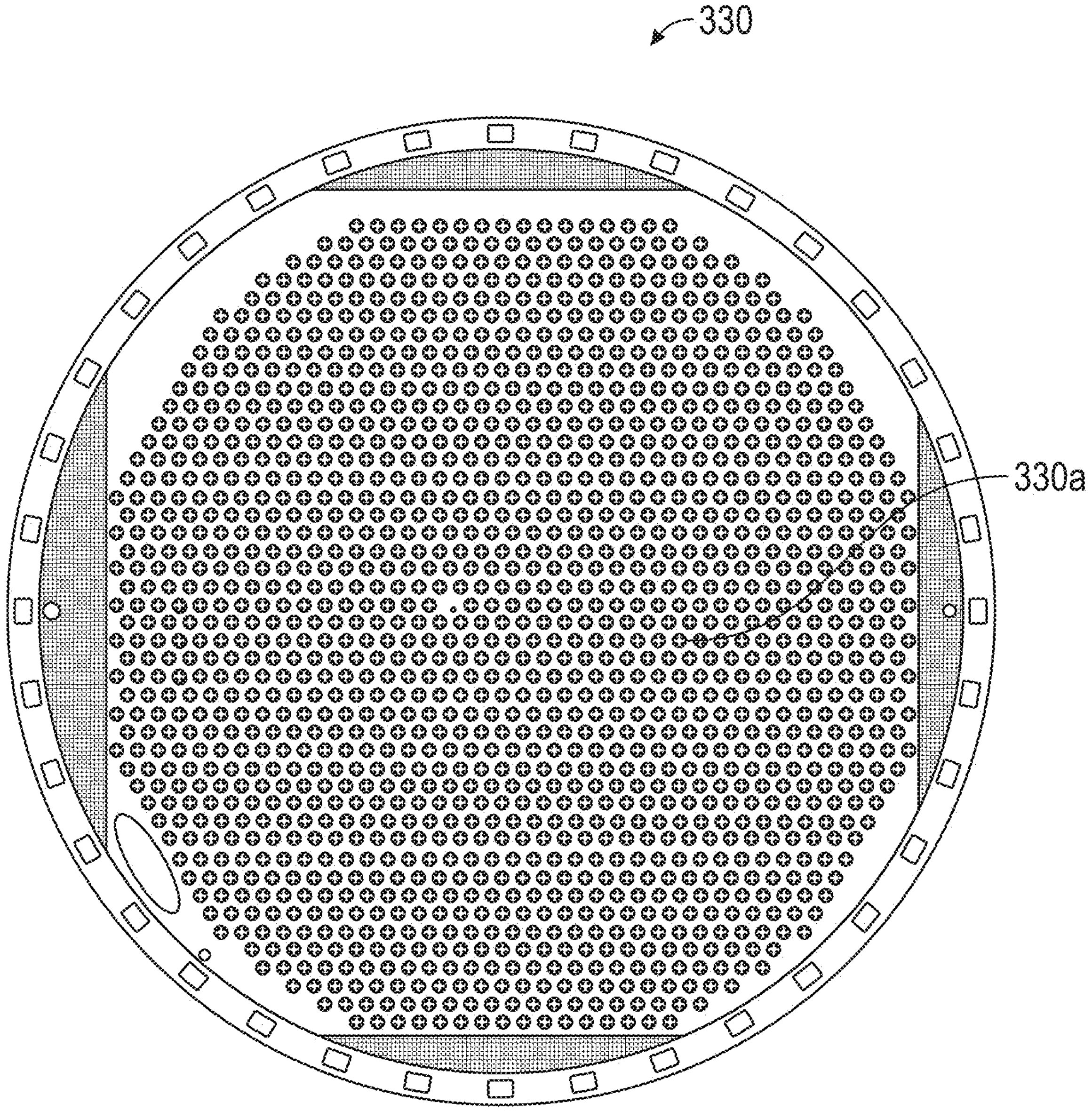
FIG. 5A is a close-up top view of a radome spacer of an antenna stack assembly in accordance with some embodiments of the present disclosure showing the upper patches of antenna elements in apertures of the radome spacer.
Figure 5B:
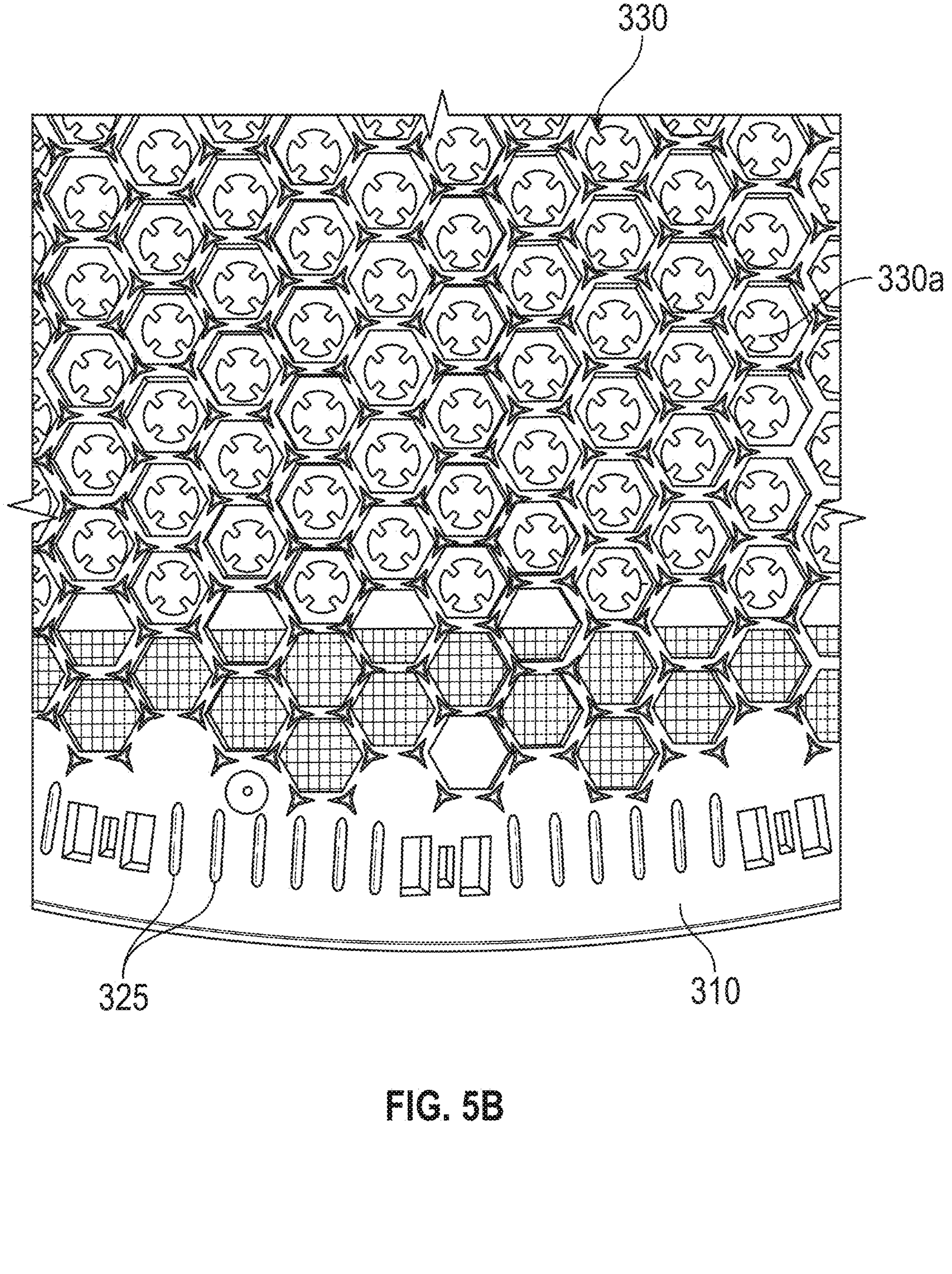
FIG. 5B is a close-up top view of the radome spacer of an antenna stack assembly in accordance with some embodiments of the present disclosure showing the upper patches of antenna elements in apertures of the radome spacer.
Figure 5C:
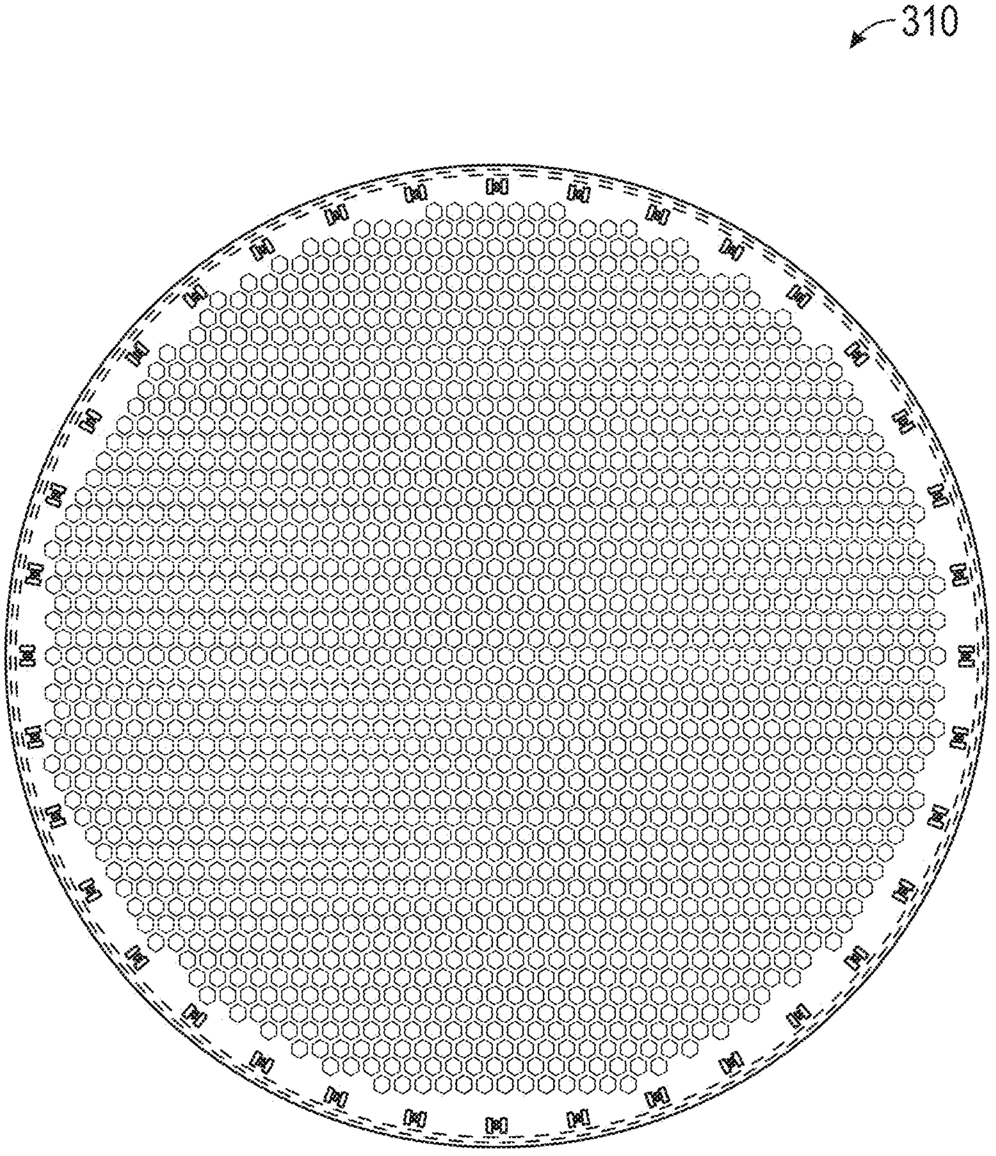
FIG. 5C is a top view of the upper patch antenna layer of an antenna stack assembly in accordance with some embodiments of the present disclosure.
Figure 5D:
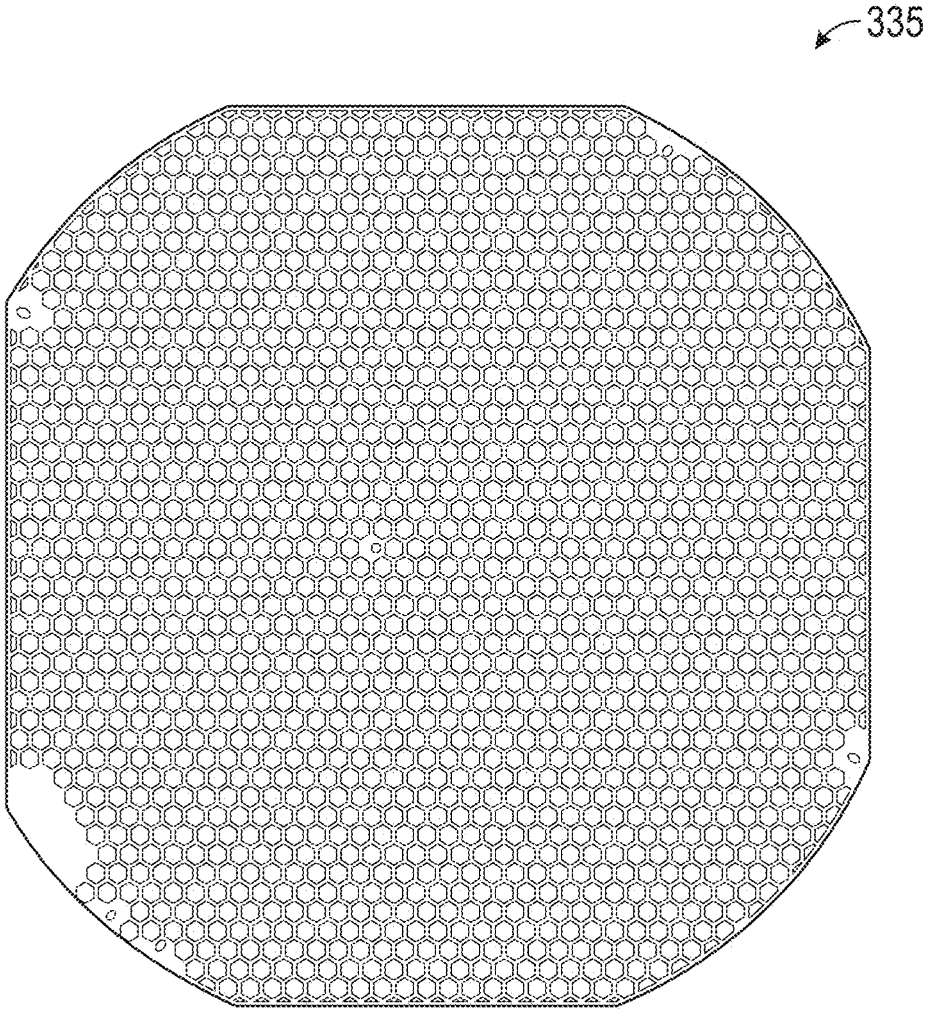
FIG. 5D is a top view of the antenna spacer of an antenna stack assembly in accordance with some embodiments of the present disclosure.
Figure 5E:
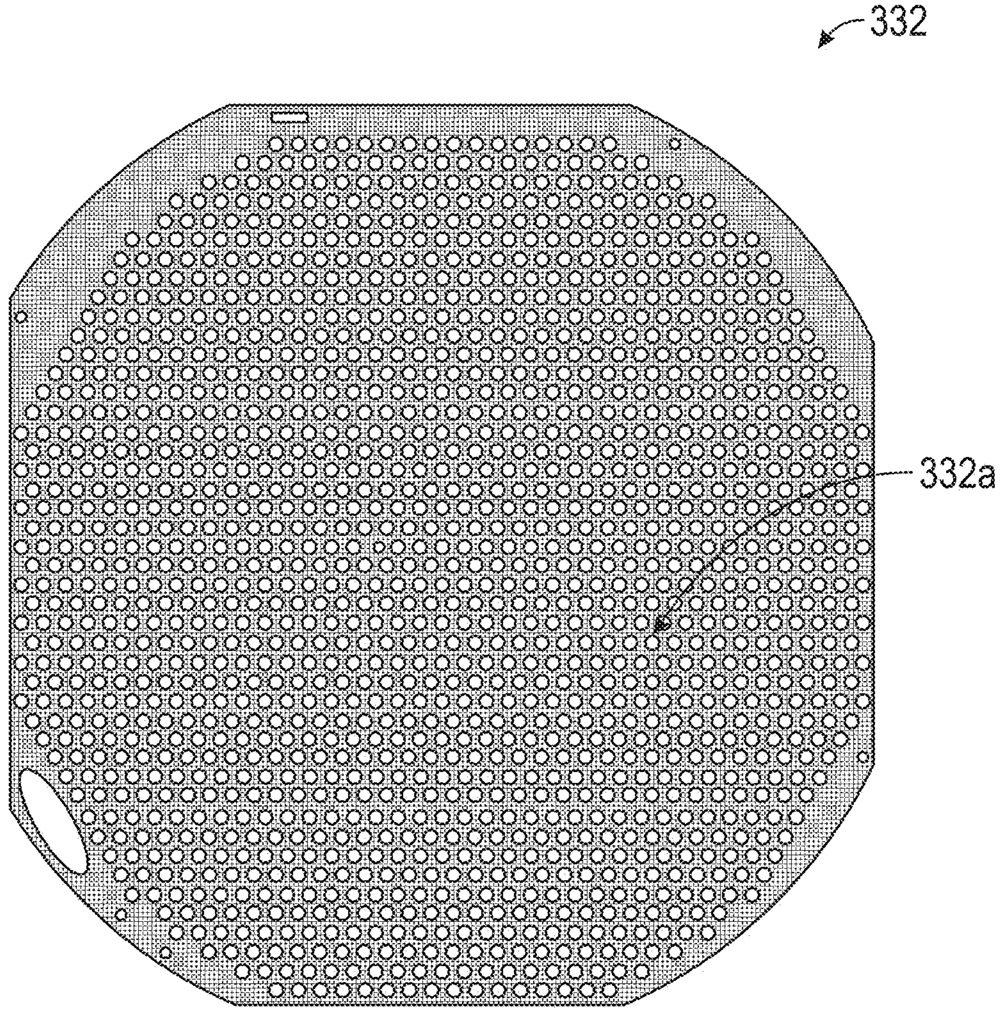
FIG. 5E is a top view of the lower patch antenna layer of an antenna stack assembly in accordance with some embodiments of the present disclosure.

FIGS. 5A-5E illustrate top views of exemplary layers in an exemplary antenna stack 300 seen in FIG. 3A, including a radome 305, radome spacer 310 (FIGS. 5B and 5C), upper patch layer 330 (FIG. 5A), antenna spacer 335 (FIG. 5D), and lower patch layer 332 (FIG. 5E).

Figure 6B:
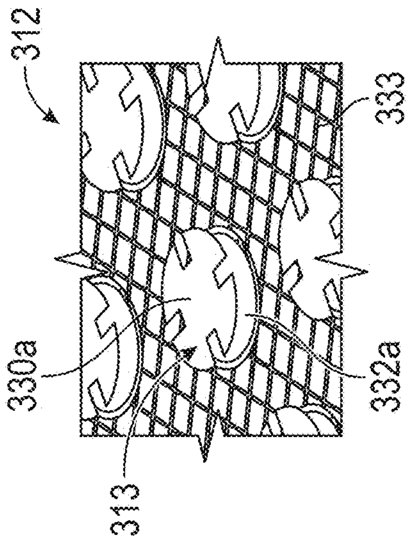
FIG. 6B is another close-up isometric view of the antenna stack assembly shown in FIG. 6A.
Figure 6D:
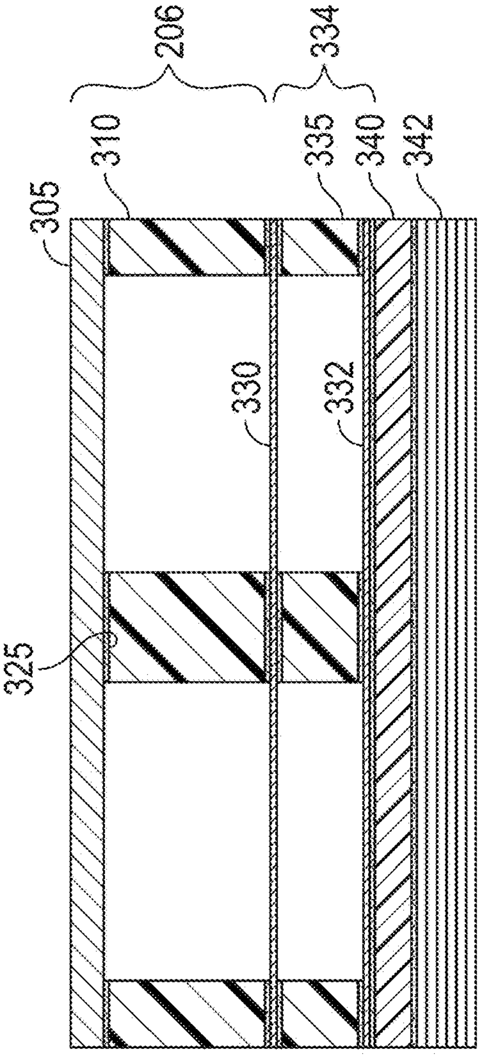
FIG. 6D is a close-up cross-sectional view of the antenna stack assembly shown in FIG. 6A.
Figure 6A:
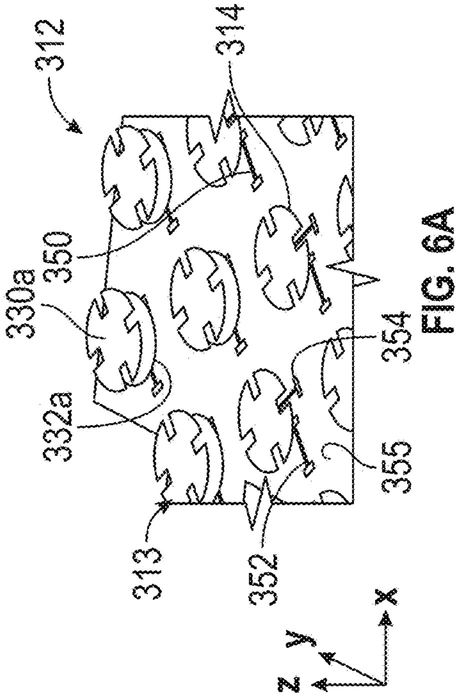
FIG. 6A is a close-up isometric view of an antenna stack assembly in accordance with some embodiments of the present disclosure.
Figure 6C:
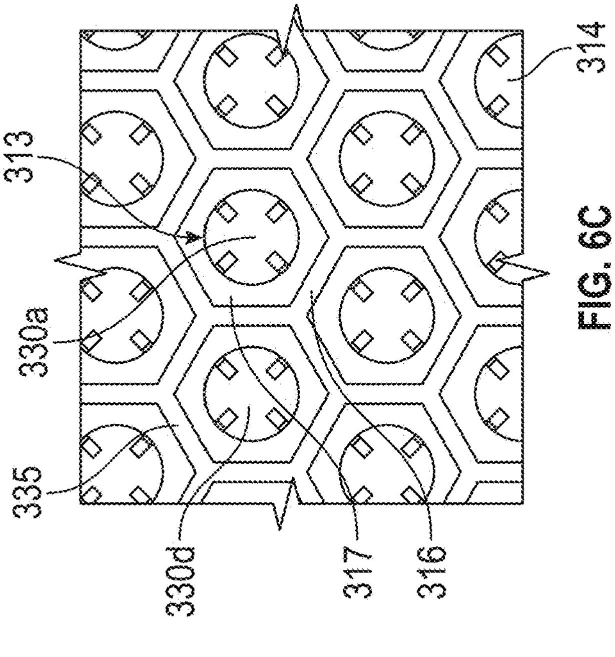
FIG. 6C is a close-up top view of the antenna stack assembly shown in FIG. 6A.

Referring to FIGS. 6A-6D in a close-up view of individual antenna elements 313, 314, the patch antenna assembly 334 includes upper and lower antenna patches 330*a* and 332*a* spaced from each other to achieve the desired tuning of the patch antenna assembly 334. The individual elements 313, 314 shown in FIGS. 6A-6C are part of a plurality of antenna elements forming an array of antenna elements (see FIG. 5A).

As seen in FIGS. 6A and 6B, the individual lower patch layer elements 332*a* are configured to align with the individual upper patch antenna elements 330*a*, for example, in a vertical stack. The lower patch antenna elements 332*a* may be the same as or similar in shape and configuration as the upper patch antenna elements 330*a*. In the illustrated embodiment, the upper patch elements 330*a* are generally circular in configuration and include a plurality of slots for antenna polarization or tuning effects. The lower patch antenna elements 332*a* are generally circular in configuration.

As seen in FIGS. 6A and 6B the upper patch antenna layer 330 is spaced from the lower patch antenna layer 332 using an antenna spacer 335 (not shown in FIGS. 6A and 6B, but see FIGS. 6C and 6D). Each of the plurality of apertures in the antenna spacer 335 may include a vertical pathway to align with each lower patch element 332*a* (at the bottom) and each upper patch antenna element 330*a* (at the top) to define a plurality of individual antenna elements 313, 314 in the antenna lattice 312.

As seen in FIG. 6C, each of the plurality of antenna elements 313, 314 align with each of the plurality of apertures 317 of the cells 316 of the antenna spacer 310. For example, each of the antenna elements 313, 314 are disposed within the cells 316 to provide suitable spacing around each of the antenna elements 313, 314.

The upper antenna patch layer 330 and the lower patch antenna layer 332 may be formed on standard PCB layers or other suitable substrates, such as a thin substrate like FR4 or mylar. In one embodiment, the upper and lower patch antenna layers 330 and 332 are PCB substrates having a respective plurality of antenna patch elements 330*a* and 332*a*. The features of the upper and lower patch antenna layers 330 and 332 may be formed by suitable semiconductor processing to obtain the desired feature patterns and shapes. In the illustrated embodiment, the lower patch antenna layer 332 includes a grid 333 of conductive material between lower patch antenna elements 332*a* to create an anisotropic dielectric layer, described in greater detail below. In an alternate embodiment, the patches may be printed, for example, using a conductive ink, on the patch layers.

An array of multiple patch antennas on the same substrate can be used to make a phased array antenna for which the antenna beam can be electronically steered.

In some embodiments of the present disclosure, the upper and lower patch antenna elements 330*a* and 332*a* may have a longest dimension in the range of 6 mm to 8 mm. The center of each of the upper and lower patch antenna elements may be spaced from the center of adjacent upper and lower patch antenna elements 330*a* and 332*a* by a distance in the range of 11 mm to 13.5 mm. The cell height of the antenna spacer 335 may be in the range of 1 mm to 2 mm. Likewise, the cell walls of the antenna spacer 335 are in the range of 1 mm to 2 mm wide. The adhesive patterns at either end of the cell walls may have a height in the range of 0.005 mm to 0.01 mm.

A suitable antenna spacer 335 may be thermally conductive and capable of dissipating heat through its structure, while also have a low dielectric constant. In one embodiment of the present disclosure, the antenna spacer 335 may be made from plastic material, and may have a dielectric constant, for example, of less than 3.0, less than 2.0, or less than 1.5 at room temperature, and for heat dissipation, a thermal conductivity value of greater than 0.35 W/m-K or greater than 0.45 W/m-K. As seen in FIG. 6C, the antenna spacer 335 may have a cell and wall structure, such as a honeycomb structure. Although illustrated and described as a single spacing layer, the antenna spacer 335 may be comprised of a plurality of spacer elements defining the space between the upper and lower patch layers 330 and 332 of the patch antenna assembly 334. In another embodiment, the antenna spacer 335 may be a foam spacer to provide insulative properties.

The radome portion 206 is a structural surface or enclosure that protects the antenna stack assembly 300, providing an environmental barrier and impact resistance. The radome portion 206 includes radome 305 to the radome spacer 310. Radome spacer 310 may have similar dimensions, properties, and adhesive properties as the antenna spacer 335. However, the radome spacer 310 may have a different height than the antenna spacer 335 to provide a suitable environmental barrier, for example, in the range of 2 mm to 3 mm.

As one non-limiting example, the lower patch antenna element is 6.8 mm in diameter, and the upper patch antenna is 7.5 mm in diameter. In the illustrated embodiment, adjacent antenna elements may be spaced 12.3 mm from each other, for example, in a triangular lattice. The height of antenna spacer 335 may be 1.2 mm with a 0.075 adhesive bond line on either side, for a total height of 1.35 mm. (The radome spacer 310 is 2.35 mm thick with a 0.075 adhesive bond line on either side, for a total thickness of 2.5 mm.) The cell walls of the antenna spacer 335 and the radome spacer 310 are 1.5 mm with a 5 degree draft.

As can be seen in FIG. 6D, the patch antenna assembly 334 may be separate from but mechanically and electrically supported by a printed circuit board (PCB) assembly 342. The PCB assembly 342 is generally configured to connect electronic components using conductive tracks, pads and other features etched from one or more sheet layers of copper laminated onto and/or between sheet layers of a non-conductive substrate. The PCB assembly 342 may be a single or multilayer assembly with various layers copper, laminate, substrates and may have various circuits formed therein. In FIG. 6A, the top layer 382 of the PCB assembly 342 is shown including a slot feed 350.

A dielectric layer 340 provides an electrical insulator between the patch antenna assembly 334 and the PCB assembly 342. The dielectric spacer 340 may have a low dielectric constant (which may be referred to as relative permittivity), for instance in the range of about 1 to about 3, or about 2 to about 3 at room temperature. (When the dielectric constant is high, for example, higher than 3, it may create a scan angle problem for the phased array antenna.).

In an alternate embodiment, a continuous layer dielectric spacer may be replaced with an array of discrete spacers, such as puck spacers. The puck spacers may be positions under the individual stacked patch antenna elements. Puck spacers have overall less material than a continuous layer dielectric spacer, resulting in less overall dielectric loading and allowing for a larger scan angle. Puck spacers may be formed from suitable materials, such as plastic, to provide a suitable dielectric constant and low loss tangent to conform with the performance of the patch antenna assembly. As one non-limiting example, the puck spacers may be formed from a polycarbonate plastic.

In typical PCB construction, individual PCB layers are typically made up of fiberglass material surrounding a pattern of copper traces defining electrical connections. The copper and fiberglass may have similar coefficient-of-thermal-expansion (CTE) values and generally have no purposeful air gaps within the structure. Therefore, the various layers defining a multi-layer PCB can be laminated together under high heat and pressure conditions. In typical patch antenna assemblies, the upper patch layer, the lower patch layer, and the spacing therebetween may be formed using a conventional PCB lamination process.

As described above, materials used in the spacing components (e.g., the radome spacer 310 and the antenna spacer 335) of the antenna stack assembly 300 may include plastic materials. Suitable adhesives in accordance with embodiments of the present disclosure are capable of bonding to plastics and may have a dielectric constant of less than 3.0 and a thermal conductivity in the range of 0.1 to 0.5 W/m-K. Referring to FIG. 3B, the adhesive layer stack 390, which is a stack of layers in the stack assembly 300 having adhesive 325 therebetween, including the following structural layers: radome 305, radome spacer 310, upper patch antenna layer 330, antenna spacer 335, lower patch antenna layer 332, and dielectric spacer 340. In addition to the adhesive layer stack 390, in some embodiments, the PCB assembly may also be adhered by adhesive bonding and pressed with the adhesive layer stack 390 as shown by arrow 398 in FIGS. 3A and 3B.

Referring to FIGS. 6A-6E, each antenna element 313 illustrated herein is an implementation of a dual polarized slot-coupled stacked patch antenna. A conductive layer 355 in PCB assembly 342 serves as the antenna ground, with a slot feed 350 (including two orthogonally oriented slots 352 and 354) cut out in the layer 355. The slots 352 and 354 are disposed under two conductive patches **330*a* and 332*a* stacked on top of each other with a controlled spacing between the upper and lower patches and the lower patch and the slots (see FIG. 6**A).

The slots 352 and 354 have feed lines 356, 358 (see FIGS. 7B and 7C) aligned with the slots 350 to create an electric field across the slots 352 and 354. The induced electric field couples to the lower patch **330*a* to excite the stacked patch antenna pair 330*a* and 332*a*. To remove back radiation, another conductive layer 361 backs the slots with enough distance (so that slots are not short-circuited) below the feed-lines 356, 358 and slots 352 and 354 (see FIG. 6E). The second conductive layer should be spaced far enough from the feed lines 356, 358 such that the feed lines 356, 358** primarily use the first conductive layer (having the slots) as the ground plane, without being perturbed by the presence of the backing conductor layer.

Typically, this type of antenna is capable of achieving impedance bandwidths in excess of 50%. To achieve such performance, some of the design guidelines are as follows: using a low dielectric constant (less than 3 or in the range of about 2 to about 3) for the dielectric spacer 340 disposed between the slots 350 and the lower patch **332*a* and even a lower dielectric constant (air gap or foam-like material) for the antenna spacer 335 disposed between the lower patch 332*a* and the upper patch 330*a*. Other low dielectric materials can be used as the radome layer 305 and/or radome spacer 310**, which may function as impedance tuning superstrates.

Another performance metric of a phased array antenna designed in accordance with embodiments of the present disclosure is the maximum angular range possible for beam-steering without any blind angle/direction. This metric typically means as little dielectric loading over the ground plane as possible to avoid trapping the electromagnetic signals (to be radiated) along the array surface (hence creating well-known "surface waves," which do not leave the antenna aperture 402). Low dielectric loading can be achieved by low dielectric constants and low thicknesses of the antenna spacer 335 and the radome spacer 310.

Environmental factors also play a role in determining the antenna stack assembly 300. The resonating antenna elements **330*a* and 332*a* should be kept away from the effects of rain drops or other particles potentially sitting or moving across the antenna aperture 402, indicating that the radome 206 cannot be arbitrarily thin: it provides enough offset between the environmental boundary and the upper patch 330*a*** so that the electromagnetic behavior is not disturbed.

Heat generated by the active electronic components can generally be dissipated from every face of the enclosed unit, including the antenna aperture 402. The dielectric and spacer layers in the antenna stack assembly 300 can be designed for thermal conductivity using thermally conductive plastics in the spacing elements 310 and 335 having low thickness for optimized thru-plane heat dissipation through the radome 206.

FIG. 6A-6B shows the dual slots 352, 354 on the ground plane 355 with the stacked patch pair 330*a* and 332*a* on top of the slots. As seen in FIG. 6B, on the lower patch layer 330*a*, a conductive grid 333 is provided. The spacing between the grid portions can be adjusted to control and/or miniaturize the size of the lower patch. The grid 333 can also be used to increase the coupling from slots to the lower patch by providing anisotropic dielectric loading in addition to that provided by the dielectric spacer 340, with negligible contribution to surface wave issue. (The horizontally printed square patches are almost invisible to the first TM mode along the ground plane).

The antenna stack up (as seen in FIG. 6D) is designed with a low average dielectric constant, improving the bandwidth and maximum achievable scan angle (for the same lateral spacing between antenna elements). To achieve a low average dielectric constant, the dielectric spacer 340 implemented may be a continuous plastic sheet of low dielectric constant (for example, 2.4). The stacked patch layers 330 and 332 can be printed on a very thin substrate, such as a thin PCB layer or a foam or other thin plastic layer. The antenna and radome spacers 310 and 335 can be implemented using low dielectric constant plastics (e.g. LDPE). In addition, using a honeycomb structure for these spacers (approximately 40% or less density), the average dielectric constant is reduced even further.

FIG. 6C shows a top view of the aperture without the radome 305, illustrating the location of the antenna elements relative to the honeycomb cell walls 316. The diameter of the antenna elements can be adjusted (for example, by miniaturizing edge-slots for top patch 330 and by using a surrounding grid for the bottom patch 332) to leave spacing surrounding around each antenna element from the honeycomb cell walls 316 so that the cavity between the two patches 330 and 332 fills with air and not with dielectric material.

The spacer plastics are selected to provide thermal conductivity for heat transfer away from the active electronics.

The slots, the feed-lines of the slots and the cavity backing the slots are implemented in PCB technology, because these components have fine features and vertical conductors (e.g. via) in addition to the planar conductive layers. The patch antennas and the dielectric spacers between those are implemented using lower cost materials (LDPE or HDPE plastic, mylar, etc.).

Main PCB Assembly

Figure 6E:
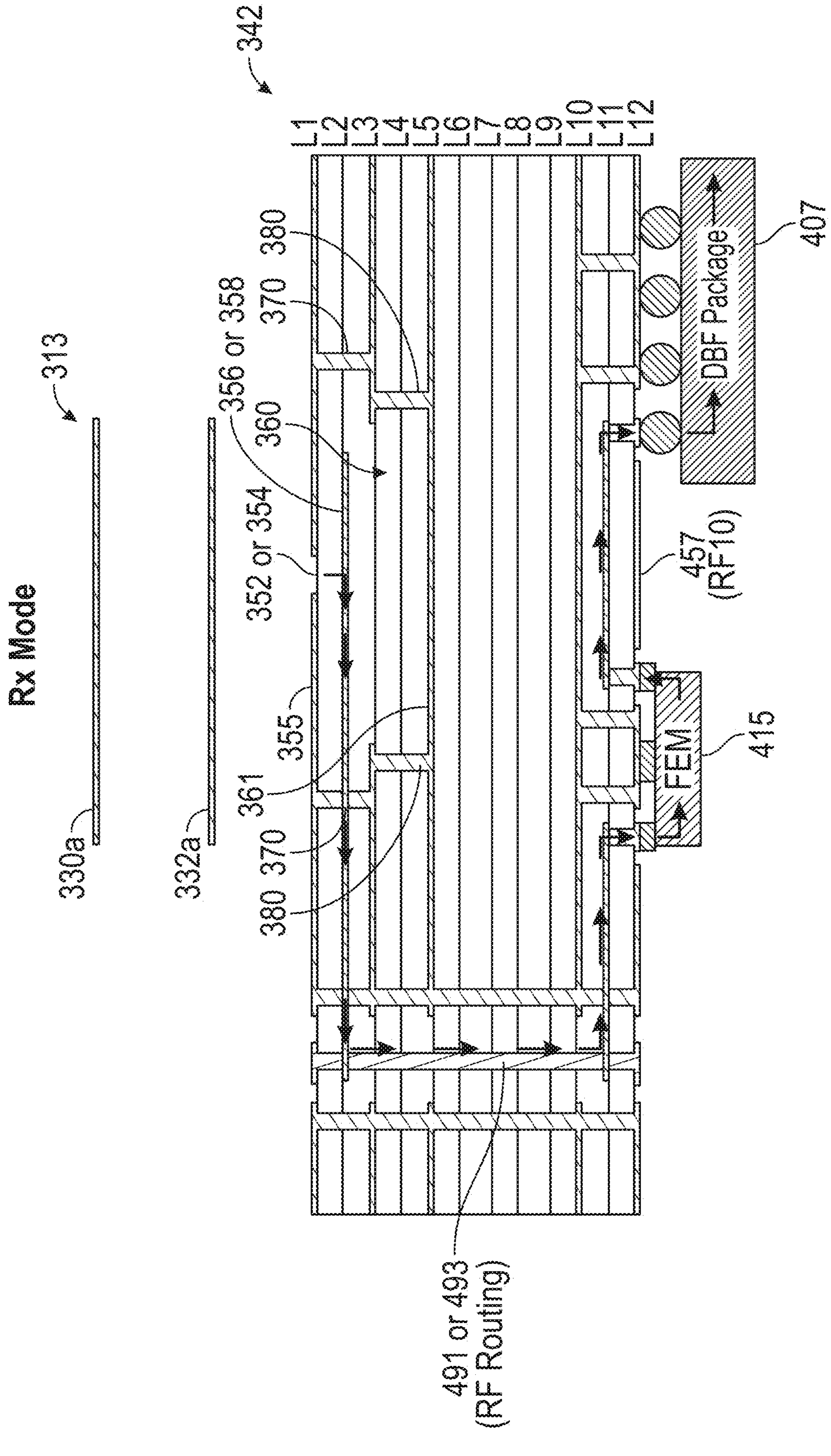
FIG. 6E is a close-up cross-sectional view of an antenna apparatus including a twelve-layer PCB assembly stack-up and DBF, FEM and antenna cavity routing inside that PCB assembly layers in accordance with some embodiments of the present disclosure.
Figure 7A:
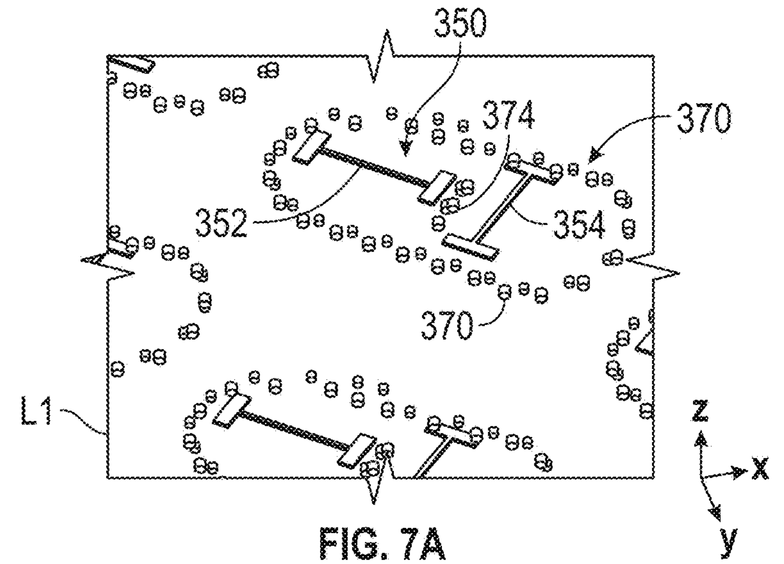
FIG. 7A is an exemplary view of circuitry components in one of a plurality of layers of a PCB assembly of an antenna stack assembly in accordance with some embodiments of the present disclosure.

As discussed above with reference to FIGS. 6A-6D, the PCB assembly 342 includes features that may be aligned with the upper and lower antenna patch elements 330*a* and 332*a* of the individual antenna elements 313, 314, which together may form a resonant antenna structure. As discussed above, PCB assembly 342 includes some of the features of the antenna elements like dual slots 352 and 354 etched on the ground plane 355 with feed lines 356, 358, a cavity 360, and a backing ground plane 361. FIG. 6E illustrates a simplified sketch of the main PCB assembly 342 stack-up showing the RF path (inside the PCB assembly) from the DBF 407 through the FEM 415 and up to the slot feed 350 (etched on the first metal layer of the PCB assembly 342). Because of the cross-sectional nature of the drawing, FIG. 6E does not fully illustrate the dual slot configuration for the slot feed 350 (slots 352 and 354), as seen in FIG. 7A, or the 90-deg hybrid coupler seen in FIG. 7B.

As a non-limiting example, twelve PCB metal layers (L1 through L12) are shown in the illustrated PCB assembly 342. As discussed above, the slots 352 and 354 are etched in the first metal layer (L1), the feed-lines 356 and 358 (Tx and Rx routing and the 90-deg hybrid) are on the second layer (L2), and the secondary ground plane 361 backing the slots 352 and 354 is on the fifth metal layer (L5).

To prevent the RF signals from bleeding inside PCB layers L1 to L5, the slots 352 and 354 are surrounded by grounding vias 370, 380, forming a cavity 360 together with the L1 and L5 ground planes 355 and 361. The grounding vias 370 and 380 guarding the cavity 360 are formed by staggered laser vias extending from L3 and L5 (see FIG. 6E and FIGS. 7A-7C). In another embodiment, the laser vias could be replaced with mechanical through vias (from layer L1 to L12). Inside the cavity 360, metal layers L3 and L4 are etched off (see FIG. 6E and FIG. 7C). Outside the cavity 360, metal layer L3 is used as another ground plane, separating the routing layers L2 and L4.

Figure 8A:
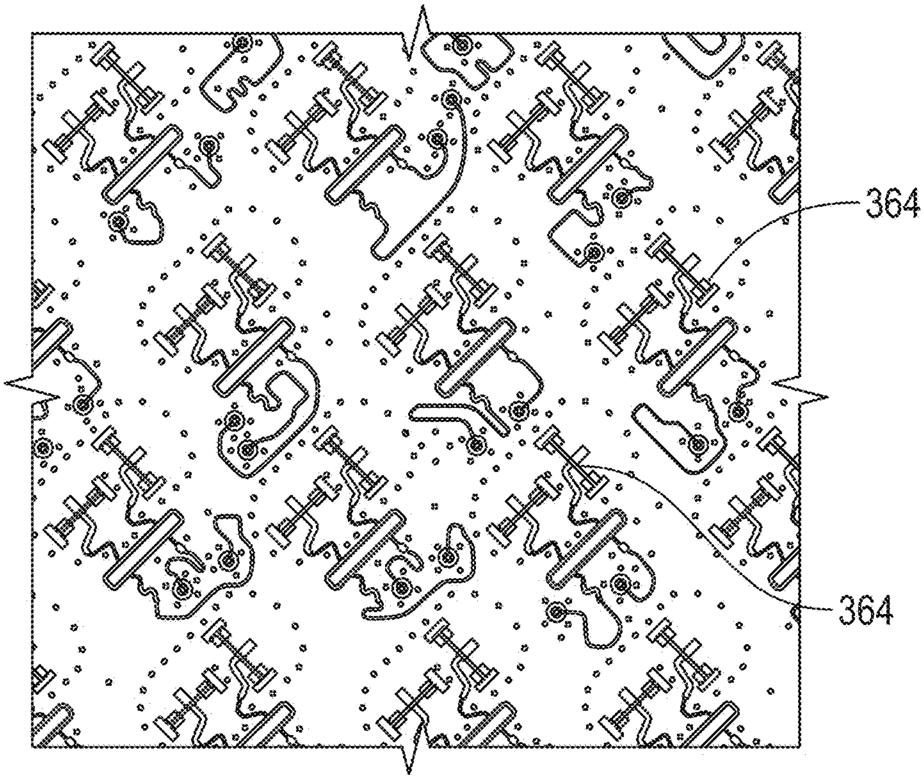
FIG. 8A is an exemplary view showing circuitry components in the plurality of layers of a PCB assembly of an antenna stack assembly, with the layers separating the components removed for clarity of illustration, in accordance with some embodiments of the present disclosure.

A plurality of cavities 360 are disposed in the PCB assembly 342, to correspond with the lattice 312 of the antenna elements 313 (see FIG. 8A). The distances between adjacent cavities 360 and antenna elements 313 is determined based on the effective dielectric constant of the antenna stack and the resulting onset frequency/scan-angle of the surface waves and/or grating lobes. However, the effective dielectric constant inside the main PCB assembly 342 is larger (typically >3.5) than the antenna stack 390 (see FIG. 3B), which is primarily made from plastic and air). This difference in effective dielectric constant may cause destructive resonant modes at lower frequencies and reduce the operational bandwidth of the antenna array at the higher end of the spectrum. Such reduction in operational bandwidth can be mitigated by disposing random ground vias (for example, extending from L1 to L5) between the cavities and the feed lines to reduce the maximum spacing below a desired limit (see FIG. 8A-8B). Another suitable approach is placing a low number of ground vias 375 (e.g., one per antenna) strategically between the cavities to reduce the average size of the gaps between cavities and move resonance frequencies higher (freeing-up the antenna spectrum). Yet another suitable approach is placing the TX and/or RX transition vias 377 (see FIG. 8B) in strategic locations to use the ground vias of those transitions as the resonant suppressing features.

The cavity 360 is designed with L5 as the backing ground plane 361 to provide spacing between the backing ground and the L1 slots and the L2 feedlines. Closer implementation (for example, using L3 as the backing ground plane and reducing the layers of the antenna cavity) might be possible but will be more sensitive to material properties and dielectric and laminate thicknesses. In view of the L1 and L5 spacing between the ground plane 355 and the backing ground plane 361, L2 and L4 are used as dual purpose layers. L4 is used for routing calibration traces and couplers (see FIGS. 4A, 6E, and 8C-8E) and low frequency digital signals between modem, FEM 407, and DBF 415. L2 is used for 90-deg hybrid coupler 462 and the Tx/Rx antenna mapping (as can be seen in FIG. 8A) for length matching purposes (if FEMs 415 are not distributed uniformly from their respective antenna elements 413 as a result of layout complexity on the bottom layer of the PCB assembly 342). Therefore, the advantageous effect of creating a cavity 360 in L1-L5, is that the number of layers in the overall PCB assembly 342 can be reduced resulting in optimized PCB assembly design. In that regard, other components may be disposed on the same or a nearby layer without interfering with the feed structure.

Another suitable implementation would be using L3 as backing ground plane for the slots 352 and 354 but making the distance between L2 and L3 larger (for example, greater than 0.3 mm) as compared to the distance between L1 and L2 (for example, approximately 0.1 mm). However, such distancing would also be implemented in L10, L11, L12 for top/down symmetry in the PCB assembly 342. Such spacing of L10, L11, and L12 may affect ground plane stitching between L10, L11, and L12, which could degrade the quality of the RF-breakout of the electronics (DBF, FEM, etc.).

Figure 7B:
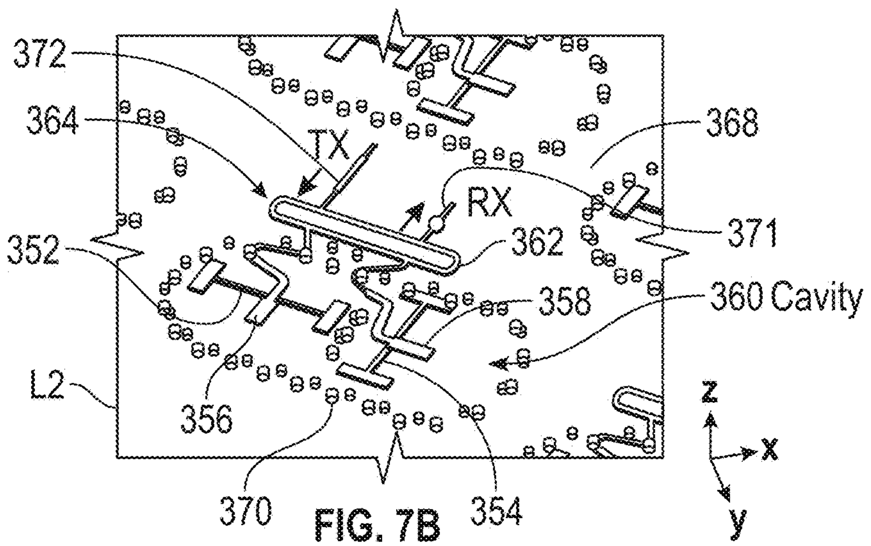
FIG. 7B is another exemplary view of the circuitry components in the plurality of layers of the PCB assembly shown in FIG. 7A.
Figure 7C:
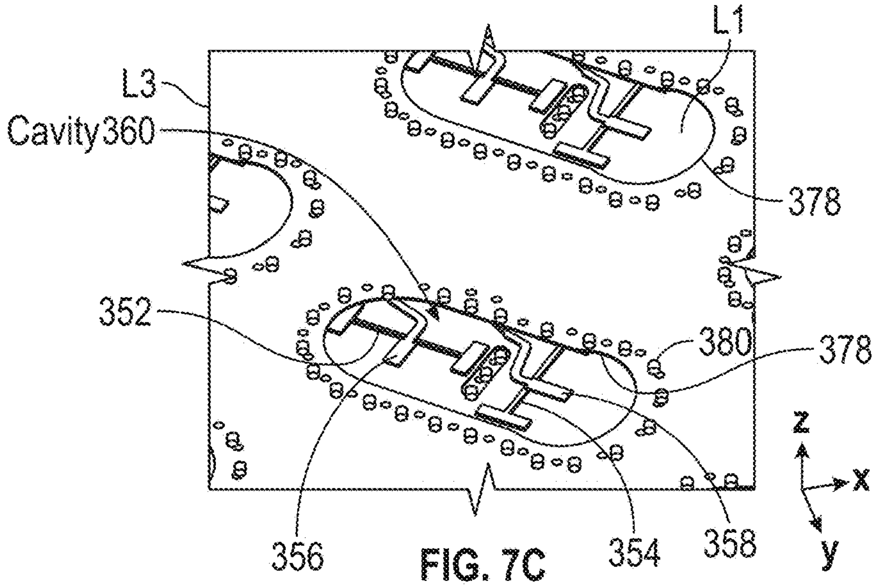
FIG. 7C is another exemplary view of the circuitry components in the plurality of layers of the PCB assembly shown in FIG. 7A.

Referring now to FIGS. 7A-7C and 8A-8E (showing the progression of L1, L2, L3, L4, and L5 in the PCB assembly 342 from the bottom view in FIGS. 7A-7C and the top view in FIG. 8A-8E), the PCB assembly 342 will now be described in greater detail. Referring to FIGS. 7A-7C, the slot feed 350 (including slots 352 and 354) interfaces with the feed structure 364 (including first and second feed lines 356 and 358) disposed in the layers of the PCB assembly 342. The feed lines 356 and 358 couple each antenna element 313 of an antenna lattice 312 with a specific DBF 407 in the DBF lattice 406 (not shown in the PCB assembly layers L1-L3 in FIGS. 7A-7C, but see FIG. 6E). The DBF lattice 406 (and respective FEMs 415) may be disposed in the PCB assembly 342 at a lower layer, such as a bottom layer of the PCB assembly 342.

Referring to FIG. 7A, a slot feed 350 including a pair of first and second slots 352 and 354 is shown. In the illustrated embodiment, the first and second slots 352 and 354 are oriented substantially normal to one another and coupled to feed lines 356 and 358 of a 90-degree hybrid coupler 362.

As described above, each antenna element 313, 314 of the antenna lattice 312 is dual circularly polarized with separate receiving Rx (e.g., right-hand circularized ports) and transmitting Tx (e.g., left-hand circularized ports) port for each unit cell. The 90-degree hybrid coupler 362 works in conjunction with dual linearly polarized antenna elements to create circularly polarized (CP) ports for coupling with the FEM 415 and the DBF 407.

As described above, from the bottom surface of L1 extends a plurality of ground vias (e.g., metal vias or stitching) 370 defining at least a portion of cavity 360 to mitigate RF "bleeding" from the cavity 360. The cavity 360 provides a resonant structure and enables isolation for the feed structure 364, such that other components may be placed on the field 368 of the same or a nearby layer without interfering with the feed structure. Ground vias 374 also help isolate the first and second slots 352 and 354 and feed lines 356 and 358 from each other.

Referring to FIG. 7B, L2 includes the first and second feed lines 356 and 358 to interface with the slot feed 350 and the 90-degree hybrid coupler 362. In the Tx direction, the 90-degree hybrid coupler 362 excites the slot feed 350 and the antenna stack (not shown). In the Rx direction, the slot feed 350 excites the 90-degree hybrid coupler 362. As described above, in addition to the Rx and Tx lines, L2 may further include meander routing for line length consistency (not shown in FIG. 7B, but see FIG. 8A).

Referring to FIG. 7C, L3 is a partial ground layer that includes a cut-out portion 378 corresponding with the cavity 360 defined by the ground vias 370 extending from L1. Extending from the bottom surface of L3 are additional ground vias 380 aligned with ground vias 370 to further define the cavity 360.

As seen in FIG. 7C, the first and second slots 352 and 354 of the slot feed 350 couple with the first and second feed lines 356 and 358 of the 90-degree hybrid coupler 362 (with the feed lines residing in the cavity 360, but the 90-degree hybrid coupler 362 outside the cavity 360), with the first and second slots 352 and 354 and corresponding feed lines 356 and 358. In the illustrated embodiment, L4 (not shown) may be a mostly empty layer, for example, used for calibration meander termination and connector routing for factory calibration. As seen in FIG. 6E, L5 is a backing ground plane 361 defining the cavity 360.

Figure 8B:
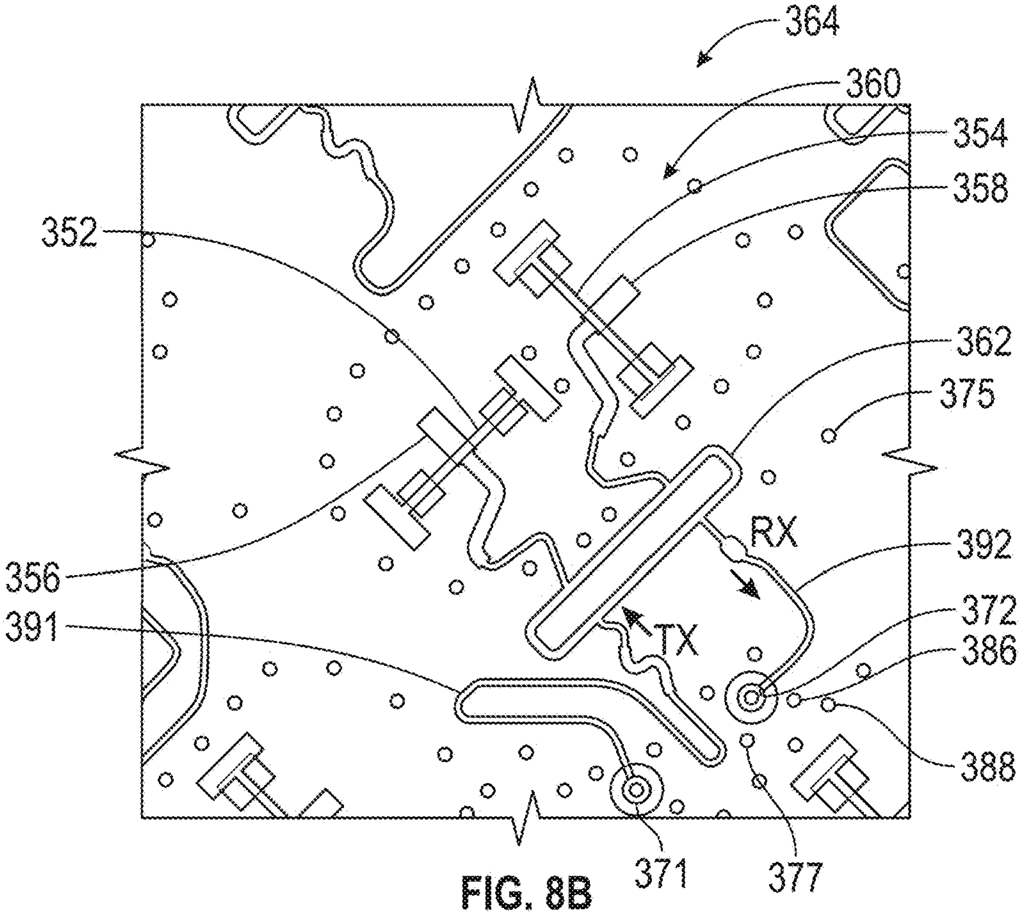
FIG. 8B is a close-up view of the circuitry components shown in FIG. 8A.

Referring to FIGS. 8A and 8B, the various electronic components in L1-L5 are shown with the layers separating the components removed. FIG. 8B is a close up of one feed structure 364 in FIG. 8A. Referring to FIG. 8A, adjacent feed structures 364 are shown with spacing for meandering lines. Referring to FIG. 8B, a received Rx signal from the slot feed 350 and 90-degree hybrid coupler 362 travels through line 392 to the Rx DBF routing 372 (to Rx DBF 426, see FIG. 4B). Likewise, a transmitted Tx signal from the Tx DBF 371 (from Tx DBF 425, see FIG. 4B) travels through line 391 to the 90-degree hybrid coupler 360 to the slot feed 350.

In the illustrated embodiment, the 3 dB 90-degree hybrid coupler 362 is implemented as a single stage branch-line coupler (see FIG. 7B and FIG. 8B). The Tx and Rx ports might have different impedance tuning features at the FEM chip 415 Tx and Rx pins for different frequency bands (as a non-limiting example, Tx using 14 GHz, Rx using 12 GHz). Other implementations of 90-degree couplers are also possible for this antenna design (e.g. multi-stage branch-line couplers, multi-stage broadside, or edge-coupled hybrids, etc.).

Figure 8C:
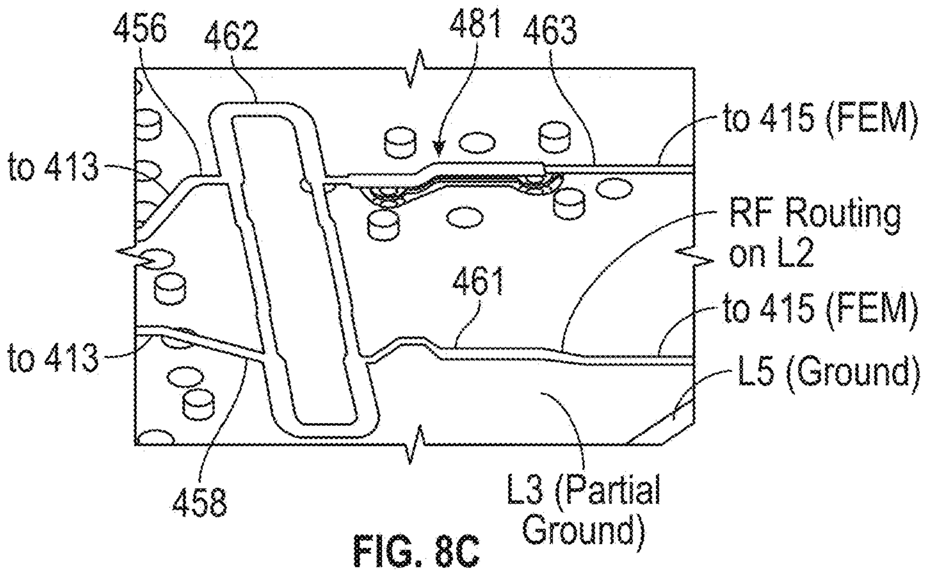
FIG. 8C is an exemplary view showing a coupler design placed, in the plurality of layers of the PCB assembly shown in FIG. 8A, between a 90-deg hybrid and an FEM, to be used to couple calibration/measurement RX/TX ports to functional paths.
Figure 8D:
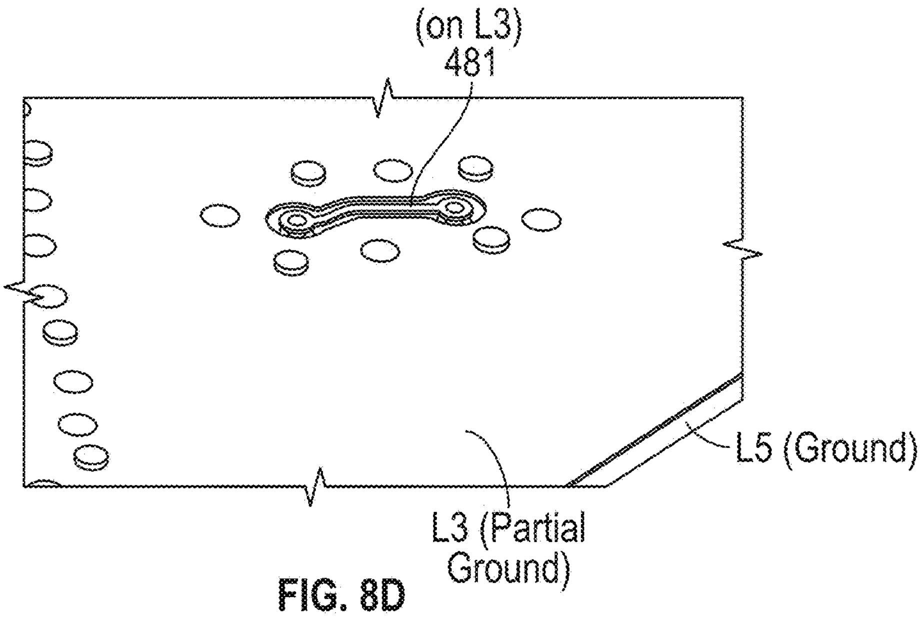
FIG. 8D is another exemplary view of the coupler design shown in FIG. 8C placed in the plurality of layers of the PCB assembly shown in FIG. 8A.
Figure 8E:
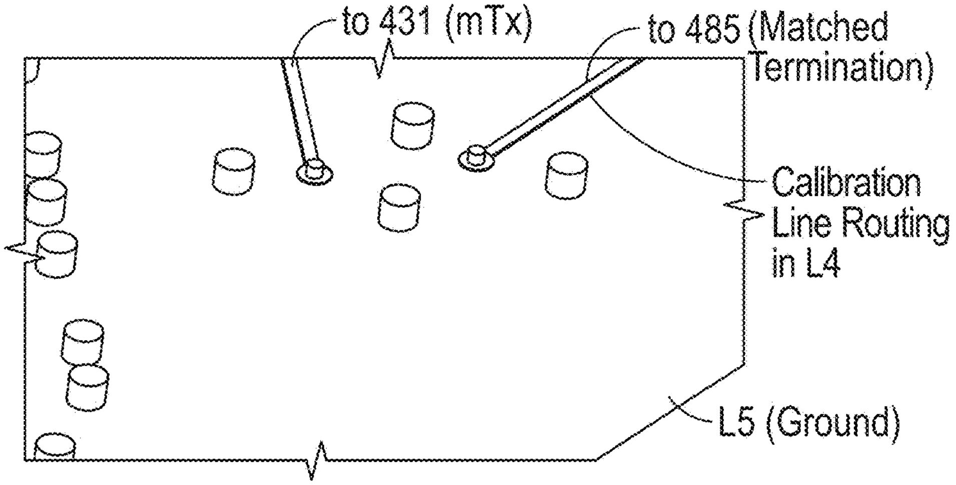
FIG. 8E is another exemplary view of the coupler design shown in FIG. 8C placed in the plurality of layers of the PCB assembly shown in FIG. 8A.

Referring to FIGS. 8C-8E, an exemplary configuration for a coupler 462 for calibration is provided. This particular coupler 481 is implemented along the Rx routing (L2) between the FEM and the 90-degree hybrid coupler 462. The coupled line is disposed on L3 (FIG. 8D) with a narrow cut on the L3 ground plane and the routing back to the mTx port 431 and the RF matched load termination 485 is disposed on L4 (FIG. 8E). In another embodiment, the coupled line section may be disposed on L4, but with a lower coupling ratio.

When the calibration coupler is implemented between the antenna and FEM, the coupler is visible by the antenna and it can therefore modify the load impedance presented (by the FEM) to the antenna. This in turn might disturb the periodic nature of the antenna array (some elements have couplers, others not) and cause increased side-lobe levels.

To remove the periodicity issue, the coupler features of FIGS. 8C-8E can be implemented on every antenna and in most of the cases, the routing on L4 can be terminated with a matched load at both ends (rather than going to mTx or mRx), leaving only a few antennas with physical connection to the mTx/mRx ports. Even though every antenna would have the same impedance in the mentioned approach, power is drawn from every antenna and FEM, whether the coupler 481 is routed to mTx/mRx ports and makes use of them or not. Such approach would in turn reduce the antenna efficiency for the Tx array and noise figure and G/T for the Rx array (depending on which port the coupler is placed between the 90-deg hybrid and FEM).

Instead, one could add all the features on FIGS. 8C-8E to every antenna to make sure the impedance discontinuities due to the cuts along L3 ground plane is common between antennas. However, include routing (on L4) traces in only a few cases, rather than all. This configuration would in turn reduce the impact on antenna efficiency while mostly (albeit not completely) preserving the impedance consistency. For example, if the coupler shown in FIG. 8C-8E is a −10 dB coupler (approximately 0.45 dB or 10% power loss) and with L4 routing on one antenna in every DBF block (of 16 antenna), the average efficiency loss per antenna in the 16-element block would be approximately 0.6%, which is a reasonable trade-off.

Such coupling may be suitable for over-the-air calibration methods. For example, sending and receiving mTx and mRx signals over the air to or from other operations antennas, as described in U.S. patent application Ser. No. 15/931,443, filed May 13, 2020 and entitled "OVER-TIE-AIR CALIBRATION OF ANTENNA SYSTEM" the disclosure of which is hereby incorporated by reference in its entirety.

Over-the-Air Calibration

As illustrated in FIG. 4A, two signal path configurations are contemplated for over-the-air calibration signals. The DBF either might (1) be capable of sending and receiving the calibration signals through the functional RFIO paths (e.g., 457) or it might (2) have dedicated paths and pins (mTx and mRx) to transmit and receive calibration signals (e.g., 465, 467).

Regarding calibration through the RFIO path, in this mode of operation, every antenna element can be used as a calibration antenna (in addition to an antenna's normal operation for communication). As illustrated in FIG. 9C, to calibrate the Rx array of DBF chips 607 and 608, one of the RFIO paths (e.g., for antenna 613*a*) in DBF chip 607 might be in Tx mode outputting a CDMA-based calibration signal through the FEM 636 (that should also be in Tx mode with power amplifier PA 623 amplifying the signal). This outputted signal S3 might be received by nearby antenna elements, of which the FEM (LNA 624) and the RFIO paths are in Rx mode (to listen to the calibration signals). Such operation would allow the same calibration signal to be received by multiple Rx paths by antenna elements 613 in DBF chip 607 and antenna elements 614 in DBF chip 608 to create a set of (relative) mutual coupling data/measurements among multiple antennas. This set of data can be compared to the pre-existing mutual coupling data (acquired in factory) expected from a fully-calibrated Rx array. Any difference in magnitude/phase of the measured data might be interpreted as error happened in field (for example, due to aging or change of temperature) and corrected accordingly to match to the expected mutual coupling data.

Figure 9A:
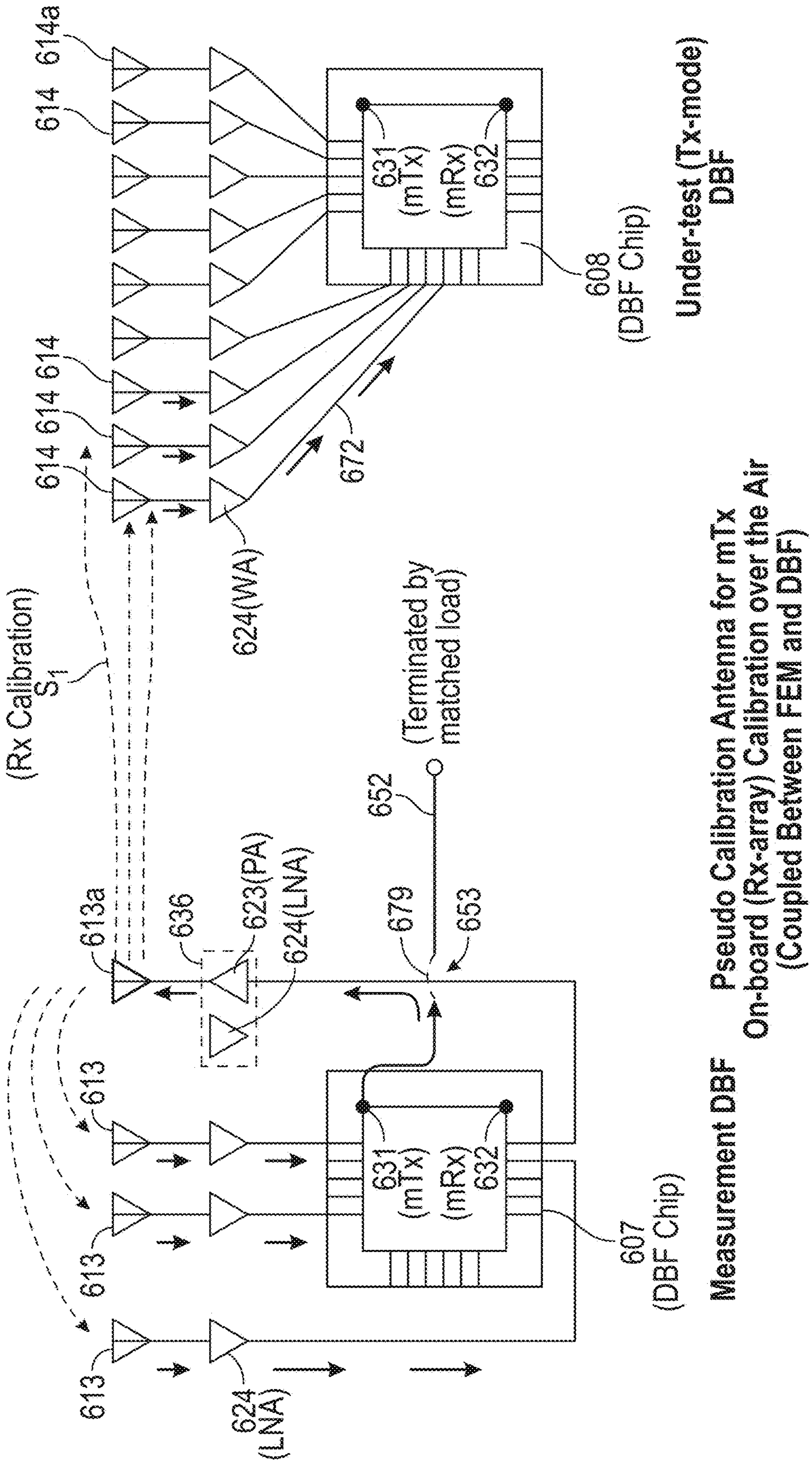
FIG. 9A is an exemplary schematic showing circuitry and signal paths for a beamformer calibration system in accordance with some embodiments of the present disclosure.
Figure 9B:
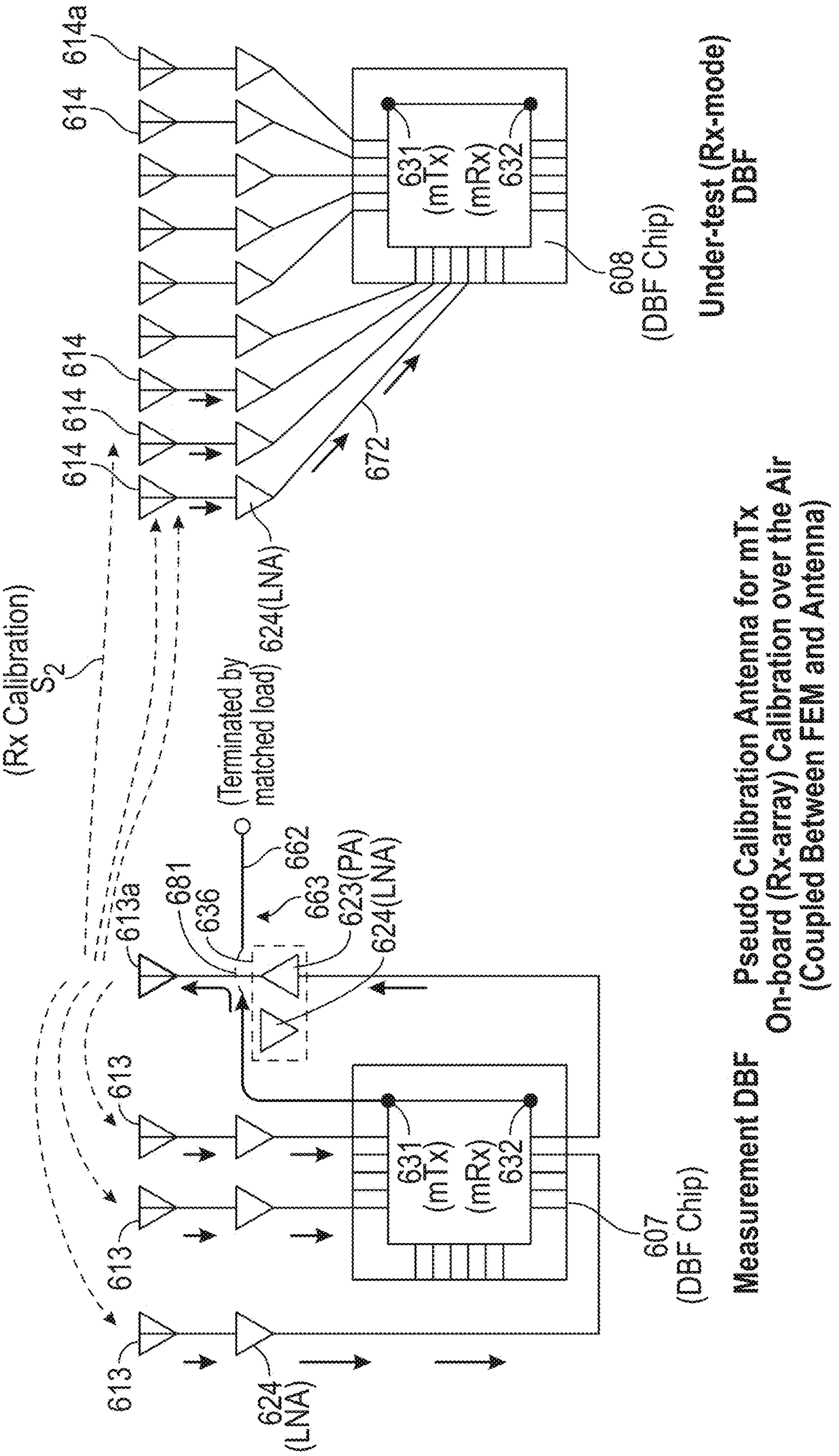
FIG. 9B is an exemplary schematic showing circuitry and signal paths for another beamformer calibration system in accordance with some embodiments of the present disclosure.
Figure 9C:
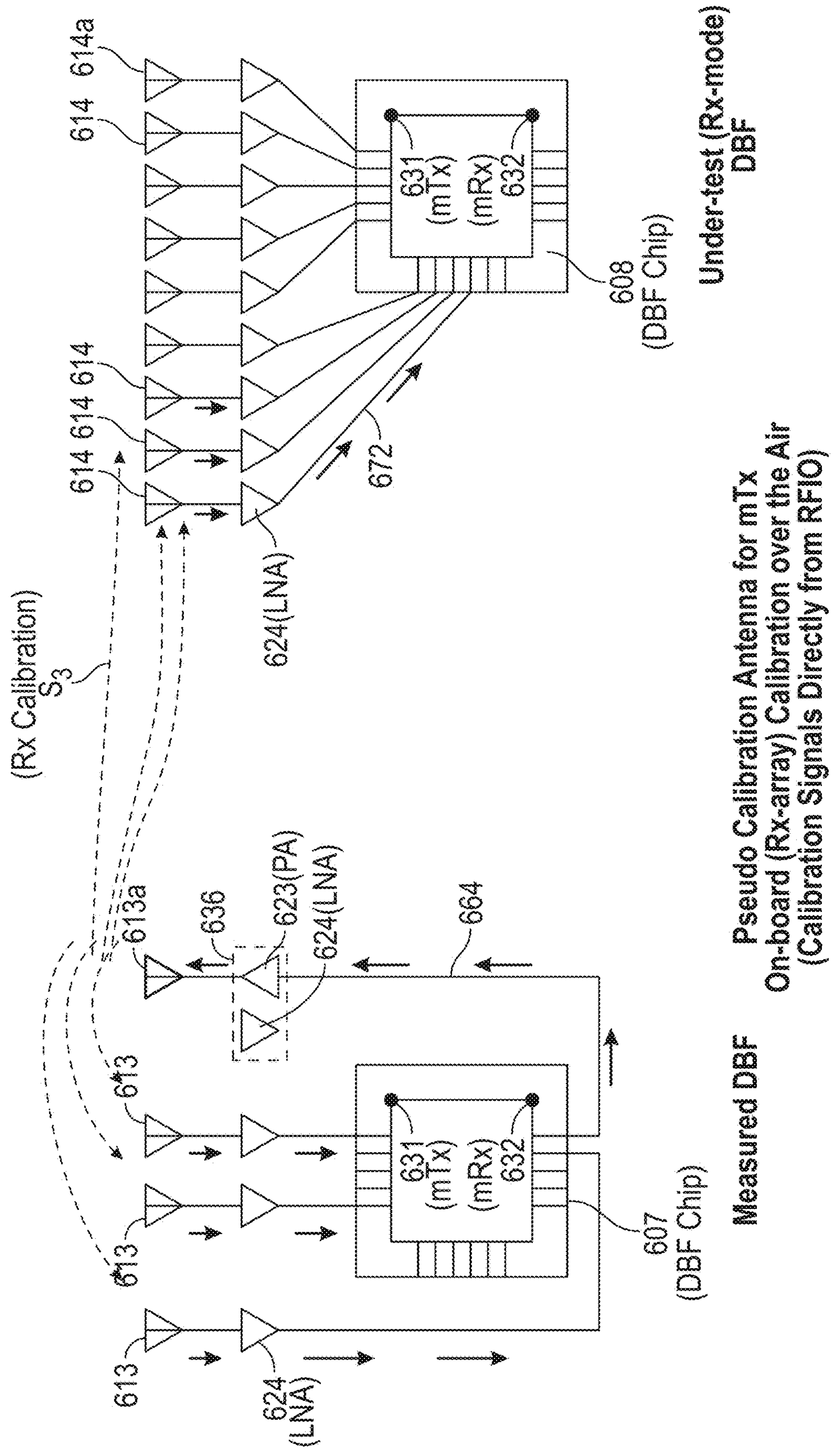
FIG. 9C is an exemplary schematic showing circuitry and signal paths for another beamformer calibration system in accordance with some embodiments of the present disclosure.
Figure 9D:
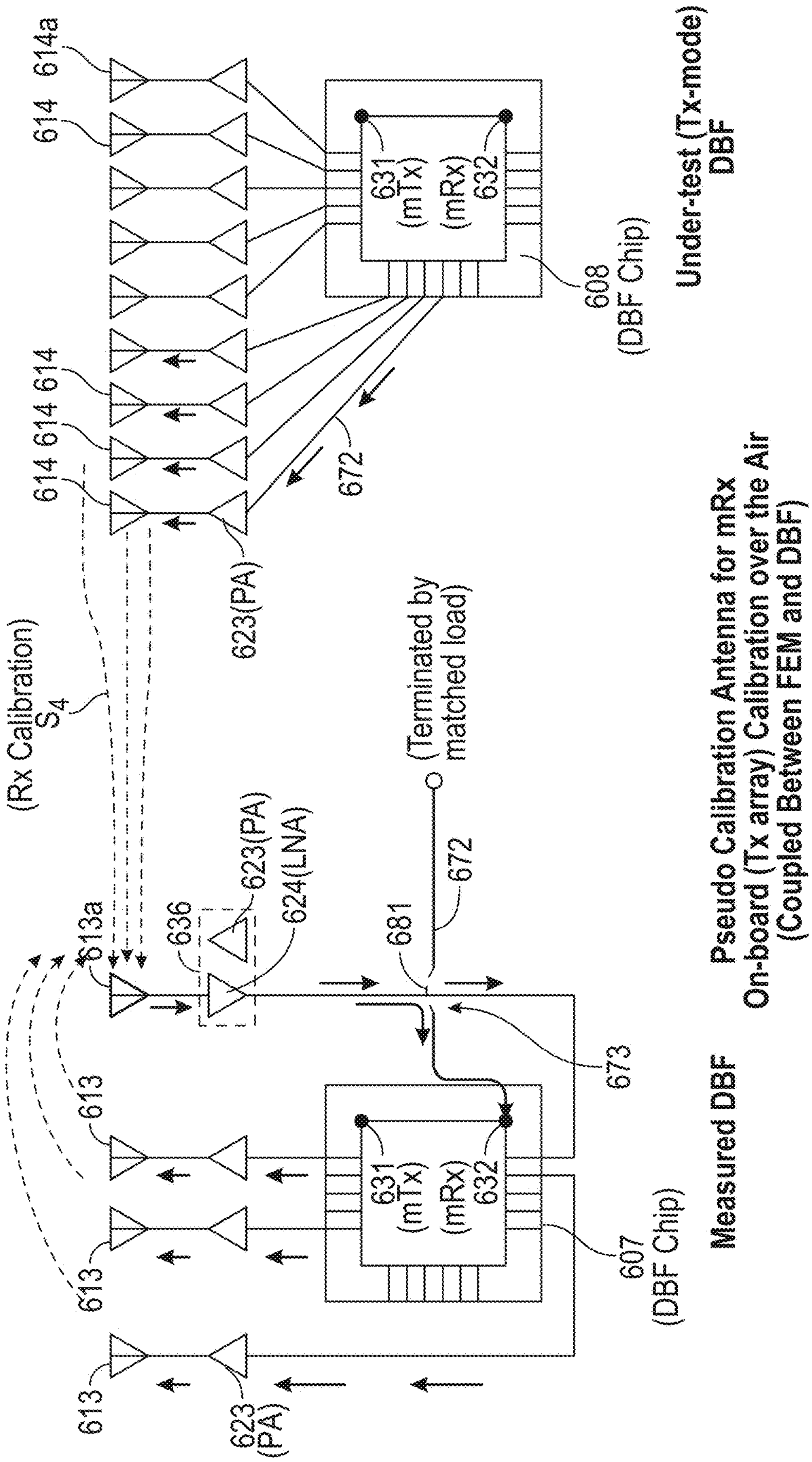
FIG. 9D is an exemplary schematic showing circuitry and signal paths for another beamformer calibration system in accordance with some embodiments of the present disclosure.
Figure 9E:
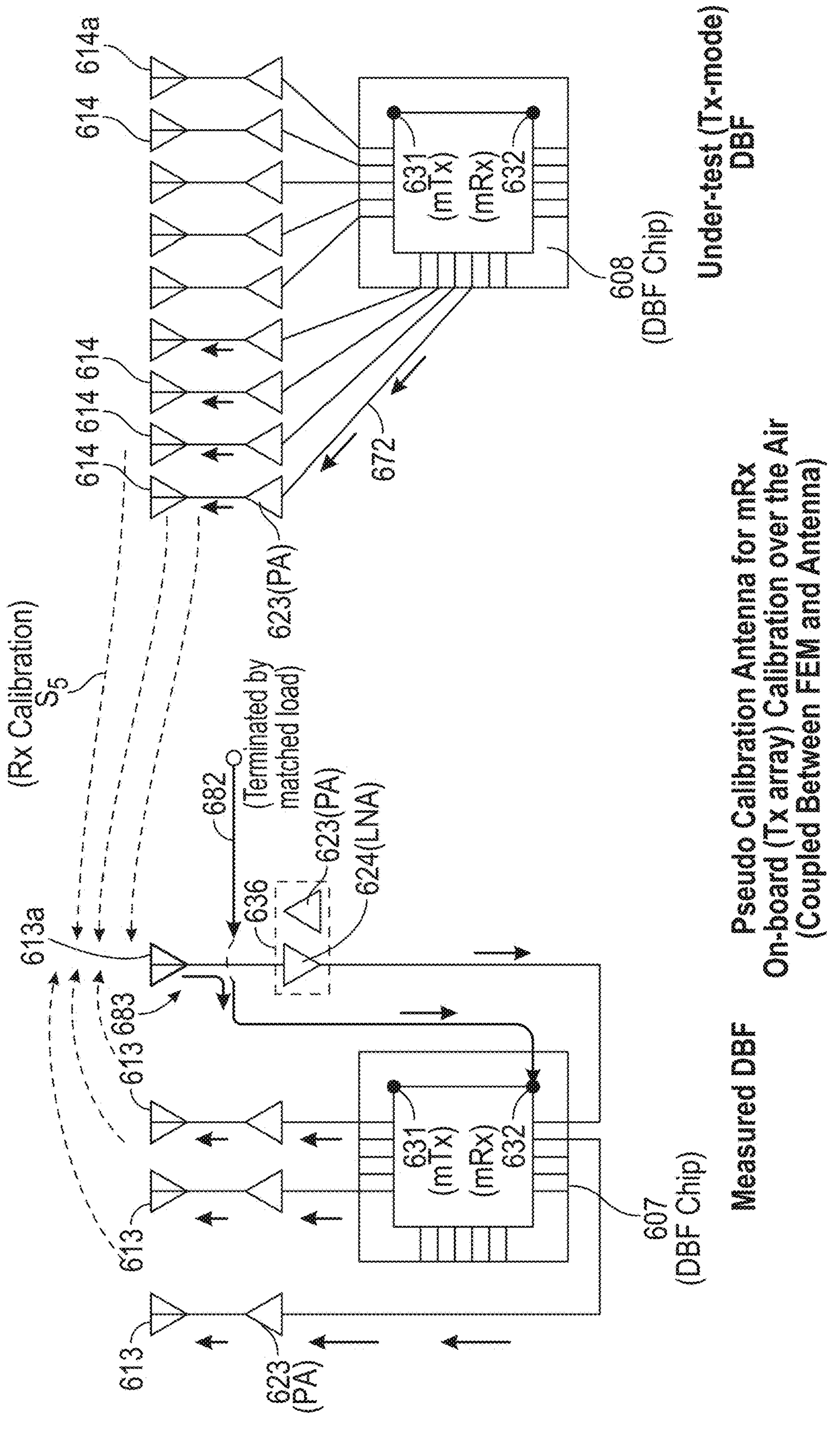
FIG. 9E is an exemplary schematic showing circuitry and signal paths for another beamformer calibration system in accordance with some embodiments of the present disclosure.
Figure 9F:
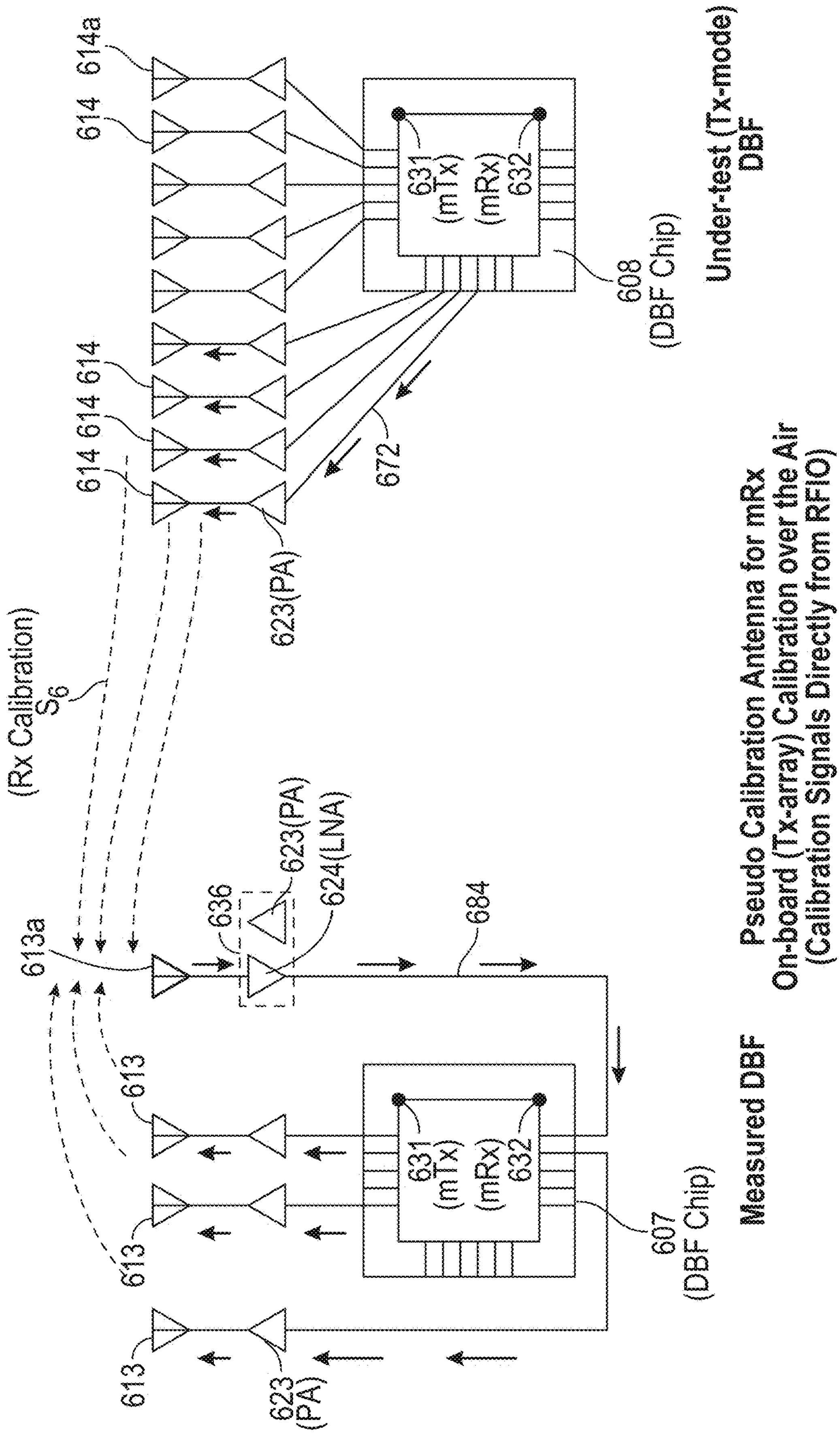
FIG. 9F is an exemplary schematic showing circuitry and signal paths for another beamformer calibration system in accordance with some embodiments of the present disclosure.

Calibrating the Tx array with a similar method is illustrated in FIG. 9F, with the calibration RFIO to FEM to antenna path 613*a* being in Rx mode (LNA 624), receiving signal S6, and the nearby antenna elements 613 and 614 in Tx mode (PA 623) and under normal operation.

Such operation would allow multiple Tx signals from multiple nearby antenna elements to be received by the calibration receiver MRx path by antenna element 613*a* in DBF chip 607 to create a set of (relative) mutual coupling data/measurements among multiple antennas. This set of data can be compared to the pre-existing mutual coupling data (acquired in factory) expected from a fully-calibrated Tx array. Any difference in magnitude/phase of the measured data might be interpreted as error happened in field (for example, due to aging or change of temperature) and corrected accordingly to match to the expected mutual coupling data.

Using solely RFIO paths to transmit and receive during calibration has challenges. One challenge is the dynamic range on the functional Rx paths (FEM-LNA and RF Rx portions of DBFs) and/or large tuning range on the functional Tx paths (FEM-PA and/or RF Tx portions of DBFs). The normal operation of the user terminal phased array has sensitive receive paths to be able to sense low power satellite signals, and relatively higher power transmit signals to be able to reach the satellites. With a measurement loop between those Tx and Rx paths on the same user terminal (to collect internal mutual coupling data) the Tx paths might easily overpower and saturate the sensitive Rx paths.

To avoid this saturation, the Tx paths (in Tx portions of DBF or inside the FEM-PA) can be configured to be capable of reducing the RF gain (along that path) to a much lower value (compared to normal operation) during calibration so that the outputted calibration signals (going to the neighbor antennas) are low-enough power (for Rx paths to be not saturated).

Similarly, to calibrate the Tx array, the Rx paths should have enough (most probably tunable) dynamic range such that they can both receive the satellite signals and the normal higher power Tx signals during calibration without corrupting the data due to saturation. Because these calibration modes on the RFIO paths demand unnecessary (compared to the normal mode of operation) ranges of operation on all of these RF paths, in some cases it may be more feasible to create one dedicated Rx and one dedicated Tx path per DBF (with much larger dynamic range and tune-ability) to be used for calibration (hence mRx and mTx dedicated receive and transmit paths).

Calibration through mTx 631 or mRx 632 involves dedicated receive and transmit paths for the calibration signals to be transmitted or received. These dedicated paths can be designed and/or tuned with the expected mutual coupling (between antennas) values in mind. Therefore, the dedicated paths may be more suitable to handle the expected signal power levels during the calibration mode.

In some embodiments, the mRx and mTx ports may be connected to dedicated antennas for mutual coupling measurements. These dedicated antennas can be selected from one of the regular antennas (from the main antenna lattice) to be used by those ports or might be a separate antenna placed between the regular antennas in the lattice. However, both of these options will have degrading impact on the side lobe performance of the antenna array because, in either case, the periodicity of the lattice is being disturbed.

Referring to FIGS. 9A-9F, different designs for over-the air calibration of antenna elements are provided. Referring to FIGS. 9A-9C, three approaches for Rx array calibration are provided. Referring to FIGS. 9D-9F, three approaches for Tx array calibration are provided. In the examples of FIGS. 9A-9C for Tx array calibration, the calibration antenna 613*a* of the DBF 607 on the left is sending a calibration signal (S1, S2, or S3) to be received by the DBF 608 on the right for calibration of DBF 608 on the right or by the other functioning antennas in the DBF 607 on the left. In the examples of FIGS. 9D-9F, the calibration antenna 613*a* of the DBF 607 on the left is receiving a calibration signal (S4, S5, or S6) from the DBF 608 on the right or from the other functioning antennas in the DBF 607 on the left for calibration of DBF 607 on the left.

As seen in FIG. 9A, the mRx 632 and mTx 631 pins of the DBF 607 can be routed to couple at coupler 679 to the normal RF paths along the RFIO routing between DBF and FEM (for example, see coupler 479 in FIG. 4A). In another configuration as seen in FIG. 9B, the Tx/Rx antenna can be routed to couple at coupler 681 to the normal RF paths along the RFIO routing between the 90-deg hybrid coupler and FEM (for example, see coupler 481 in FIG. 4A).

The coupler 481 can be a 90-degree hybrid coupler with 4 ports; one for mTx (or mRx), two for antenna and FEM sides and one for matched termination. An example of a 90-degree hybrid coupler 481 between the FEM and the 90-degree hybrid coupler is shown in FIG. 8C-8E. The coupler can be chosen to be directional or non-directional, to be able to connect mTx or mRx from both sides of the routing and use the same coupler by two DBFs (in this case, matched load is replaced with another mTx or mRx of a different DBF chip).

In another embodiment of the present disclosure, a non-90-degree hybrid coupler can also be implemented inside the antenna cavity (not-shown in figures), by routing the calibration lines in and out of the antenna cavity. With a controlled distance and orientation to the slots, a suitable coupler with desired coupling levels can be implemented.

In the case of calibrating the Rx array with mTx coupler between FEM and antenna, FIG. 9B illustrates the modes of operation for the DBFs and FEMs and the signal flow along different paths. All of the FEMs and the RFIO paths can be in Rx mode, while the mTx outputs the CDMA calibration signals from the dual-use antenna. Any neighbor antenna will be listening to the calibration signals coming from the dual use calibration antenna 613*a*. The mTx section of DBF is responsible to adjust the power levels while measuring different neighbor antennas, which might have very different coupling levels to the dual-use calibration antenna. The coupling level of the mTx coupler can also be designed to make sure the mean power level is at the right value, even though the dynamic adjustment has to be done inside the mTx section of DBFs.

In the case of calibrating the Rx array with mTx coupler between FEM and DBF, FIG. 9A illustrates the modes of operation for the DBFs and FEMs and the signal flow along different paths. All the FEMs associated with the antennas are in Rx mode, except the FEM associated with the dual use calibration antenna 613*a*, which is in Tx mode because it will output the mTx calibration signals. All of the RFIOs are in Rx mode, except the calibration path, which is not relevant to this mode of operation and can be calibrated by mTx of another DBF. Any neighbor antenna will be listening to the calibration signals coming from the dual-use antenna. The mTx section of DBF is responsible to adjust the power levels while measuring different neighbor antennas, which might have very different coupling levels to the dual-use calibration antenna. The coupling level of the mTx coupler can also be designed to make sure the mean power level is at the right value, even though the dynamic adjustment has to be done inside the mTx section of DBFs.

In the case of calibrating Tx array with mRx coupler between the FEM and DBF, FIG. 9D illustrates the mode of operation for DBFs and FEMs and the signal flow along different paths. All the FEMs are in Tx mode, except the one being used for the calibration path, which is in RX mode to collect the calibration signals coming from other antennas. Therefore, the LNA (in the FEM) handles the Tx calibration signals coming from other antennas, without being saturated. All of the RFIOs are in Tx mode, except the one being used for the calibration path, which is not relevant to this mode of operation and will be calibrated by mRx of another DBF. Any neighbor antenna will be radiating calibration signals, sequentially or in parallel, depending on how many independent CDMA signals can be created and/or processed (in the DBFs) at a time. The calibration signals will go through the dual-use antenna, through the LNA in FEM, the mRx coupler, and into the mRx portion (then calibration computing section) of the DBF to complete the measurement and acquire the relative mutual coupling data.

In the case of calibrating Tx array with mRx coupler between the FEM and antenna, FIG. 9E illustrates the mode of operation for DBFs and FEMs and the signal flow along different paths. All the FEMs and the RFIOs can be in Tx mode, while the mRx listens to the calibration signal coming from those paths by the dual-use antenna. Because the LNA of the FEM is not part of the mutual coupling path in this scenario, it does not need to be capable of handling the TX calibration signals (less requirement from FEM chip). One advantage of mRx coupling between antenna and FEM is to relax the requirements on the LNA of the FEM.

The cases described above suggests one coupler per mRx or mTx, indicating there will be one dual-use antenna for mRx/mTx in each antenna group of a DBF. As a non-limiting example, this indicates one calibration antenna in every 16 elements, assuming 16 RFIO per DBF (see FIG. 4A). Each of those calibration antennas measures a minimum number of antennas (for example, 16 or more) such that the groups of antennas measured by different calibration antennas cover the entire antenna array with enough overlap between different groups. The overlap between different groups might be used to calibrate each group of antennas relative to each other and make the entire antenna array coherent.

It is possible to have multiple couplers per mRx/mTx routing, connecting a single calibration port to multiple antennas. This would increase the density of the dual-use antennas and reduce the distance and number of antennas to be covered by each dual-use calibration antenna. As a non-limiting example, the mRx calibration traces could be routed and coupled to multiple RFIO lines (belonging to different DBFs) before being terminated by a matched load. This would provide multiple dual-use antennas to the same mRx port during TX array calibration. The operation scheme illustrated in FIG. 9D might be slightly modified: all the FEMs and RFIOs are in TX mode except the paths that mRx couples to. Among those coupled paths, only one of them might have the FEM in RX mode while the others have the FEM shut OFF. The coupled RFIO paths are not relevant to this mRx (and can be shut OFF) and can be calibrated by mRx of another DBF. By using each coupled path sequentially, the single mRx port can either have a larger reach of aperture area and/or reduce the aperture area covered by a single dual-use antenna (hence limit the dynamic range of antenna mutual coupling magnitudes).

Referring to FIG. 9A, Rx calibration can be performed by using the DBF calibration measurement mTx 631 and connecting it to calibration line 652 for coupling at coupler 653 to the line extending between the calibration antenna 613*a* and the DBF 607. In this embodiment, calibration line 652 couples between the DBF 607 and the amplifier block 636 for calibration antenna 613*a*. The signal received from the mTx port 631 is then transmitted by the calibration antenna 613*a*.

As seen in FIG. 9A, a plurality of regular antennas 613 are coupled to the DBF 607 by a plurality of radio frequency in/out (RFIO) pin connections corresponding to each of the plurality of antenna elements 613 and configured for receiving (Rx) communication. Although the plurality of antennas 613 are shown as being configured for only Rx communication, each antenna 613 may be designed for switching between Rx and Tx communication.

The calibration antenna 613*a* corresponding to the DBF 607 is configured in an opposite configuration as the other antenna elements 613. In that regard, the FEM block 636 for the specific calibration antenna 613*a* is switched from LNA to PA for calibration mode. Such switching allows the calibration antenna 613*a* to be a nominal array element during operation, but then turn into a calibration antenna during calibration mode.

The calibration antenna 613*a* is configured for transmitting (Tx) a signal from the measurement calibration port mTx 631 of the DBF 607 (for example, using calibration line 652 and a −20 dB coupler 653). The calibration signal S1 sent by the mTx port of DBF 607 can be sensed over the air by the antennas 613 and 614 under test in Rx mode of DBFs 607 and 608, and DBFs 607 and 608 can be aligned with respect to each other and with respect to the signal from the mTx port 631 of DBF 607.

As discussed above, the calibration antenna 613*a* may be designated specifically for calibration and/or may be configured for normal communication when not in calibration mode. Likewise, one or more of any of the other antenna elements 613 associated with DBF block 607 may be configured as calibration antennas.

Referring to FIG. 9B, in another configuration, Rx calibration can be performed by using the DBF measurement Tx (mTx) port 631 and connecting it to a calibration line 662 for CDMA coupling at coupler 663 with the line extending between the calibration antenna 613*a* and the DBF 607. In this embodiment, calibration line 662 couples between the antenna 613*a* and the amplifier block 636. The mTx port 631 bypasses the amplifier block 636 and excites the calibration antenna 613*a* directly to send calibration signals S2 over the air to be received by the antennas 614 under test in Rx mode.

Referring to FIG. 9C, Rx calibration can be performed without using the DBF measurement Tx (mTx) port 631. If the DBF is capable of sending calibration signals through regular RFIO lines directly (instead of through an mTx port), any antenna radio frequency path (such as the line between the calibration antenna 613*a* and the DBF 607) can be used as a calibration antenna path to transmit calibration signals S3.

Referring to FIGS. 9D-9F, similar calibration configurations are explained, but for a Tx calibration scenario. Referring to FIG. 9D, Tx calibration can be performed by using the DBF measurement Rx (mRx) 632. Antenna signals S4 are transmitted from antenna elements 613 of DBF 607 and 614 of DBF 608. The signal S4 travels to the mRx port 632 via calibration line 672 by CDMA coupling by coupler 673 with the line extending between the calibration antenna 613*a* and the DBF 607. In this embodiment, the calibration line 672 couples between the DBF 607 and the amplifier block 636 for calibration antenna 613*a*.

Referring to FIG. 9E, in another configuration, Tx calibration can be performed by using the DBF measurement Rx (mRx) 632. The signal S5 travels to the mRx port 632 via calibration line 682 by coupler 683 with the line extending between the calibration antenna 613*a* and the DBF 607. In this embodiment, the calibration line 682 couples between the calibration antenna 613*a* and the amplifier block 636 for calibration antenna 613*a*.

Referring to FIG. 9F, in another configuration, Tx calibration can be performed without using the DBF measurement Rx (mRx). If the DBF is capable of receiving calibration signals through regular RFIO lines directly (instead of through an mRx port), any antenna RF path (such as the line between the calibration antenna 613*a* and the DBF 607) can be used as a calibration antenna path to receive calibration signals S6 over the air by antenna 613*a* under test when DBF 607 is in Tx mode.

In-Line Calibration

Referring to FIGS. 10A-13D, in another embodiment of the present disclosure, the calibration structure can be designed such that the physical path of the mutual coupling measurements can be entirely through transmission lines embedded within the PCB layers. The advantageous effect of such "in-line" calibration (as compared to over-the-air calibration) is that the calibration system is within the layers of the PCB assembly and is, therefore, more immune to external environmental factors (such as rain and/or snow) which may affect the antenna array.

For an in-line calibration method, the coupling locations inside the PCB layers may bypass the passive antenna elements that, in some embodiments, can be located outside the PCB (e.g., patch elements can be implemented as separate layers that are not part of PCB lamination). Therefore, any component along the FEM to antenna routing that is excluded from the mutual coupling path (for calibration measurements) will not be part of the calibration process. Such components, like the antenna hybrid couplers and the antenna elements can be assumed to be identical or at least change their behavior identically (e.g. under temperature swings), and therefore, are not assessed in the calibration process. During factory alignment, the FEM output levels (phase and magnitude) are measured (at the coupling locations inside the PCB) by the mTx and mRx sections of the beamformer and later used as reference/lookup table for continuous calibration process during operation (in the field) .

Figure 10A:
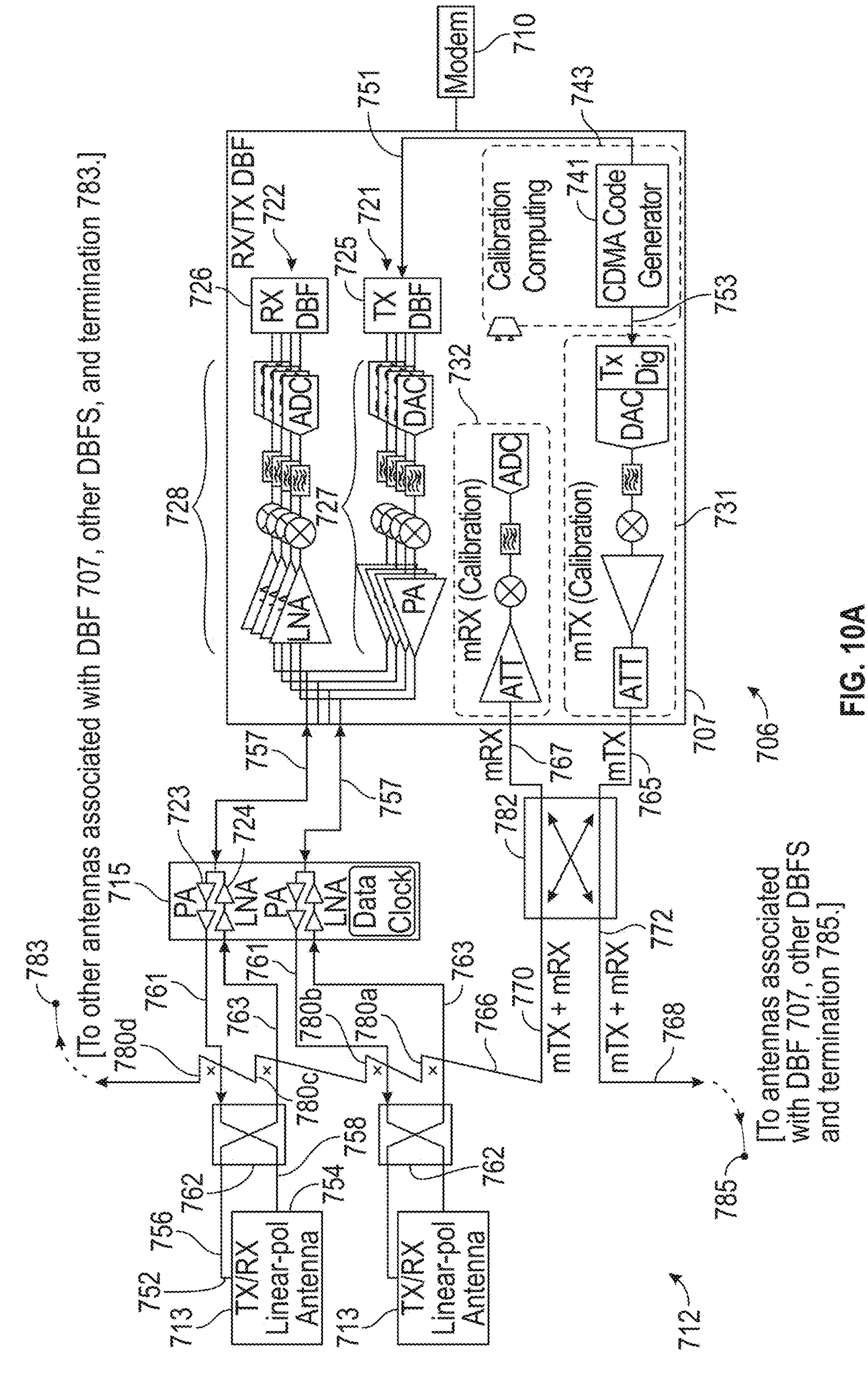
FIG. 10A is an exemplary illustration showing a simplified block diagram of an RF path for an antenna assembly including a dual-linear polarized antenna, 3-dB 90-deg hybrid, TX/RX front-end-module (FEM) chip, and digital beam former (DBF) chip connected with one or more in-line calibration line, in accordance with some embodiments of the present disclosure.
Figure 10B:
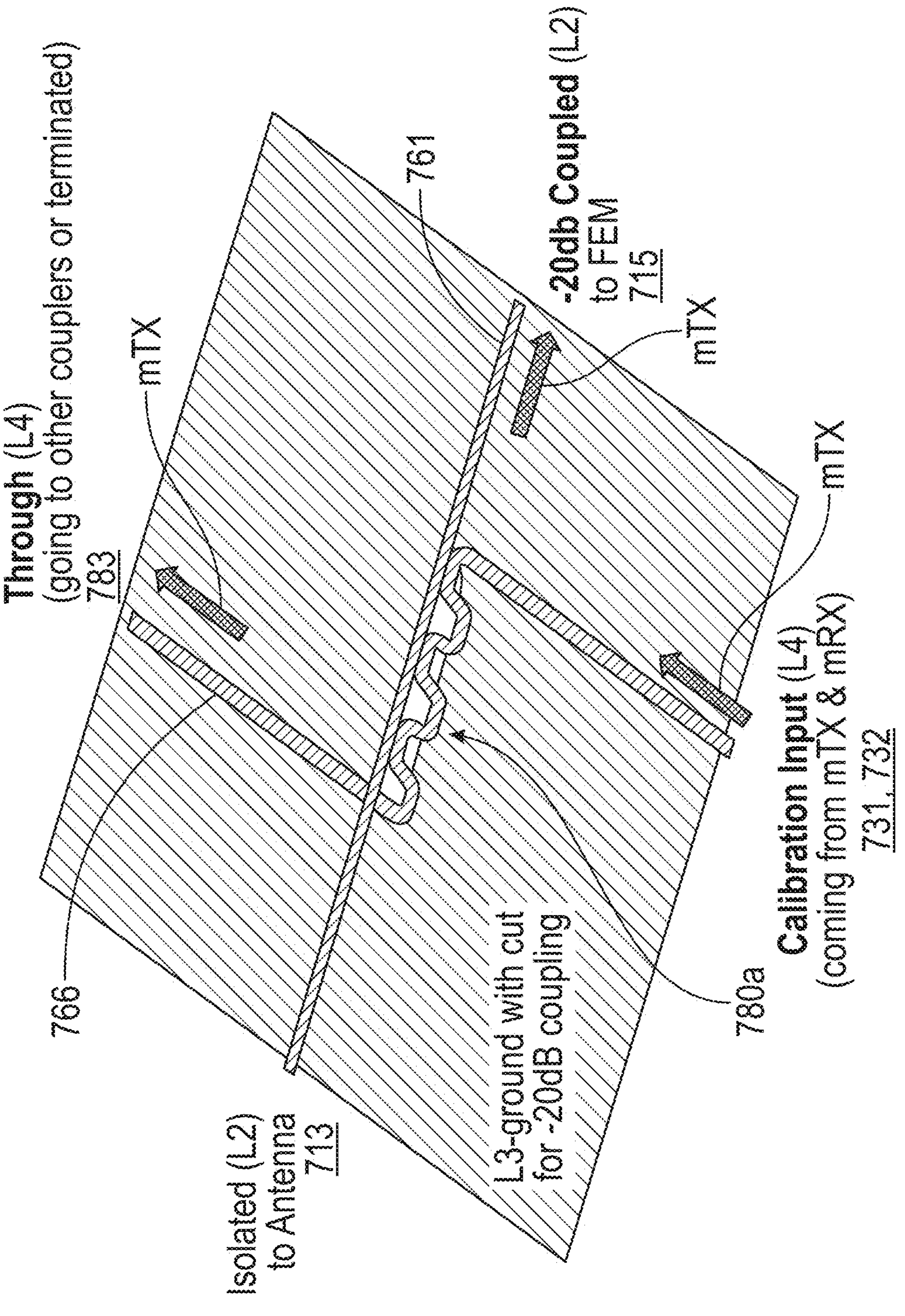
FIG. 10B is an example illustration of a directional coupler for coupling an antenna feed line with an in-line calibration line, in accordance with some embodiments of the present disclosure.

Referring to FIG. 10A, in accordance with one embodiment of the present disclosure, a phased array antenna system 700 includes a beamformer lattice 706 including a plurality of DBF chips 707 (also called DBFs 707), a front end module (FEM) lattice including a plurality of FEM chips 715, and an antenna lattice 712 including a plurality of antenna elements 713, and 90-degree hybrid couplers 762 disposed between each antenna element 713 and each FEM chip 715.

FIG. 10A shows a schematic block diagram of an exemplary DBF chip 707 used in controlling the phase and amplitude of the RF signals going into and coming from the antenna elements 713 (hence creating the "beam"). The DBF chip 707 has functional RF Tx/Rx portions 721 and 722 (including various components such as Rx and Tx DBF sections 725 and 726, PAs/LNAs, mixers, filters and DAC/ADC, see Tx components 727 and Rx components 728), dedicated RF sections for calibration and measurement (mTx and mRx) 731 and 732, and a calibration computing section 743 including a calibration CDMA code generator 741.

The phased array antenna system can include front end components or one or more front end module (FEM) chips 715 that interface with the DBF chips 707 and the antenna elements 413. For example, the FEM chip 715 can couple the DBF chip 707 with M antenna elements 413. In some examples, the FEM chip 715 can include frontend integrated circuits, modules, devices, and/or any other type of frontend package and/or component(s). In some cases, the FEM chips 715 can include multiple-input, multiple-output (MIMO) frontend interfacing with multiple antenna elements and one or more DBF chips. In some embodiments, some components of the FEM chip 715 may be disposed within the DBF chip 707 and vice versa.

Transmit and receive calibration sections (mTx and mRx) 731 and 732 are RF coupled to each of the antenna elements 713 in the array. Transmit and receive calibration sections (mTx and mRx) 731 and 732 are configured to facilitate obtaining calibration measurements so as to adapt transmit (Tx) and receive (Rx) sections 721 and 722, respectively, to compensate for phase and/or time delay mismatch produced by DBF 707, or other DBF chips in the beamformer lattice 706, PCB traces, associated antenna elements, and/or associated antenna element circuitry.

As described above, each DBF 707 is configured to both digitally process a first data signal, stream, or beam of a single channel for transmission by a first plurality of antenna elements; to receive a second data signal, stream, or beam of a single channel using a second plurality of antenna elements; and to digitally recover/reconstitute the original data signal underlying the received signal.

The first and second plurality of antenna elements may be the same or different from each other. In the illustrated embodiment, the antenna elements are configured for both sending (Tx) and receiving (Rx) signals. However, in other configurations, certain antenna elements may be configured for one of sending (Tx) and receiving (Rx).

As described above, phase, time delay, and/or amplitude offsets can occur after an antenna system has been fully calibrated prior to the start of normal operations using individual probe measurements, processing-intensive computations, and setting of electrical components included in the antenna system based on the measurements and computations. As mentioned above, an exemplary full calibration scheme may be park and measurement, park and measurement calibration, factory calibration and/or the like. During normal operation, park and measurement calibration may not be possible. Thus, calibration techniques for calibrating signals can be used to identify and appropriately pre-compensate for phase, time delay, and/or amplitude offsets that occur after (or in between) park and measurement calibrations. Such offsets comprise deviations from the particular phase, time delay, and amplitude settings associated with electrical components from park and measurement calibration. At least some of the deviations from park and measurement calibration can be due to temperature variations during normal operation. Other self-calibration systems that do not require factory calibration may also be within the scope of the present application.

Each antenna element of the phased array antenna and its associated transmit and/or receive circuitry undergoes a similar calibration procedure periodically during operation. Such measurements and calibration based on the measurements can be performed simultaneously with or independent of normal operation of the phased array antenna (e.g., during transmit and receive of regular or normal signals in the phased array antenna) or during antenna down time. In some embodiments, the calibration process incorporates a waveform CDMA code generator 741 electrically coupled to each of the transmit (Tx) section 721 and the calibration receive section (mRx) 732 and the receive (Rx) section 722 and the calibration transmit section (mTx) 731 for correlation and calibration. Single tone (CW) based calibration is also within the scope of this application.

In the illustrated embodiment of FIG. 10A, an in-line calibration system in accordance with embodiments of the present disclosure includes a plurality of calibration lines 766 and 768 coupled to the mTx and mRx lines 765 and 767 from the associated mTx and mRx calibration sections 731 and 732 of the DBF chip 707. In the illustrated embodiment, the calibration lines 766 and 768 end at respective terminations 783 and 785.

The calibration lines 766 and 768 may be configured for carrying signals between (to or from) the mTx and mRx calibration sections 731 and 732 and the respective receive and transmit sections 721 and 722 of the DBF chip 707. For example, an mTx calibration signal is sent via line 766 from mTx calibration section 731 and is received by the coupled antenna feed lines 761 and 763 for antenna elements 713 for processing by receive section 728 of the DBF chip 707 during antenna down time. Any difference between the expected waveform (regarding phase, magnitude, and time delay) and the received signal by receive (Rx) section 728 of the DBF chip 707 can be corrected in the DBF chip 707.

Likewise, Tx signals from the transmit section 727 of the DBF chip 707 may be received by mRx calibration section 732 of the DBF chip 707. Any difference between the received signal at mRx section 732 and the expected waveform (regarding phase, magnitude, and time delay) can be corrected in the DBF chip 707.

The calibration lines 766 and 768 include a plurality of couplers 780*a*, 780*b*, 780*c*, 780*d* for gently sensing or probing individual antenna feed lines 761 and 763 without disturbing the RF behavior of the antenna feed lines 761 and 763. The couplers may be weak couplers, such as a −20 dB or lower couplers (for example, having a minimum coupling level of −41 dB). In the illustrated example of FIG. 10B, the couplers 780*a*, 780*b*, 780*c*, 780*d* are shown as directional couplers disposed in series along a single calibration line, which are designed for being isolated from coupling with the antenna elements 713, but coupling in the direction of the FEM chip 715 and the DBF chip 707. In this manner, the calibration system is isolated from effects of the environment that may affect signals emanating to and from the antennas 713.

In the illustrated embodiment, the 90-degree hybrid coupler 762 and the antenna elements 713 are assumed to be identical or change (due to temperature or aging) identically or nearly identically during operation, and therefore are not part of the measurement path/loop. During factory alignment, the FEM output levels (phase and magnitude) are measured by the mTx and mRx calibration sections 731 and 732 of the beamformer chip 707 using CDMA codes. The mRx and mTx calibration data stores FEM output levels (phase and magnitude) using CDMA codes referenced between the FEM chip 715 and the 90-degree hybrid coupler 762 corresponding to each antenna element 713. In the field, FEM outputs are periodically measured and compared to the mTx and mRx factory data. Any differences are corrected in the DBF chip 707 and the panel will be realigned.

Other coupler designs are within the scope of the present disclosure. For example, the weak (calibration) couplers may be directional or bi-directional depending on the design of the calibration system. For example, referring to FIG. 10A, the calibration couplers 780*a*, 780*b*, 780*c*, 780*d* may be located between the antenna elements 713 and the 90-degree hybrid coupler 762. In this configuration, the measurement loop includes the 90-degree hybrid coupler 762. In another example, the calibration couplers 780*a*, 780*b*, 780*c*, 780*d* may be located across the antenna elements 713 (for example, if the antenna elements are part of the PCB stackup, see FIG. 6E).

Figure 10C:
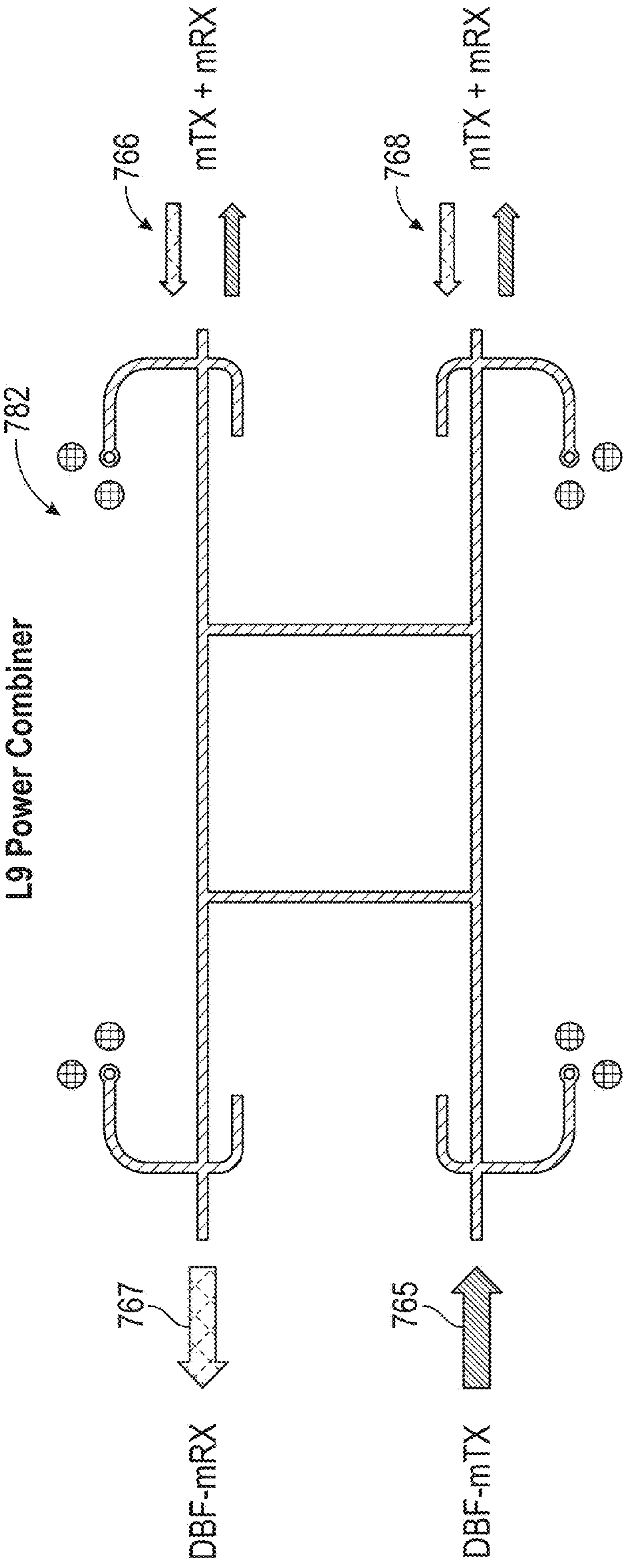
FIG. 10C is an exemplary illustration of a DBF TX/RX calibration signal power combiner, in accordance with some embodiments of the present disclosure.

In one embodiment of the present disclosure, the calibration lines 766 and 768 are capable of transferring either mTx or mRx signals, or both, from or to the respective mTx and mRx calibration sections 731 and 732 of a DBF chip 707. Referring to FIG. 10C, a combiner/divider 782 is used for merging mTx and mRx paths from the mTx and mRx outputs 765 and 767 of the DBF chip 707 on the same calibration lines 766 and 768. The arrows in the combiner/divider 782 do not indicate the signal flow, but the coupling between the output ports of the combiner/divider 782 and the mTx and mRx input ports to the combiner/divider 782 from the mTx and mRx outputs 765 and 767 of the DBF chip 707. The arrow for the mRx signal from the mRx output 767 is shown as reversed compared to the arrow for the mTx signal from the mTx output 765 because the mRx signal is received at the mRx calibration section 732 and the mTx signal is transmitted from the mTx calibration section 731.

The combiner/divider of the illustrated embodiment of FIG. 10C is configured as a four-port (two inputs, two outputs), directional (−3 dB) combiner/divider 782. The combiner/divider 782 of the illustrated embodiment merges multiple lines and creates intersection points in a two-dimensional mesh.

In one embodiment, the calibration lines 766 and 768 carry one of an mTx or an mRx signal at a time. However, either line may carry an mTx or an mRx signal.

To reduce the effect of the calibration lines on antenna performance, the calibration lines 766 and 768 can be isolated from the antenna feed lines 761 and 763, for example, in the PCB stack, except in the region of directional coupling.

Figure 11A:
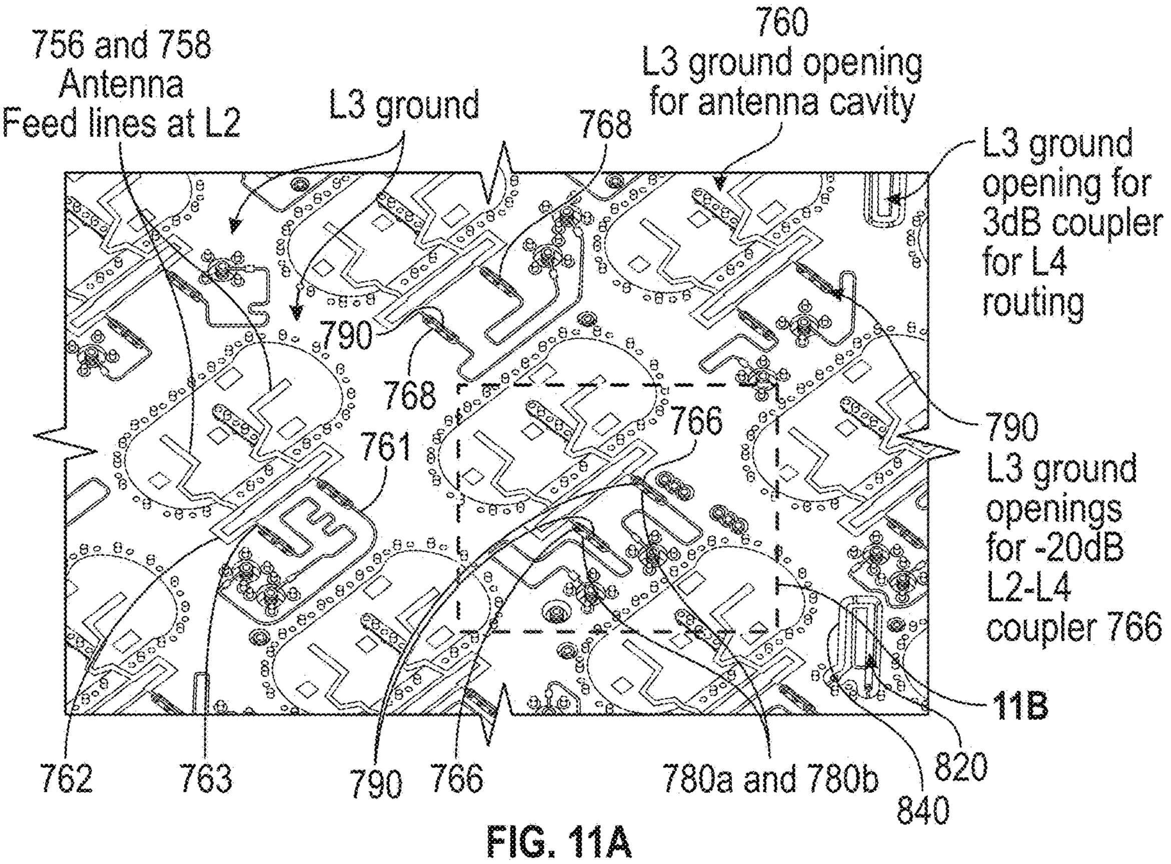
FIG. 11A is an exemplary view of circuitry components in a plurality of layers of a PCB assembly of an antenna stack assembly including in-line calibration lines, in accordance with some embodiments of the present disclosure.
Figure 11B:
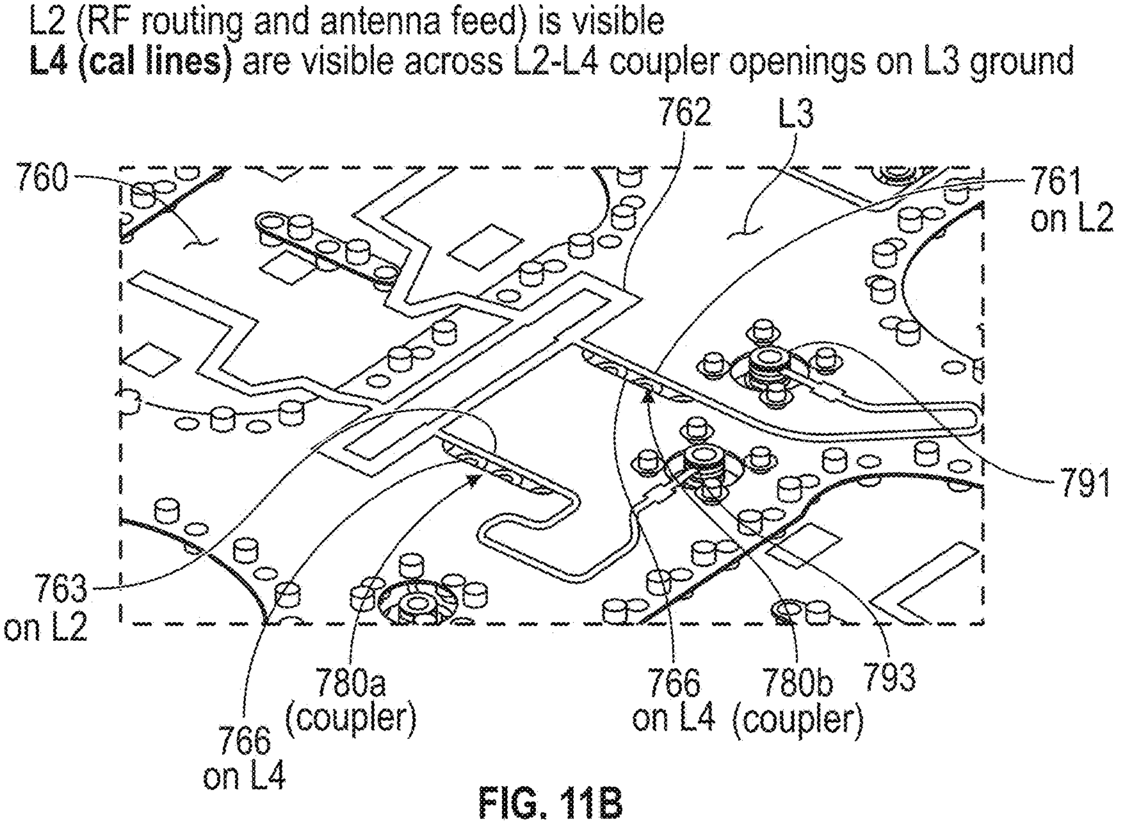
FIG. 11B is a close-up view of the circuitry components in the plurality of layers of the PCB assembly shown in FIG. 11A.
Figure 11C:
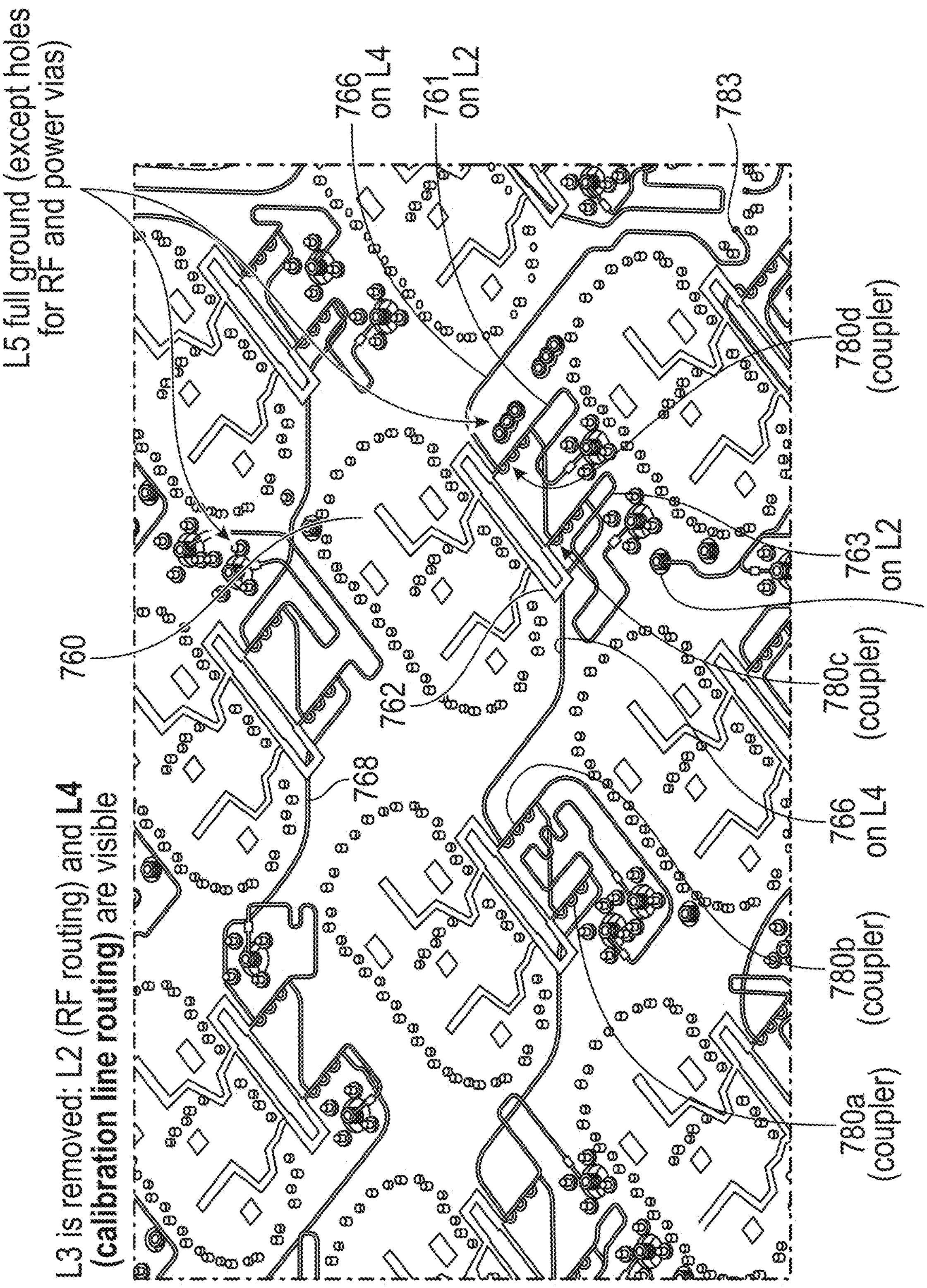
FIG. 11C is another exemplary view of the circuitry components in the plurality of layers of the PCB assembly shown in FIG. 11A.

Referring to FIGS. 11A-11C, an exemplary illustration of calibration lines 766 and 768 weakly coupled to (but also isolated from) antenna feed lines 761 and 763 is provided.

As seen in FIGS. 11A and 11B, the antenna feed lines 756 and 758 are shown extending into the antenna cavity 760 and coupled to the hybrid 90-degree coupler 762 (located outside the antenna cavity 760). From the hybrid 90-degree coupler 762, antenna feed lines 761 and 763 extend to respective via routing connections 791 and 793 to couple to the FEM chip 715 and DBF chip 707 on other layers such as L12. See also via routing connections 491 and 493 FIG. 6E. Antenna feed lines 761 and 763 are shown as meandering for length matching.

Calibration lines 766 and 768 are isolated from the antenna feed lines 761 and 763 by a ground layer L3, such as a metal layer. Inside the antenna cavity 760, metal layer L3 is etched off to create the antenna cavity 760. Outside the antenna cavity 760, metal layer L3 is used as a ground plane, separating the adjacent layers shown as routing layer L2 for the 90-degree hybrid coupler 762 and antenna feed lines 761 and 763, and routing layer L4 for the calibration lines 766 and 768. Cut-out areas 790 of metal layer L3 allows for weak RF coupling by couplers (e.g., 780*a*, 780*b*, 780*c*, 780*d* with calibration line 766) between the calibration lines 766 and 768 and the antenna feed lines 761 and 763.

Although indicated as L1, L2, L3, L4 in the illustrated embodiment, the layer levels are exemplary only. The PCB stack may have any number of layers, and the numbers are relevant in the present application to indicate adjacent or nearby layers.

Referring to FIG. 11C, the ground area L3 has been removed showing the travel of the calibration lines 766 and 768 on L4 for coupling by couplers (e.g., 780*a*, 780*b*, 780*c*, 780*d* with calibration line 766) with antenna feed lines 761 and 763 on L2 connected to the various antenna elements in the antenna array.

As seen in FIGS. 11A-11C, each calibration line, e.g., 766, overlaps with both Tx and Rx antenna feed lines 761 and 763 to transfer the signals between the calibration line 766 and the antenna feed lines 761 and 763 and vice versa by CDMA coupling such that the calibration line 766 communicates with the associated DBF chip 707 (see FIG. 10A).

As seen in the illustrated embodiment of FIG. 11C (see also FIG. 13D), each calibration line 766 and 768 may include respective via routing connections 770 and 772 from L4 to couple to the mTx/mRx combiner/divider 782 and DBF chip 707 on other layers, for example between from L5 to L12 or on the opposite side of the PCB from the feed slot on L1 (see FIG. 6E). The via routing connections 770 and 772 from L4 can be designed and configured to be similar to via routing connections 791 and 793 for the respective antenna feed lines 761 and 763 from L2 (see FIG. 11B) to couple to the FEM chip 715 and DBF chip 707 on other layers such as L12. See also via routing connections 491 and 493 FIG. 6E.

In one method of use in accordance with embodiments of the present disclosure, the mTx calibration section 731 of the DBF chip 707 delivers calibration signals to the calibration lines 766 and 768. Although the process is similar for calibration lines 766 and 768, in the following description, this description will focus on calibration line 766. During antenna downtime, an mTx calibration signal is transferred from the calibration line 766 to the antenna fees lines 761 and 763. In one exemplary embodiment, the coupling between the calibration lines 766 and 768 and the antenna fees lines 761 and 763 can be directional, such that the signal is received by the FEM chip 715 and the Rx DBF section 722 of the DBF chip 707. The signal received by the Rx DBF section 722 of the DBF chip 707 can be compared against the calibration signal sent by the mTx calibration section 731 for correction of any differences in the DBF chip 707.

In another method of use in accordance with embodiments of the present disclosure, the mRx calibration section 732 of the DBF chip 707 receives signals via the calibration lines 766 and 768. (As mentioned above, although the process is similar for calibration lines 766 and 768, this description will focus on calibration line 766.) During antenna downtime, a Tx signal is transferred from the Tx DBF section 721 of DBF chip 707 to the calibration lines 766 and 768. The Tx signal is received by the mRx calibration section 732 of the DBF chip 707. The Tx signal and the mRx signal in the mRx calibration section 732 can be compared for correction of any differences in the DBF chip 707.

The calibration line 766 is coupled with the Rx and Tx feed lines 761 and 763 associated with at least one or more antenna elements 713 in a DBF block 707. (In one non-limiting example, each DBF chip 707 is associated with 16 antenna elements 713.) Further, each calibration line 766 and 768 may be coupled with Rx and Tx feed lines associated with at least one or more antenna elements in one or more other DBF blocks. In addition, as described in greater detail below, each calibration line may be coupled with at least one other calibration line associated with one or more DBF blocks. All of this sensed information can be processed in each individual DBF chip 707 for calibration and alignment relative to an mTx or mRx reference signal.

Figure 12A:
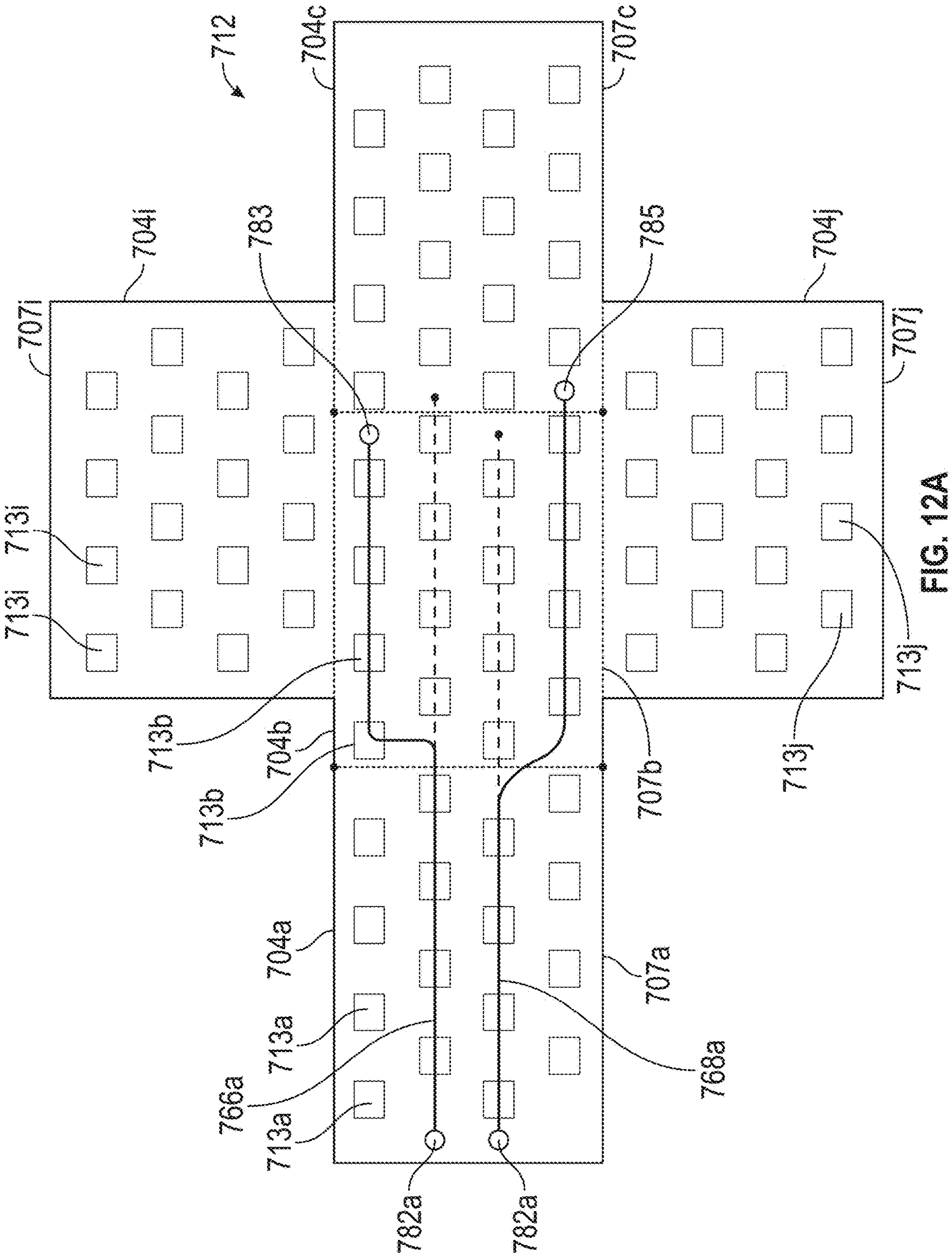
FIG. 12A is an exemplary illustration of a top view of at least a portion of an antenna lattice having in-line calibration lines corresponding with multiple antenna elements, in accordance with some embodiments of the present disclosure.

The overlap between DBF blocks is described with reference to FIGS. 12A-13D. Referring to FIG. 12A, an antenna lattice 712 including a plurality of antenna elements 713*i* is provided. Subsets 704*i* of antenna elements 713*i* in the antenna lattice are associated with a DBF block 707*i*. Each DBF block 707*i* may be supported by one DBF chip 707 (see FIG. 10A). In one non-limiting example each subset of antenna elements 704*i* associated with a DBF block 707*i* may include, as a non-limiting example, 16 functional RF input/outputs (RFIO), such that each DBF block 707*i* is coupled to 16 antenna elements 713*i*. However, any number of antenna elements may be associated with each DBF block 707*i*.

On the left side of FIG. 12A is a first DBF block 707*a* including a plurality of associated antenna elements 713*a*. To the right of the first DBF block 707*a* is a second DBF block 707*b* including a plurality of associated antenna elements 713*b*. To the right of the second DBF block 707*b* is a third DBF block 707*c* including a plurality of associated antenna elements 713*c*. Above and below the second DBF block 707*b* are other DBF blocks 707*i* and 707*j* each including a respective plurality of associated antenna elements 713*i* and 707*j*. Any number of DBF blocks may be included in the phased array antenna.

In the illustrated embodiment of FIG. 12A, first and second calibration lines 766*a* and 768*a* are shown extending between an mTx/mRx combiner/divider 782 and respective terminations 783 (for calibration line 766*a*) and 785 (for calibration line 768*a*). The calibration lines 766*a* and 768*a* are shown in an overlapping configuration with antenna elements 713*a* to indicate coupling with the feed lines 761 and 763 of each the antenna elements. (The feed lines 761 and 763 are illustrated in FIG. 10A).

Antenna calibration lines 766*a* and 768*a* may be configured to couple with antenna elements associated with different DBF blocks. For example, each of the antenna calibration lines 766*a* and 768*a* is shown to be coupled to one or more antenna elements 713*a* in a first subset of antenna elements 704*a* associated with a first DBF block 707*a* (see FIG. 10A) and to one or more antenna elements 713*b* in a second subset of antenna elements 704*b* associated with a second DBF block 707*b*. In the illustrated embodiment, each antenna calibration line 766*a* or 768*a* is coupled with four antenna elements 713*a* in a first subset of antenna elements 704*a* and four antenna elements 713*b* in a second subset of antenna elements 704*b*. In another embodiment, as illustrated in phantom in FIG. 12B, each antenna calibration line 766*a* or 768*a* is coupled with four antenna elements 713*a* in a first subset of antenna elements 704*a* and can either couple to four antenna elements 713*b* in the second subset of antenna elements 704*b*, or can overlap with another calibration line (see FIG. 12B) to couple to eight antenna elements 713*b* in a second subset of antenna elements 704*b* (with the additional four antenna elements 713*b* shown in phantom).

In other embodiments, each DBF block 707*i* may couple to any number of antenna elements, such as 2, 4, 8, 32, 64, etc. Any other numbers of antenna elements are within the scope of the present disclosure. Moreover, each antenna calibration line 766*i* or 768*i* may be coupled with one or more antenna elements associated with more than two DBF blocks.

Figure 12B:
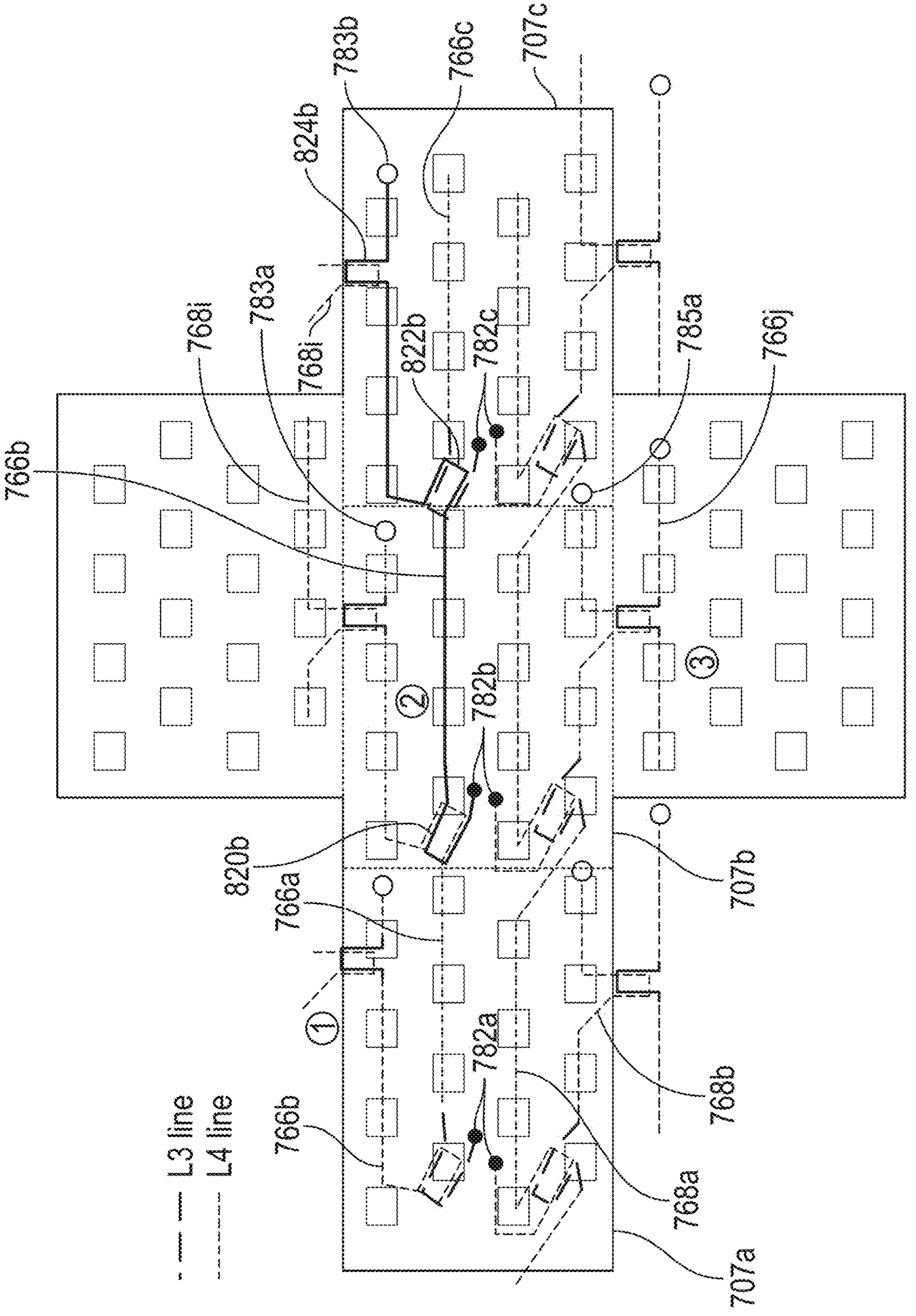
FIG. 12B is an exemplary illustration of a top view of at least a portion of an antenna lattice having coupled in-line calibration lines corresponding with multiple antenna elements, in accordance with some embodiments of the present disclosure.

In addition to or in lieu of an overlap with antenna elements 713*i* associated with different DBF blocks 707*i*, adjacent calibration lines 766*i* or 768*i* may also be configured to couple with each other for signal exchange between DBF blocks 707*i*. FIG. 12B illustrates an exemplary overlap between adjacent calibration lines 766*i* or 768*i*. DBF block 707*a* is coupled to combiner/divider 782*a* which combines and divides mTx and mRx signals from outputs 765 and 767 from the DBF 707 to and from the calibration lines 766*a* and 768*a*. As described above with reference to FIG. 12A, the calibration lines 766*a* and 768*a* couple with a plurality of antenna elements 713*a* in the antenna lattice 712 that are associated with the DBF block 707*a* or with another DBF block (e.g., 707*b*).

Referring to FIG. 12B, calibration lines 766*b* and 768*b* extend from the mTx/mRx combiner/divider 782*b* to their respective terminations 783*b* and 785*b* (785*b* not shown in FIG. 12B). In the illustrated embodiment, calibration line 766*b*—in its travel path from combiner/divider 782*b* to termination 783*b*—couples with three other calibration lines at couplers 820*b*, 822*b*, 824*b*. For example, calibration line 766*b* overlaps with calibration line 766*a* at coupler 820*b*, calibration line 766*b* overlaps with calibration line 766*c* at coupler 822*b*, and calibration line 766*b* overlaps with calibration line 768*i* at coupler 824*b*. The other overlapping calibration lines, for example, calibration lines 766*b* and 766*a*, calibration lines 766*b* and 766*c*, and calibration lines 766*b* and 768*i* primarily correspond with other subsets of antenna elements, for example, 704*b*, 704*c*, 704*i*, associated with other DBF blocks 707*b*, 707*c*, 707*i*.

In overlapping, the calibration lines 766*b* and 768*b* exchange information with each other that is passed back to the DBF chip associated with each calibration line for calibration processing, as described in the method of calibration below. In that regard, the calibration information can be used to calibrate the DBF chips 707*i* in the beamformer lattice relative to factory or other comparative calibration information based on signals received from individual antenna elements in a particular DBF block and in other DBF blocks in the phased array antenna. In the illustrated embodiment of FIG. 12B, adjacent calibration lines of adjacent DBF blocks 704*i* are coupled by couplers 820*i*, 822*i*, 824*i*, for example, 820*b*, 822*b*, 824*b*.

Referring to FIGS. 13A-13D, a suitable coupler 820 designed in accordance with embodiments of the present disclosure will be described in greater detail. The coupler 820 may be a directional coupler, as seen in FIGS. 13A-13D. In the illustrated embodiment, the coupler includes a first overlapping region 830*a* in a first calibration line 866*a* and a second overlapping region 830*b* in a second calibration line 866*b*.

In one embodiment of the present disclosure, coupler 820 is disposed in a two-layer implementation. In the illustrated embodiment, first calibration line 866*a* (except for the overlapping region 830*a*) and the second calibration line 866*b* (including the overlapping region 830*b*) are disposed on a first layer (for example, L4). The overlapping region 830*b* of the second calibration line 866*b* is disposed on a second nearby or adjacent layer (for example, L3). The overlapping region 830*a* of the first calibration line 866*a* is connected to the main portion of the calibration line by first and second coupler vias 832*a* and 832*b*.

Referring back to FIGS. 11A and 111B, the calibration lines 766 and 768 are isolated from the antenna feed lines 761 and 763 by a ground layer L3. Outside the antenna cavity 760, metal layer L3 is used as a ground plane, separating the adjacent layers shown as routing layer L2 for the 90-degree hybrid coupler 762 and antenna feed lines 761 and 763, and routing layer L4 for the calibration lines 766 and 768. Cut out areas 790 of metal layer L3 allows for weak coupling by couplers (e.g., 780*a*, 780*b*, 780*c*, 780*d* with calibration line 766) between the calibration lines 766 and 768 and the antenna feed lines 761 and 763.

Returning to FIGS. 13A-13D, cut out areas 840 of metal layer L3 allow for coupling by calibration line 866*a* and calibration line 866*b*. The calibration lines of the illustrated embodiment generally travel on L4. However, the overlapping region 830*a* of one of the two lines is disposed on a second nearby or adjacent layer (for example, ground layer L3).

Guard vias 834 are also disposed near the calibration vias to mitigate electromigration or RF "bleeding" from the coupler 820 or the cut-out portion 840 of ground layer L3 at or near the vias 832*a* and 832*b*.

Figure 13A:
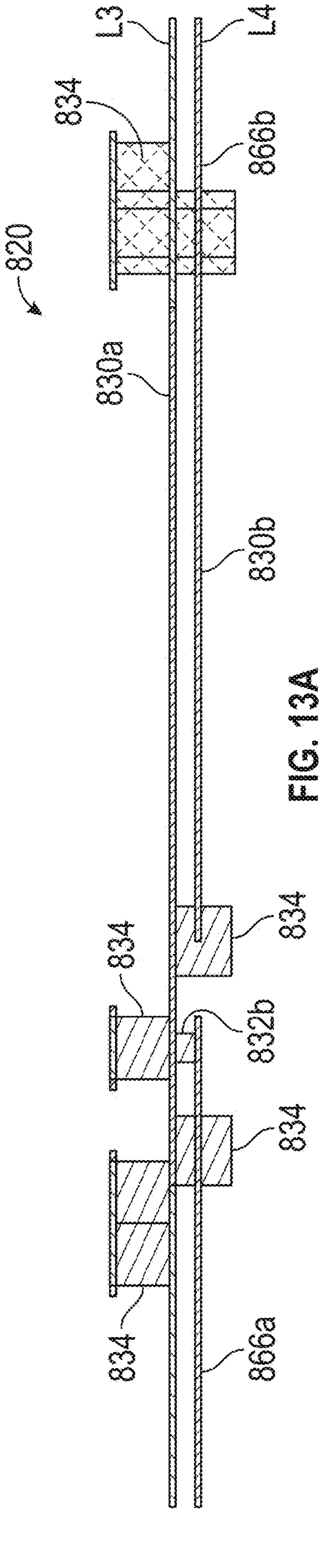
FIG. 13A is an exemplary cross-sectional view of circuitry components in a plurality of layers of a PCB assembly of an antenna stack assembly including couplers for in-line calibration lines, in accordance with some embodiments of the present disclosure.
Figure 13B:
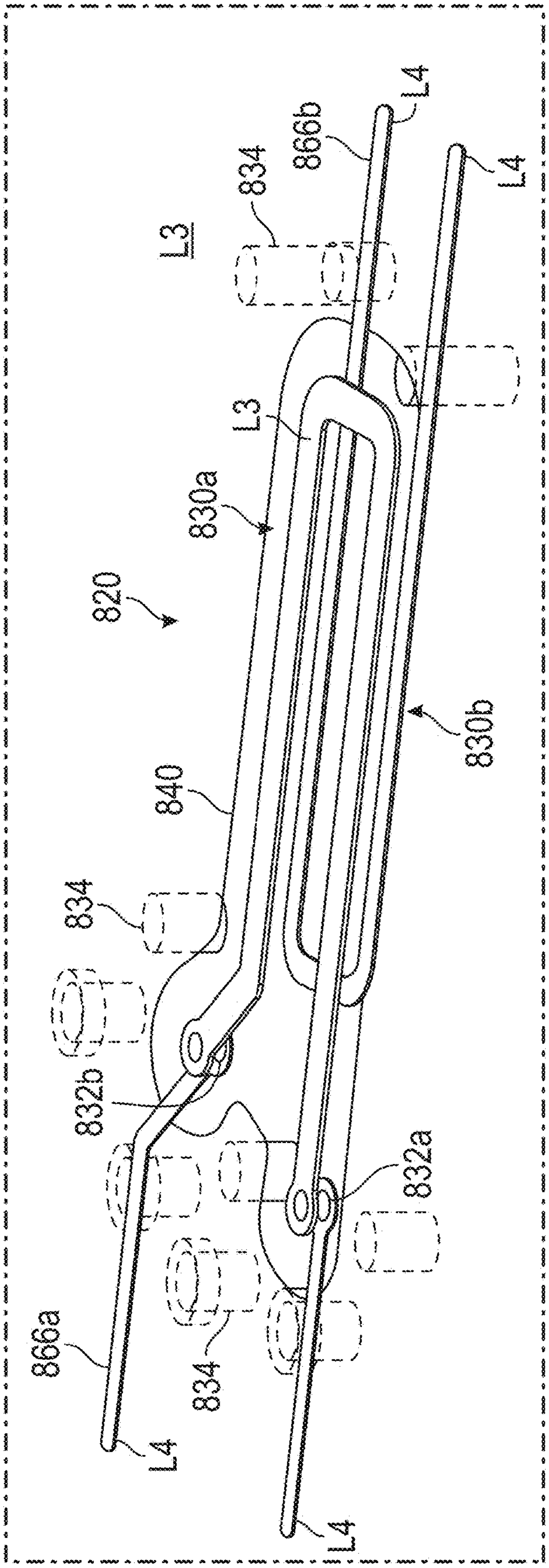
FIG. 13B is an exemplary isometric view of the circuitry components in the plurality of layers of the PCB assembly shown in FIG. 13A.
Figure 13C:
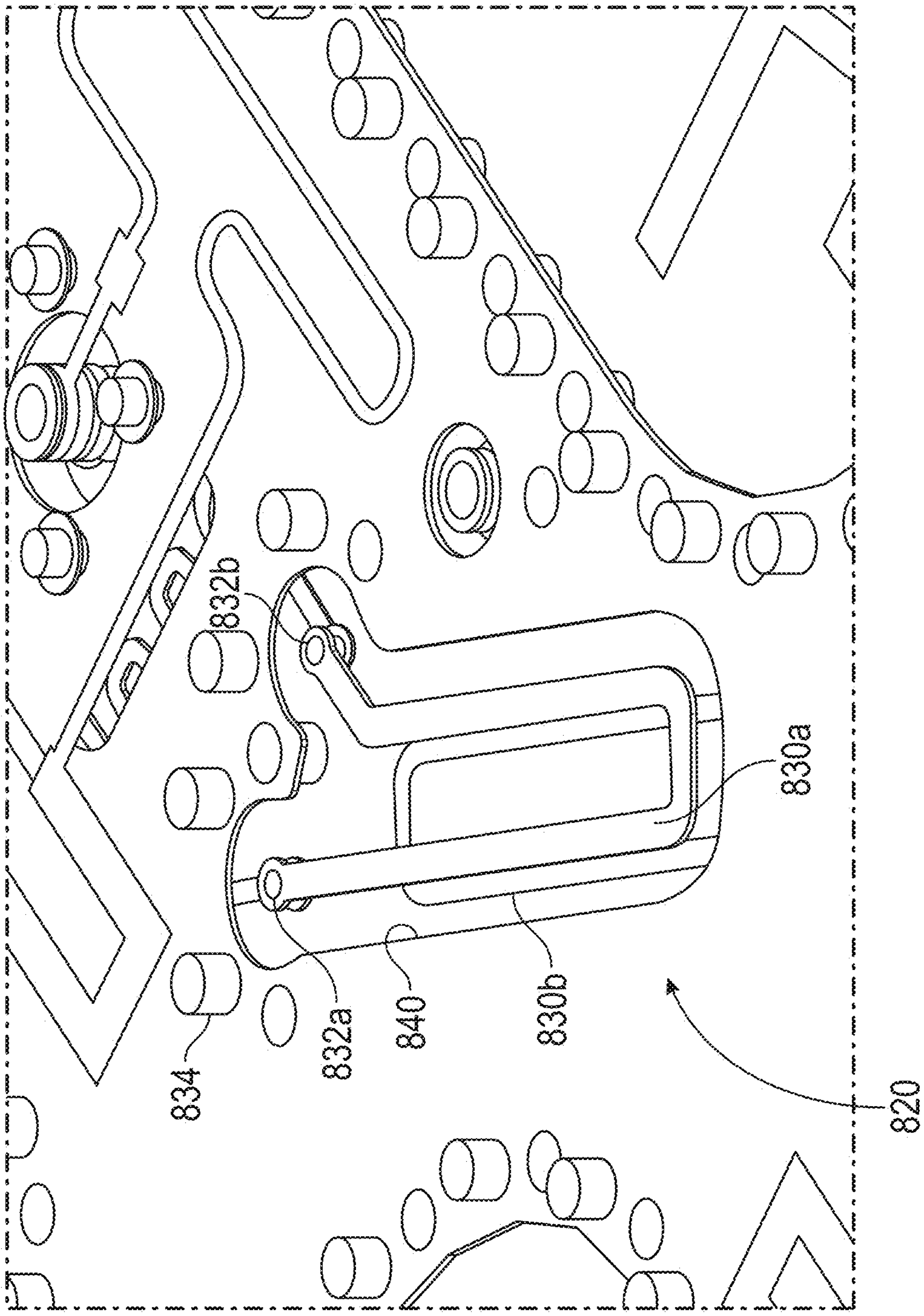
FIG. 13C is an exemplary isometric view of the circuitry components in the plurality of layers of the PCB assembly shown in FIG. 13A.
Figure 13D:
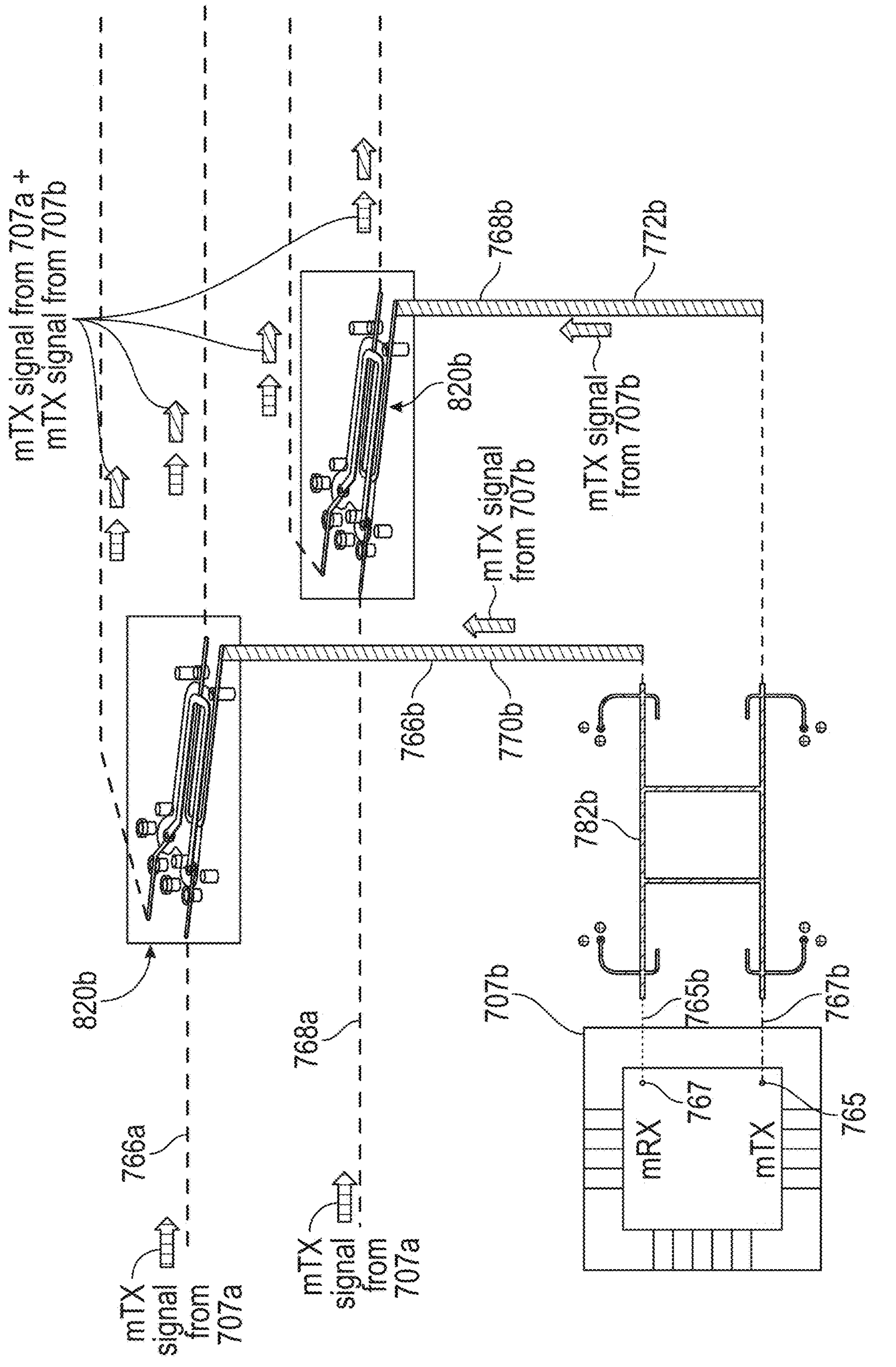
FIG. 13D is an exemplary illustration showing a simplified block diagram of an RF path for an antenna assembly including a digital beam former (DBF) chip connected with a DBF TX/RX calibration signal power combiner and a plurality of in-line calibration lines, in accordance with some embodiments of the present disclosure.

As seen in FIG. 13D, the couplers 820*b* of the illustrated embodiment calibration configuration are designed as directional couplers. As described with reference to FIG. 10A, mRx and mTx data is stored in the calibration sections 732 and 731 of the DBF chip 707 as seen. In an mTx calibration example, mTx signals are delivered from the calibration section of the DBF chip 707*b* via mTx output 765 to the combiner 782 to the calibration lines 766*b* and 768*b*. As described above with reference to FIG. 12B, the calibration lines 766*b* and 768*b* are configured to couple with other calibration lines to share calibration data among individual beamformers, e.g., 707*a*, 707*b*, 707*c*, 707*i*, 707*j*.

Algorithm for In-Line Calibration

Referring to FIG. 10A, mTx calibration data is transmitted to the individual antenna feed lines 761 and 763 during antenna downtime without disturbing the RF behavior of the antenna feed lines 761 and 763. In the illustrated embodiment, couplers 780*a*, 780*b*, 780*c*, 780*d* are directional couplers disposed in series along a single calibration line (see FIG. 10B), which are designed for isolating from coupling with the antenna elements 713, but coupling in the direction of the FEM chip 715 and the DBF chip 707. In this manner, the calibration system is isolated from effects of the environment that may affect signals emanating to and from the antennas 713.

In mTx calibration mode, the mTx signal is delivered from the mTx calibration section 731 of the DBF chip 707 and received at the Rx section 726 of the DBF chip 707 via the FEM chip 715. The received (Rx) signal is compared with the mTx signal that was transmitted via the calibration lines 766 and 768.

In mRx calibration mode, a transmitted (Tx) signal, for example provided by CDMA code generator 741, is delivered from the Tx section 725 of the DBF chip 707 via the FEM chip 715. The Tx signal is received by the calibration lines 766 and 768 and delivered to the mRx calibration section 732 of the DBF chip 707 for comparison with the transmitted signal.

Field calibration can be performed during the idle mode of the antenna array, for example, when the antenna array is not sending or receiving signals. The DBF calibration measurement sections (mTx and mRx) 731 and 732 have RF coupling to the FEM (PA and LNA) outputs. CDMA calibration data will store the FEM output levels referenced between the FEM 715 and the 90-degree hybrid coupler 762 for the antenna elements 713. As mentioned above, the 90-degree hybrid coupler 762 and the individual antenna elements 713 are assumed to be identical and do not require calibration or correction.

During factory alignment (referred to as park and measure), the FEM output levels (phase and magnitude) are measured by the mTx and mRx of the beamformer using CDMA codes. In the field, the measurements of the FEM outputs by mTx and mRx will be performed again and compared to the factory data. Any difference will be corrected and the panel is realigned.

Referring to FIG. 13D, an algorithm can be established for aligning a plurality of DBF chips 707*i* in an antenna array using overlapping calibration lines 766*i* and 768*i*. As seen in FIG. 13D, calibration lines 766*b* and 768*b* are coupled (at respective couplers 820*b*) with calibration lines 766*a* and 768*a*. Therefore, calibration information from DBF chip 707*a* (not shown, but would be on the left-hand side of the illustration) can be used to calibrate DBF chip 707*b*. Likewise, calibration information from DBF chip 707*b* can be used to calibration DBF chip 707*c* (not shown, but would be on the right-hand side of the illustration). An exemplary left-to-right progression of DBF chips 707*a*, 707*b*, and 707*c* is shown in FIG. 12B.

In the illustrated example, the calibration scheme travels from left to right and down through the DBF lattice. However, other calibration schemes are within the scope of the present disclosure. In one embodiment, the calibration scheme starts with one DBF chip 707 presumed to be calibrated and imparts calibration information to adjacent DBF chips 707 for calibration of the complete DBF lattice.

Such operation would allow the same calibration signal to be received by multiple Tx/Rx paths in a DBF chip 707 and in other DBF chips in the DBF lattice to create a set of (relative) mutual coupling data/measurements among multiple antenna feed lines. This set of data can be compared to the pre-existing mutual coupling data (acquired in factory) expected from a fully-calibrated Tx/Rx array. Any differences in magnitude/phase of the measured data might be interpreted as error happened in field (for example, due to aging or change of temperature) and corrected accordingly to match to the expected mutual coupling data.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. An antenna calibration system for a phased array antenna, the antenna calibration system comprising:

a beamformer lattice including at least a first beamformer, wherein the first beamformer corresponds to a first subset of antenna cells of a plurality of antenna cells including a plurality of feed lines extending between the first beamformer and each of the first subset of antenna cells, wherein the feed lines are on a first layer, and wherein the first beamformer includes a first calibration section for comparing a reference signal to a non-reference signal; and a first calibration line corresponding with the first beamformer, wherein the first calibration line is on a second layer, the first and second layers being separated by a ground laver, wherein the first calibration line is configured to deliver a first reference signal (mTx) from the first beamformer to be received by a first antenna feed line for comparison with a first non-reference signal (Rx) in the first beamformer, and/or wherein the first calibration line is configured to deliver a second non-reference signal (Tx) from a second antenna feed line for comparison with a second reference signal (mRx) in the first beamformer.

2. The system of claim 1, wherein the first calibration line is electrically coupled to at least a first portion of the plurality of antenna feed lines.

3. The system of claim 1, wherein the ground layer includes a cutout portion for allowing electrical coupling between the antenna feed lines and the first calibration line.

4. The system of claim 2, wherein the calibration line coupling is directional.

5. The system of claim 2, wherein the calibration line coupling is a weak coupler having a coupling level in the range of −20 dB to −41 dB.

6. The system of claim 1, further comprising a second calibration line corresponding with the first beamformer, wherein the second calibration line is configured to deliver the first reference signal (mTx) from the first beamformer to be received by a third antenna feed line for comparison with a third non-reference signal (Rx) in the first beamformer, and/or wherein the second calibration line is configured to deliver a fourth non-reference signal (Tx) from a fourth antenna feed line for comparison with the second reference signal (mRx) in the first beamformer.

7. The system of claim 6, wherein the second calibration line is electrically coupled to at least a second portion of the plurality of antenna feed lines.

8. The system of claim 6, wherein the first and second calibration lines include a combiner/divider for splitting a signal path for the first reference signal (mTx) from the first beamformer onto the first and second calibration lines and for combining a signal path for the second reference signal (mRx) from the first and second calibration lines to the first beamformer.

9. The system of claim 1, wherein the beamformer lattice includes at least a second beamformer, wherein the second beamformer corresponds to a second subset of antenna cells of the plurality of antenna cells, and wherein the second beamformer includes a second calibration section for comparing the reference signal to an additional non-reference signal, and wherein the first calibration line corresponding with the first beamformer communicates with the first and second beamformers.

10. The system of claim 9, further comprising an additional calibration line corresponding with the second beamformer, wherein the additional calibration line is configured to deliver a first additional reference signal (mTx) from the second beamformer to be received by a first additional antenna feed line for comparison with a first additional non-reference signal (Rx) in the second beamformer, and/or wherein the additional calibration line is configured to deliver a second additional non-reference signal (Tx) from a second additional antenna feed line for comparison with a second additional reference signal (mRx) in the second beamformer.

11. The system of claim 10, wherein the first calibration line corresponding with the first beamformer is coupled with the additional calibration line corresponding with the second beamformer, such coupling configured for communicating calibration information from either of the first and second beamformers to the other of the first and second beamformers, or both from the first beamformer to the second beamformer and from the second beamformer to the first beamformer.

12. The system of claim 11, wherein the first calibration line corresponding with the first beamformer is coupled with at least three other calibration lines corresponding with at least three other beamformers.

13. The system of claim 1, further comprising a stack patch antenna assembly defining the plurality of antenna cells.

14. The system of claim 13, further comprising a PCB assembly coupled to the stack patch antenna assembly and the beamformer lattice, the PCB assembly made up from a plurality of layers, wherein a first layer is an antenna ground layer having a slot feed to electrically couple each of the plurality of antenna cells of the stack patch antenna assembly to a beamformer in the beamformer lattice, wherein the first layer is spaced from a backing ground layer defining a plurality of cavities between the first layer and the backing ground layer, each cavity associated with one of the plurality of antenna cells, the PCB assembly further including an intermediate layer between the first layer and the backing layer, wherein the intermediate layer includes cavity portions and non-cavity portions, wherein the non-cavity portions are configured to support electrical features disposed outside the cavities.

15. The system of claim 14, wherein the PCB assembly includes a plurality of ground vias between the first layer and the backing ground layer defining the cavities.

16. The system of claim 14, wherein the slot feed is dual circularly polarized with separate receiving and transmitting ports.

17. The system of claim 14, wherein a second layer of the PCB assembly includes a 90-degree hybrid coupler.

18. A method for antenna calibration, comprising:

obtaining a beamformer lattice including at least a first beamformer, wherein the first beamformer corresponds to a first subset of antenna cells of a plurality of antenna cells including a plurality of feed lines extending between the first beamformer and each of the first subset of antenna cells, wherein the feed lines are on a first layer, and wherein the first beamformer includes a first calibration section for comparing a reference signal to a non-reference signal; and calibrating the beamformer lattice using a first calibration line corresponding with the first beamformer, wherein the first calibration line is on a second layer, the first and second layers being separated by a ground layer, wherein the first calibration line is configured to deliver a first reference signal (mTx) from the first beamformer to be received by a first antenna feed line for comparison with a first non-reference signal (Rx) in the first beamformer, and/or wherein the first calibration line is configured to deliver a second non-reference signal (Tx) from a second antenna feed line for comparison with a second reference signal (mRx) in the first beamformer.

* * * * *